(12) United States Patent
Morihiro

(10) Patent No.: US 9,970,345 B2
(45) Date of Patent: May 15, 2018

(54) EXHAUST PURIFICATION SYSTEM OF INTERNAL COMBUSTION ENGINE

(71) Applicant: TOYOTA JIDOSHA KUBUSHIKI KAISHA, Toyota-shi, Aichi-ken (JP)

(72) Inventor: Kinji Morihiro, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 50 days.

(21) Appl. No.: 15/280,258

(22) Filed: Sep. 29, 2016

(65) Prior Publication Data
US 2017/0096926 A1 Apr. 6, 2017

(30) Foreign Application Priority Data
Oct. 1, 2015 (JP) ................. 2015-195961

(51) Int. Cl.
F01N 3/00 (2006.01)
F01N 3/10 (2006.01)
F01N 9/00 (2006.01)

(52) U.S. Cl.
CPC ............. *F01N 9/007* (2013.01); *F01N 3/101* (2013.01); *F01N 2430/06* (2013.01);
(Continued)

(58) Field of Classification Search
CPC ........... F01N 2560/02; F01N 2560/025; F01N 2430/06; F01N 2900/0402;
(Continued)

(56) References Cited

U.S. PATENT DOCUMENTS

2010/0180874 A1* 7/2010 Iwahashi ............. F01L 13/0021
   123/674
2013/0073181 A1* 3/2013 Mamada ................. F02D 28/00
   701/103
(Continued)

FOREIGN PATENT DOCUMENTS

JP 2010-180746 A 8/2010
JP 2015-071963 A 4/2015
(Continued)

*Primary Examiner* — Phutthiwat Wongwian
*Assistant Examiner* — Diem Tran
(74) *Attorney, Agent, or Firm* — Hunton Andrews Kurth LLP

(57) ABSTRACT

The exhaust purification system comprises a control apparatus performing main feedback control controlling the amount of fed fuel so that the output air-fuel ratio of the upstream side sensor becomes a target value, sub feedback control setting the target air-fuel based on the output air-fuel ratio of the downstream side sensor, main learning control controlling the amount of fed fuel based on a main learning value, and sub learning control controlling the amount of fed fuel based on a sub learning value. The control apparatus performs sub learning promotion control so that the sub learning value easily changes to a suitable value when a sub learning promotion condition, which is satisfied when the absolute values of the main learning value and the sub learning value are respectively predetermined reference absolute values or more and these learning values are opposite in sign, is satisfied.

12 Claims, 17 Drawing Sheets

(52) U.S. Cl.
CPC .... *F01N 2560/02* (2013.01); *F01N 2560/025* (2013.01); *F01N 2900/0402* (2013.01); *F01N 2900/0416* (2013.01); *F01N 2900/1402* (2013.01); *Y02T 10/22* (2013.01); *Y02T 10/47* (2013.01)

(58) Field of Classification Search
CPC ..... F01N 2900/0416; F01N 2900/1402; F01N 3/101; F01N 9/007; Y02T 10/22; Y02T 10/47
USPC .......................................... 60/276, 285, 299
See application file for complete search history.

(56) References Cited

U.S. PATENT DOCUMENTS

| | | | | |
|---|---|---|---|---|
| 2013/0080033 | A1* | 3/2013 | Fujiwara | F02D 41/126 |
| | | | | 701/104 |
| 2013/0138326 | A1* | 5/2013 | Andersson | F02D 41/1461 |
| | | | | 701/103 |
| 2013/0213016 | A1* | 8/2013 | Nakata | F02D 41/1441 |
| | | | | 60/285 |
| 2014/0290219 | A1* | 10/2014 | Kato | F02D 41/1441 |
| | | | | 60/276 |
| 2016/0061084 | A1 | 3/2016 | Okazaki et al. | |

FOREIGN PATENT DOCUMENTS

| | | |
|---|---|---|
| WO | 2014/118892 A1 | 8/2014 |
| WO | 2015/050268 A1 | 4/2015 |

\* cited by examiner

EXHAUST PURIFICATION SYSTEM OF INTERNAL COMBUSTION ENGINE

CROSS-REFERENCE TO RELATED APPLICATION

The present application claims priority to Japanese Patent Application No. 2015-195961 filed on Oct. 1, 2015, which is incorporated herein by reference in its entirety.

TECHNICAL FIELD

The present invention relates to an exhaust purification system of an internal combustion engine.

BACKGROUND ART

Known in the past has been an exhaust purification system of an internal combustion engine comprising an exhaust purification catalyst arranged in an exhaust passage of an internal combustion engine, an upstream side air-fuel ratio sensor arranged at an upstream side of the exhaust purification catalyst in the direction of exhaust flow and detecting an air-fuel ratio of exhaust gas flowing into the exhaust purification catalyst, a downstream side air-fuel ratio sensor arranged at a downstream side of the exhaust purification catalyst in the direction of exhaust flow and detecting an air-fuel ratio of exhaust gas flowing out from the exhaust purification catalyst, and a control apparatus using the output air-fuel ratios of the upstream side air-fuel ratio sensor and the downstream side air-fuel ratio sensor as the basis to control an amount of feed of fuel to a combustion chamber of the internal combustion engine.

In such an exhaust purification system of an internal combustion engine, the control apparatus performs main feedback control controlling by feedback the amount of feed of fuel so that the air-fuel ratio detected by the upstream side air-fuel ratio sensor (below, referred to as an "output air-fuel ratio") becomes a target air-fuel ratio. In addition, it performs sub feedback control using the output air-fuel ratio of the downstream side air-fuel ratio sensor etc. as the basis to alternately switch the target air-fuel ratio between an air-fuel ratio richer than the stoichiometric air-fuel ratio (below, referred to as a "rich air-fuel ratio") and an air-fuel ratio leaner than the stoichiometric air-fuel ratio (below, referred to as a "lean air-fuel ratio") (for example, PLT 1). In particular, in the exhaust purification system described in PLT 1, when the output air-fuel ratio of the downstream side air-fuel ratio sensor becomes a rich judged air-fuel ratio richer than the stoichiometric air-fuel ratio or becomes less, the target air-fuel ratio is switched from a rich air-fuel ratio to a lean air-fuel ratio. In addition, if the estimated value of the oxygen storage amount of the exhaust purification catalyst reaches a switching reference storage amount smaller than a maximum storage amount of oxygen of the exhaust purification catalyst, the target air-fuel ratio is switched from a lean air-fuel ratio to a rich air-fuel ratio.

Further, the output air-fuel ratio of the upstream side air-fuel ratio sensor deviates to the rich side the greater the amount of hydrogen in the exhaust gas discharged from the engine body. Therefore, in the exhaust purification system described in PLT 1, the output air-fuel ratio of the upstream side air-fuel ratio sensor was used as the basis to calculate the amount of release of oxygen from the exhaust purification catalyst in the time when the target air-fuel ratio is set to a rich air-fuel ratio and the amount of storage of oxygen in the exhaust purification catalyst in the time when the target air-fuel ratio is set to a lean air-fuel ratio. Further, a sub learning value is calculated in accordance with a difference between the thus calculated oxygen release amount and oxygen storage amount and this sub learning value is used as the basis to correct the target air-fuel ratio (sub feedback learning control). According to PLT 1, due to this, even if deviation occurs in the output air-fuel ratio of the upstream side air-fuel ratio sensor, it is considered that this deviation can be compensated for.

CITATION LIST

Patent Literature

PLT 1: Japanese Patent Publication No. 2015-071963A
PLT 2: Japanese Patent Publication No. 2010-180746A

SUMMARY OF INVENTION

Technical Problem

In this regard, in a part of the cylinders of an internal combustion engine having a plurality of cylinders, sometimes a breakdown of a fuel injector etc. causes the actual amount of feed of fuel from that fuel injector to become greater than the target value. This occurs when, for example, foreign matter deposits between a needle valve and valve seat of the fuel injector and the needle valve can no longer completely close. If, in this way, the amount of feed of fuel from a part of the fuel injectors becomes greater, the combustion air-fuel ratio (air-fuel ratio of air-fuel mixture in a combustion chamber when combustion occurs) at a cylinder corresponding to this part of the fuel injectors becomes richer than the combustion air-fuel ratio at the other cylinders. Below, the deviation in the combustion air-fuel ratio between cylinders due to the combustion air-fuel ratio at a part of the cylinders becoming richer than the combustion air-fuel ratio at other cylinders in this way will be called a "rich imbalance".

If rich imbalance occurs in this way, a large amount of hydrogen flows out from a cylinder where the combustion air-fuel ratio became rich. As a result, the output air-fuel ratio of the upstream side air-fuel ratio sensor deviates to the rich side. At this time, if main feedback control is used to control the output air-fuel ratio of the upstream side air-fuel ratio sensor to become the target air-fuel ratio, the actual air-fuel ratio of the exhaust gas flowing into the exhaust purification catalyst will deviates to the lean side from the target air-fuel ratio.

Even if deviation occurs in the output air-fuel ratio of the upstream side air-fuel ratio sensor in this way and the actual air-fuel ratio deviates from the target air-fuel ratio, this deviation is gradually compensated for by the above-mentioned sub feedback learning control. However, compensation of deviation by sub feedback learning control takes time, so eliminating the deviation between the actual air-fuel ratio and target air-fuel ratio from when a rich imbalance occurs takes a certain degree of time. However, if the actual air-fuel ratio and target air-fuel ratio deviate from each other over a long time, deterioration of the exhaust emission is invited.

Therefore, in consideration of the above problem, an object of the present invention is to provide an exhaust purification system of an internal combustion engine able to quickly reduce the deviation between the actual air-fuel ratio and the target air-fuel ratio even when a rich imbalance occurs.

Solution to Problem

The present invention is has been made to solve the above problem, and its summary is as follows.

(1) An exhaust purification system of an internal combustion engine, comprising: an exhaust purification catalyst arranged in an exhaust passage of an internal combustion engine; an upstream side air-fuel ratio sensor arranged at an upstream side of the exhaust purification catalyst in the direction of exhaust flow and detecting an air-fuel ratio of the exhaust gas flowing into the exhaust purification catalyst; a downstream side air-fuel ratio sensor arranged at a downstream side of the exhaust purification catalyst in the direction of exhaust flow and detecting an air-fuel ratio of the exhaust gas flowing out from the exhaust purification catalyst; and a control apparatus using output air-fuel ratios of the upstream side air-fuel ratio sensor and the downstream side air-fuel ratio sensor as the basis to control the amount of feed of fuel to a combustion chamber of the internal combustion engine, wherein the control apparatus performs main feedback control controlling the amount of feed of fuel by feedback so that the output air-fuel ratio of the upstream side air-fuel ratio sensor becomes a target air-fuel ratio, sub feedback control using the output air-fuel ratio of the downstream side air-fuel ratio sensor as the basis to alternately switch the target air-fuel ratio between a rich air-fuel ratio richer than the stoichiometric air-fuel ratio and a lean air-fuel ratio leaner than the stoichiometric air-fuel ratio, main learning control using a difference between the output air-fuel ratio of the upstream side air-fuel ratio sensor and the target air-fuel ratio as the basis to calculate a main learning value changing in accordance with a steady deviation present between these air-fuel ratios and using the calculated main learning value as the basis to control the amount of feed of fuel to the combustion chamber of the internal combustion engine so that the difference between the output air-fuel ratio of the upstream side air-fuel ratio sensor and the target air-fuel ratio becomes smaller, and sub learning control using the output air-fuel ratio of the upstream side air-fuel ratio sensor and the output air-fuel ratio of the downstream side air-fuel ratio sensor as the basis to calculate a sub learning value changing in accordance with a difference between an air-fuel ratio of the exhaust gas flowing into the exhaust purification catalyst and the target air-fuel ratio and using the calculated sub learning value as the basis to control the amount of feed of fuel to the combustion chamber of the internal combustion engine so that the difference between the air-fuel ratio of the exhaust gas flowing into the exhaust purification catalyst and the target air-fuel ratio becomes smaller, the control apparatus performs sub learning promotion control controlling a parameter relating to the sub learning value so that the sub learning value at the sub learning control easily changes to a suitable value depending on the difference between the air-fuel ratio of the exhaust gas flowing into the exhaust purification catalyst and the target air-fuel ratio when a sub learning promotion condition is satisfied compared to when the sub learning promotion condition is not satisfied, and the sub learning promotion condition is satisfied at least when the absolute values of the main learning value and the sub learning value are respectively predetermined reference absolute values or more and the main learning value and the sub learning value are opposite in sign.

(2) The exhaust purification system of an internal combustion engine described in above (1), wherein the sub learning promotion condition is satisfied at least when the absolute values of the main learning value and the sub learning value are respectively predetermined reference absolute values or more and the main learning value and the sub learning value are opposite in sign and, furthermore, a difference of the main learning value and the sub learning value is a predetermined reference difference or more.

(3) The exhaust purification system of an internal combustion engine described in above (1) or (2), wherein an absolute value of the sub learning value is maintained at a predetermined guard value or less, and, in the sub learning promotion control, an absolute value of the guard value is made to increase.

(4) The exhaust purification system of an internal combustion engine described in any one of above (1) to (3), wherein, in the sub learning control, a difference of the target air-fuel ratio and the air-fuel ratio of the exhaust gas flowing into the exhaust purification catalyst is multiplied with a predetermined coefficient and the values are cumulatively added to calculate a sub learning value, and in the sub learning promotion control, the coefficient when calculating the sub learning value is made larger when the sub learning promotion condition is satisfied compared to when the sub learning promotion condition is not satisfied.

(5) The exhaust purification system of an internal combustion engine described in any one of above (1) to (4), wherein the control apparatus, in the sub feedback control, alternately switches the target air-fuel ratio between a rich set air-fuel ratio richer than the stoichiometric air-fuel ratio and a lean set air-fuel ratio leaner than the stoichiometric air-fuel ratio, and in the sub learning promotion control, a rich degree of the rich set air-fuel ratio is made larger when the sub learning promotion condition is satisfied compared to when the sub learning promotion condition is not satisfied.

(6) The exhaust purification system of an internal combustion engine described in any one of above (1) to (5), wherein the control apparatus uses the output air-fuel ratio of the upstream side air-fuel ratio sensor as the basis to estimate an oxygen storage amount of the exhaust purification catalyst and, in the sub feedback control, switches the target air-fuel ratio from a lean air-fuel ratio to a rich air-fuel ratio when the estimated value of the oxygen storage amount of the exhaust purification catalyst becomes the switching reference storage amount or more, and in the sub learning promotion control, the switching reference storage amount is made smaller when the sub learning promotion condition is satisfied compared to when the sub learning promotion condition is not satisfied.

(7) The exhaust purification system of an internal combustion engine described in any one of above (1) to (4), wherein the control apparatus, in the sub feedback control, alternately switches the target air-fuel ratio between a rich set air-fuel ratio richer than the stoichiometric air-fuel ratio and a lean set air-fuel ratio leaner than the stoichiometric air-fuel ratio, and, in the sub learning promotion control, a lean degree of the lean set air-fuel ratio is made smaller when the sub learning promotion condition is satisfied compared to when the sub learning promotion condition is not satisfied.

Advantageous Effects of Invention

According to the present invention, it is possible to quickly reduce the deviation between the actual air-fuel ratio and the target air-fuel ratio even when a rich imbalance occurs.

DESCRIPTION OF EMBODIMENTS

Figure 1:
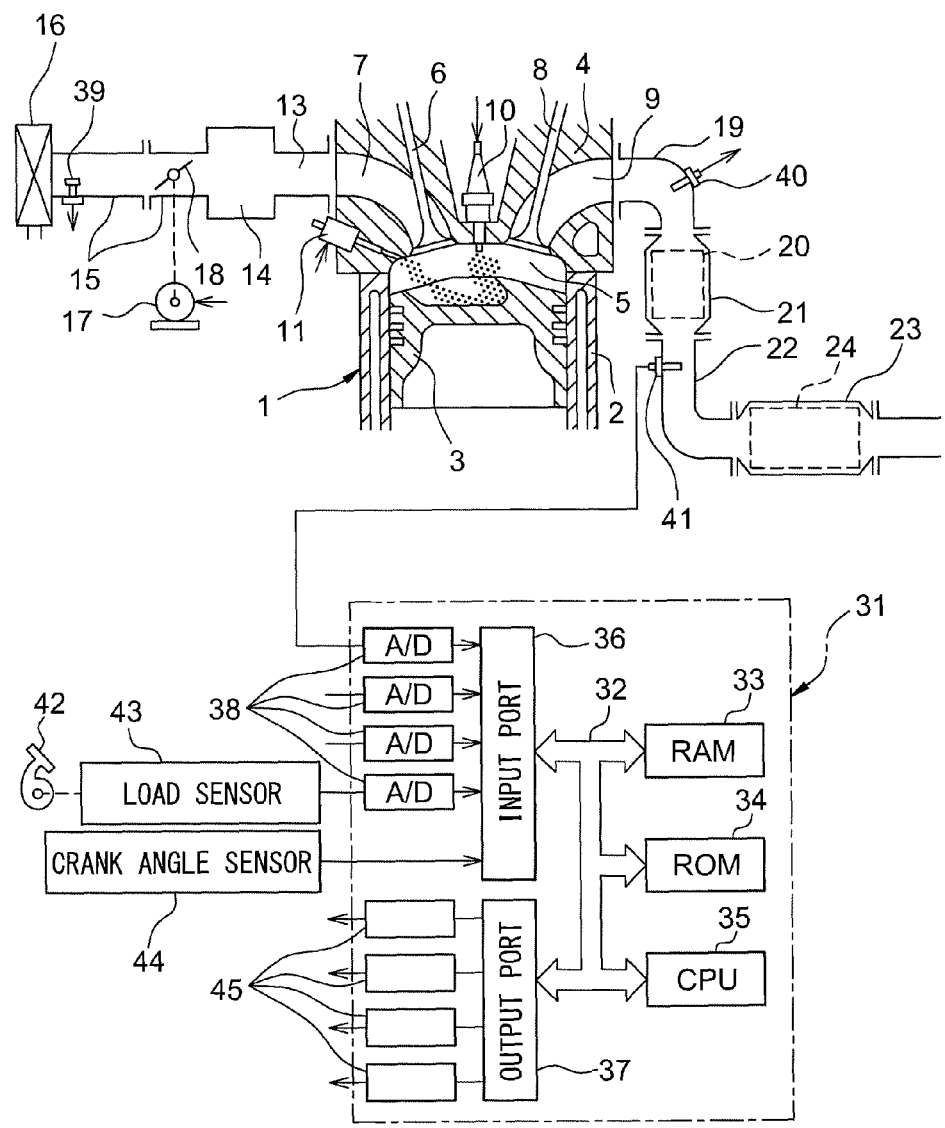
FIG. 1 is a view schematically showing an internal combustion engine provided with an exhaust purification system of the present invention.

Below, referring to the drawings, embodiments of the present invention will be explained in detail.

<Explanation of Internal Combustion Engine as a Whole>
FIG. 1 is a view schematically showing an internal combustion engine in which an exhaust purification system according to a first embodiment of the present invention is used. The internal combustion engine shown in FIG. 1 comprises an engine body 1 provided with a cylinder block 2 and a cylinder head 4 fastened on the cylinder block 2. Inside the cylinder block 2, a piston 3 is arranged which reciprocates inside a cylinder formed inside the cylinder block 2. Between the piston 3 and cylinder head 4, a combustion chamber 5 is formed in which an air-fuel mixture is burned.

Inside the cylinder head 4, an intake port 7 and exhaust port 9 are formed. The intake port 7 and exhaust port 9 are communicated with the combustion chamber 5. Further, the internal combustion engine shown in FIG. 1 comprises an intake valve 6 and exhaust valve 8 arranged inside the cylinder head 4. The intake valve 6 opens and closes the intake port 7, while the exhaust valve 8 opens and closes the exhaust port 9.

As shown in FIG. 1, the internal combustion engine comprises a spark plug 10 arranged at a center part of the inside wall surface of the cylinder head 4 and a fuel injector 11 arranged at a peripheral part of the inside wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may be arranged to inject fuel into the intake port 7. Further, in the present embodiment, as the fuel, gasoline with a stoichiometric air-fuel ratio of 14.6 is used. However, in the exhaust purification system in which the internal combustion engine of the present invention is used, a fuel other than gasoline or a mixed fuel with gasoline may be used.

Further, as shown in FIG. 1, the internal combustion engine comprises an intake branch tubes 13 connected with the intake port 7 of the cylinder, a surge tank 14 connected with these intake branch tubes 13, and an intake pipe 15 connected to the surge tank 14. The intake pipe 15 is connected to an air cleaner 16. The intake port 7, intake branch tubes 13, surge tank 14, and intake pipe 15 form an intake passage of the internal combustion engine. Further, inside the intake pipe 15, a throttle valve 18 driven by a throttle valve-drive actuator 17 is arranged. The throttle valve 18 can be made to turn by the throttle valve-drive actuator 17 whereby the open area of the intake passage can be changed.

On the other hand, the internal combustion engine comprises an exhaust manifold 19 connected to the exhaust port 9 of the cylinder. The exhaust manifold 19 has a plurality of tubes connected to exhaust ports 9 and a header at which these tubes merged. In addition, the internal combustion engine comprises an upstream side casing 21 connected to the header of the exhaust manifold 19, a downstream side casing 23, and an exhaust pipe 22 arranged between the upstream side casing 21 and the downstream side casing 23. The upstream side casing 21 holds an upstream side exhaust purification catalyst 20, while the downstream side casing 23 holds a downstream side exhaust purification catalyst 24. The exhaust port 9, exhaust manifold 19, upstream side casing 21, exhaust pipes 22, and downstream side casing 23 form an exhaust passage.

In addition, the internal combustion engine comprises an electronic control unit (ECU) 31 comprised of a digital computer. The ECU 31 comprises components connected with each other through a bidirectional bus 32 such as a RAM (random access memory) 33, ROM (read only memory) 34, CPU (microprocessor) 35, input port 36, and output port 37. At the intake pipe 15, an air flow rate detection device (for example, air flow meter) 39 is arranged for detecting the flow of air flowing through the inside of the intake pipe 15. The output of this air flow rate detection device 39 is input through a corresponding AD converter 38 to the input port 36. Further, at the header of the exhaust manifold 19, an upstream side air-fuel ratio sensor 40 is arranged for detecting an air-fuel ratio of exhaust gas flowing through the inside of the exhaust manifold 19 (that is, the exhaust gas flowing into the upstream side exhaust purification catalyst 20). In addition, at the inside of the exhaust pipe 22, a downstream side air-fuel ratio sensor 41 is arranged for detecting an air-fuel ratio of exhaust gas flowing through the inside of the exhaust pipe 22 (that is, the exhaust gas flowing out from the upstream side exhaust purification catalyst 20 and flowing into the downstream side exhaust purification catalyst 24). The outputs of these air-fuel ratio sensors 40, 41 are also input through the corresponding AD converters 38 to the input port 36.

Further, at the accelerator pedal 42, a load sensor 43 generating an output voltage proportional to the amount of depression of the accelerator pedal 42 is connected, while the output voltage of the load sensor 43 is input through a corresponding AD converter 38 to the input port 36. The crank angle sensor 44 generates an output pulse every time for example the crankshaft rotates by 15 degrees. The output pulses are input to the input port 36. At the CPU 35, the engine speed is calculated from the output pulses of this crank angle sensor 44. On the other hand, the output port 37 is connected through the corresponding drive circuits 45 to the spark plug 10, fuel injector 11, and throttle valve-drive actuator 17. Note that, the ECU 31 functions as the control apparatus for performing various controls.

<Explanation of Exhaust Purification Catalyst>

The upstream side exhaust purification catalyst 20 and the downstream side exhaust purification catalyst 24 are three-way catalysts which have an oxygen storage ability. Specifically, the exhaust purification catalysts 20 and 24 are three-way catalysts which comprise a carrier made of ceramic on which a precious metal (for example, platinum Pt) having a catalyst effect and a substance having an oxygen storage ability (for example, ceria $CeO_2$) are carried. A three-way catalyst has the function of simultaneously purifying unburned gas and $NO_X$ when the air-fuel ratio of the exhaust gas flowing into the three-way catalyst is maintained at the stoichiometric air-fuel ratio. In addition, when the exhaust purification catalysts 20 and 24 store a certain extent of oxygen, the unburned gas and $NO_X$ are simultaneously purified even if the air-fuel ratio of the exhaust gas flowing into the exhaust purification catalysts 20 and 24 somewhat deviates from the stoichiometric air-fuel ratio to the rich side or lean side.

Accordingly, if the exhaust purification catalysts 20 and 24 have an oxygen storage ability, that is, if the oxygen storage amount of the exhaust purification catalysts 20 and 24 is less than the maximum storage oxygen amount, when the air-fuel ratio of the exhaust gas flowing into the exhaust purification catalysts 20, 24 becomes somewhat leaner than the stoichiometric air-fuel ratio, the excess oxygen contained in the exhaust gas is stored in the exhaust purification catalysts 20, 24. Therefore, the surfaces of the exhaust purification catalysts 20 and 24 are maintained at the stoichiometric air-fuel ratio. As a result, on the surfaces of the exhaust purification catalysts 20 and 24, the unburned gas and $NO_X$ are simultaneously purified. At this time, the air-fuel ratio of the exhaust gas flowing out from the exhaust purification catalysts 20 and 24 becomes the stoichiometric air-fuel ratio.

On the other hand, if exhaust purification catalysts 20 and 24 can release oxygen, that is, the oxygen storage amount of the exhaust purification catalysts 20 and 24 is more than zero, when the air-fuel ratio of the exhaust gas flowing into the exhaust purification catalysts 20, 24 becomes somewhat richer than the stoichiometric air-fuel ratio, the oxygen which is insufficient for reducing the unburned gas contained in the exhaust gas, is released from the exhaust purification catalysts 20 and 24. Therefore, the surfaces of the exhaust purification catalysts 20 and 24 are maintained at the stoichiometric air-fuel ratio. As a result, on the surfaces of the exhaust purification catalysts 20 and 24, the unburned gas and $NO_X$ are simultaneously purified. At this time, the air-fuel ratio of the exhaust gas flowing out from the exhaust purification catalysts 20 and 24 becomes the stoichiometric air-fuel ratio.

In this way, when the exhaust purification catalysts 20, 24 store a certain extent of oxygen, even if the air-fuel ratio of the exhaust gas flowing into the exhaust purification catalysts 20, 24 deviates slightly from the stoichiometric air-fuel ratio to the rich side or lean side, the unburned gas and $NO_X$ are simultaneously removed and the air-fuel ratio of the exhaust gas flowing out from the exhaust purification catalysts 20, 24 becomes the stoichiometric air-fuel ratio.

<Explanation of Air-Fuel Ratio Sensor>

Figure 2:
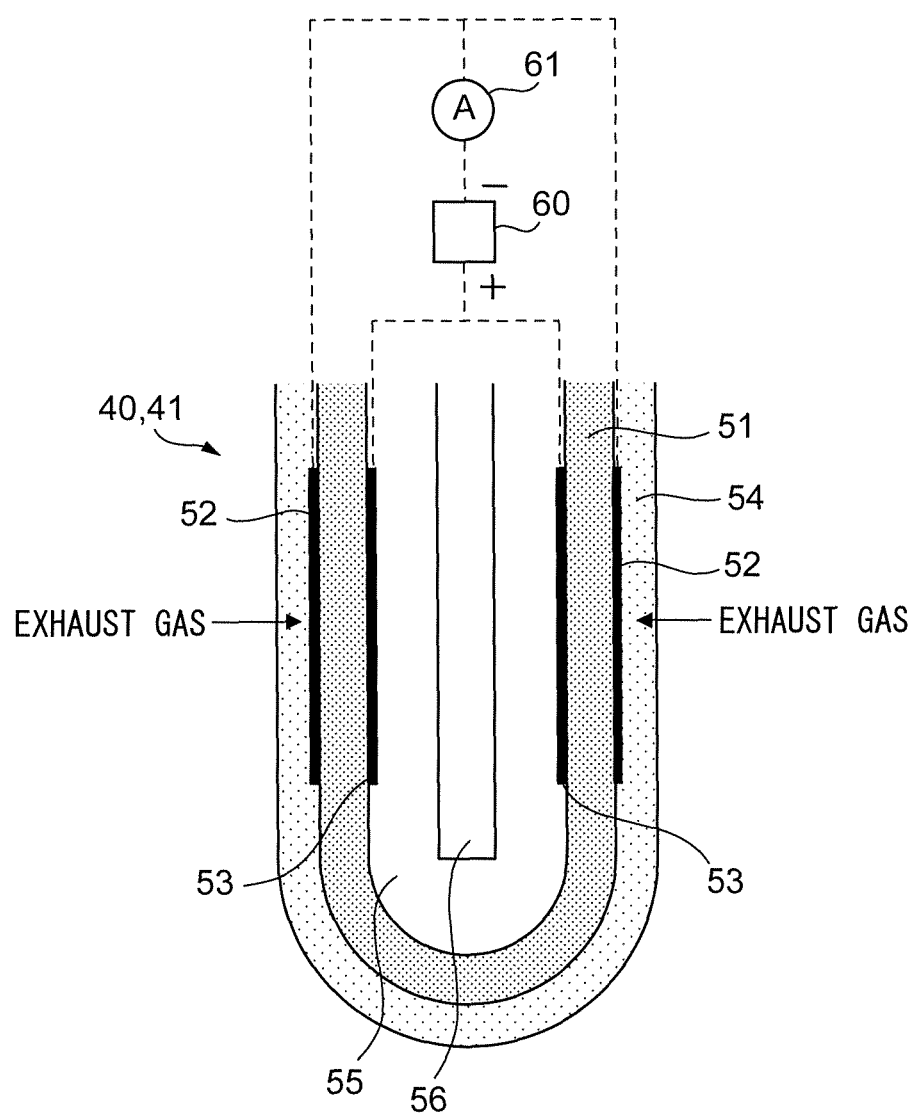
FIG. 2 is a schematic cross-sectional view of an air-fuel ratio sensor.

In the present embodiment, as the air-fuel ratio sensors 40 and 41, cup type limit current type air-fuel ratio sensors are used. Referring to FIG. 2, the structures of the air-fuel ratio sensors 40 and 41 are simply explained. Each of the air-fuel ratio sensors 40 and 41 comprises a solid electrolyte layer 51, an exhaust side electrode 52 arranged on one side surface of the solid electrolyte layer 51, an atmosphere side electrode 53 arranged on the other side surface of the solid electrolyte layer 51, a diffusion regulation layer 54 regulating the diffusion of the flowing exhaust gas, a reference gas chamber 55, and a heater part 56 heating the air-fuel ratio sensor 40 or 41, in particular the solid electrolyte layer 51.

In each of the cup type air-fuel ratio sensors 40 and 41 of the present embodiment, the solid electrolyte layer 51 is formed into a cylindrical shape with one closed end. Inside of the reference gas chamber 55 defined inside of the solid electrolyte layer 51, atmospheric gas (air) is introduced and the heater part 56 is arranged. On the inside surface of the solid electrolyte layer 51, an atmosphere side electrode 53 is arranged. On the outside surface of the solid electrolyte layer 51, an exhaust side electrode 52 is arranged. On the outside surfaces of the solid electrolyte layer 51 and the exhaust side electrode 52, a diffusion regulation layer 54 is arranged to cover the solid electrolyte layer 51 and the exhaust side electrode 52. Note that, at the outside of the diffusion regulation layer 54, a protective layer (not shown) may be provided for preventing a liquid etc. from depositing on the surface of the diffusion regulation layer 54.

The solid electrolyte layer 51 is formed by a sintered body of $ZrO_2$ (zirconia), $HfO_2$, $ThO_2$, $Bi_2O_3$, or other oxygen ion conducting oxide in which CaO, MgO, $Y_2O_3$, $Yb_2O_3$, etc. is blended as a stabilizer. Further, the diffusion regulation layer 54 is formed by a porous sintered body of alumina, magnesia, silica, spinel, mullite, or another heat resistant inorganic substance. Furthermore, the exhaust side electrode 52 and atmosphere side electrode 53 are formed by platinum or other precious metal with a high catalytic activity.

Further, between the exhaust side electrode 52 and the atmosphere side electrode 53, sensor applied voltage V is supplied by the voltage control device 60 mounted on the ECU 31. In addition, the ECU 31 comprises a current detection portion 61 which detects the current flowing between these electrodes 52 and 53 through the solid electrolyte layer 51 when the sensor applied voltage V is supplied. The current detected by this current detection portion 61 is the output current of the air-fuel ratio sensors 40 and 41.

Figure 3:
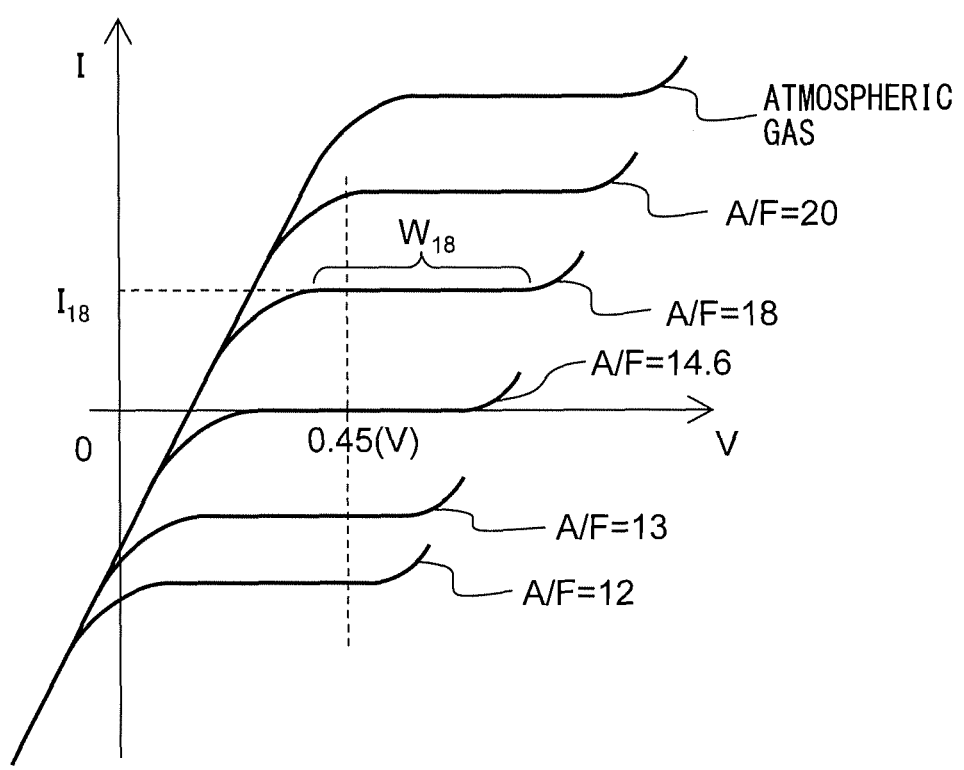
FIG. 3 is a view showing the relationship between a sensor applied voltage and output current at different exhaust air-fuel ratios.

The thus configured air-fuel ratio sensors 40 and 41 have the voltage-current (V-I) characteristic such as shown in FIG. 3. As will be understood from FIG. 3, the output current I of air-fuel ratio sensors 40 and 41 becomes larger the higher (the leaner) the air-fuel ratio of the exhaust gas, i.e., the exhaust air-fuel ratio A/F. Further, at the line V-I of each exhaust air-fuel ratio A/F, there is a region parallel to the sensor applied voltage V axis, that is, a region where the output current does not change much at all even if the sensor applied voltage V changes. This voltage region is called the "limit current region". The current at this time is called the "limit current". In FIG. 3, the limit current region and limit current when the exhaust air-fuel ratio is 18 are shown by $W_{18}$ and $I_{18}$.

Figure 4:
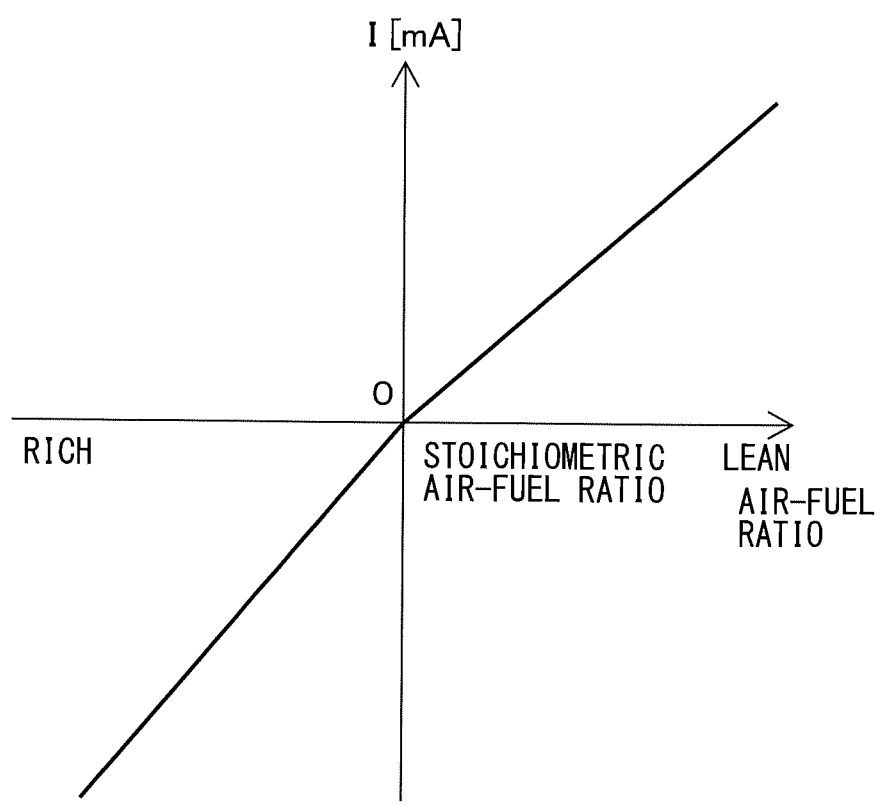
FIG. 4 is a view showing the relationship between an exhaust air-fuel ratio and output current when making the sensor applied voltage constant.

FIG. 4 shows the relationship between the exhaust air-fuel ratio and the output current I when making the applied voltage V constant at about 0.45V (FIG. 3). As will be understood from FIG. 4, in the air-fuel ratio sensors 40 and 41, the output current I changes linearly (proportionally) with respect to the exhaust air-fuel ratio so that the higher the exhaust air-fuel ratio (that is, the leaner), the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio.

Note that, as the air-fuel ratio sensors 40, 41, instead of the limit current type air-fuel ratio sensor of the structure shown in FIG. 2, for example, it is possible to use a stacked type limit current type air-fuel ratio sensor or a limit current type air-fuel ratio sensor of another structure. Further, as the air-fuel ratio sensors 40, 41, it is also possible to use an oxygen sensor detecting a concentration of oxygen without applying voltage across the electrodes.

<Air-Fuel Ratio Control>

Next, air-fuel ratio control performed by the control apparatus of the present embodiment will be explained. In the air-fuel ratio control of the present embodiment, main feedback control, sub feedback control, main feedback learning control (below, referred to as "main learning control"), and sub feedback learning control (below, referred to as "sub learning control") are performed.

In main feedback control, the output air-fuel ratio of the upstream side air-fuel ratio sensor 40 is used as the basis to control the amount of feed of fuel from the fuel injector 11 (that is, the amount of feed of fuel to the combustion chamber 5) so that the output air-fuel ratio of the upstream side air-fuel ratio sensor 40 becomes the target air-fuel ratio. In sub feedback control, the output air-fuel ratio of the downstream side air-fuel ratio sensor 41 etc. is used as the basis to switch the target air-fuel ratio between the rich air-fuel ratio and the lean air-fuel ratio. In the main learning control, the difference between the output air-fuel ratio of the upstream side air-fuel ratio sensor 40 and the target air-fuel ratio is used as the basis to calculate a main learning value changing in accordance with a steady deviation present between these air-fuel ratios, and the calculated main learning value is used as the basis to control the amount of feed of fuel from the fuel injector 11 so that the difference between the output air-fuel ratio of the upstream side air-fuel ratio sensor 40 and the target air-fuel ratio becomes smaller. In addition, in sub learning control, the output air-fuel ratio of the upstream side air-fuel ratio sensor 40 and the output air-fuel ratio of the downstream side air-fuel ratio sensor 41 are used as the basis to calculate a sub learning value changing in accordance with a difference between the output air-fuel ratio of the upstream side air-fuel ratio sensor 40 and the air-fuel ratio of the exhaust gas flowing into the upstream side exhaust purification catalyst 20, and the calculated sub learning value is used as the basis to control the amount of feed of fuel from the fuel injector 11 so that the difference between the target air-fuel ratio and the air-fuel ratio of the exhaust gas flowing into the upstream side exhaust purification catalyst 20 becomes smaller. Below, these control routines will be explained.

<Main Feedback Control>

First, the main feedback control will be explained. In main feedback control, as explained above, the output air-fuel ratio of the upstream side air-fuel ratio sensor 40 is used as the basis to control the amount of feed of fuel from the fuel injector 11 (that is, the amount of feed of fuel to the combustion chamber 5) so that the output air-fuel ratio of the upstream side air-fuel ratio sensor 40 becomes the target air-fuel ratio. In particular, in the present embodiment, proportional-integral-derivative control (PID control) is performed so that the air-fuel ratio deviation DAF which is the difference between the output air-fuel ratio of the upstream side air-fuel ratio sensor 40 and the target air-fuel ratio becomes smaller.

Specifically, in the present embodiment, the difference of the output air-fuel ratio AFup of the upstream side air-fuel ratio sensor 40 and the target air-fuel ratio is used as the basis to calculate the feedback correction amount (below, referred to as the "F/B correction amount") DFi. The F/B correction amount DFi is calculated based on the following formula (1) by proportional-integral-derivative processing (PID processing) of the air-fuel ratio deviation DAF:

$$DFi = Kp \cdot DAF + Ki \cdot SDAF + Kd \cdot DDAF \quad (1)$$

Note that, the above formula (1), Kp is a preset proportional gain (proportional constant), Ki is a preset integral gain (integral constant), and Kd is a preset derivative gain (derivative constant). Further, DDAF is a time derivative of the air-fuel ratio deviation DAF and is calculated by dividing the difference between the currently updated air-fuel ratio deviation DAF and the previously updated air-fuel ratio deviation DAF by a time corresponding to the update interval. Further, SDAF is the time integral of the air-fuel ratio deviation DAF. This time integral SDAF is calculated by adding the previously updated time integral SDAF and the currently updated air-fuel ratio deviation DAF (SDAF=SDAF+DAF).

On the other hand, as explained above, in the present embodiment, the target air-fuel ratio is not constant at all times. It alternately changes between a rich set air-fuel ratio richer than the stoichiometric air-fuel ratio and a lean set air-fuel ratio leaner than the stoichiometric air-fuel ratio. Therefore, in the present embodiment, the amount of air Mc fed to a cylinder (cylinder intake air amount) is calculated and the calculated cylinder intake air amount Mc is divided by the target air-fuel ratio to calculate a basic amount of feed of fuel Qbase.

The amount of feed of fuel Qi fed from the fuel injector 11 to the combustion chamber 5 is calculated by adding the basic amount of feed of fuel Qbase and an F/B correction amount DFi (Qi=Qbase+DFi). Therefore, if the target air-fuel ratio changes, the basic amount of feed of fuel Qbase changes and, as a result, the amount of feed of fuel Qi to each cylinder changes. On the other hand, when the amount of feed of fuel from the fuel injector 11 etc. includes error and the output air-fuel ratio of the upstream side air-fuel ratio sensor 40 and target air-fuel ratio do not match, the F/B correction amount DFi changes so that the output air-fuel ratio approaches the target air-fuel ratio and, as a result, the amount of feed of fuel Qi to a cylinder changes.

<Main Learning Control>

Next, main feedback learning control (main learning control) will be explained. Here, the amount of feed of fuel from the fuel injector 11 will not necessarily match the amount of feed of fuel demanded from the ECU 31. There is variation in the amount of feed of fuel between fuel injectors 11. The amounts of feed of fuel from all of the fuel injectors 11 sometimes deviate to the large side or small side from the demanded amount of feed of fuel. If such variation or deviation occurs, even if the output air-fuel ratio of the upstream side air-fuel ratio sensor 40 indicates the actual air-fuel ratio, there will be a steady deviation between the output air-fuel ratio of the upstream side air-fuel ratio sensor 40 and the target air-fuel ratio.

Therefore, in the main learning control, as explained above, the difference between the output air-fuel ratio of the upstream side air-fuel ratio sensor 40 and the target air-fuel ratio is used as the basis to calculate the main learning value changing in accordance with the steady deviation present between these air-fuel ratios. The main learning value changes to become greater than 0 when the output air-fuel ratio of the upstream side air-fuel ratio sensor 40 constantly become greater than the target air-fuel ratio (becomes leaner). Conversely, the output air-fuel ratio of the upstream side air-fuel ratio sensor 40 changes to become smaller than 0 when it constantly becomes smaller than the target air-fuel ratio (becomes richer). Further, the larger the absolute value of the steady deviation, the larger the absolute value of the main learning value.

Specifically, the main learning value mfbg is updated by the following formula (2) based on the time integral SDAF of the air-fuel ratio deviation DAF in main feedback control. Further, if the main learning value mfbg finishes being updated in this way, the time integral SDAF is changed by the following formula (3). Therefore, the time integral SDAF is decreased by exactly the amount of increase of the main learning value mfbg.

$$mfbg(n) = mfbg(n-1) + ka \cdot SDAF \qquad (2)$$

$$SDAF = (1-ka) \cdot SDAF \qquad (3)$$

Note that, in the above formula (2), "n" represents the number of calculations or time. Therefore, mfbg(n) is the current calculated value or the current learned value. In addition, ka in the above formula (2) and formula (3) is a gain expressing the extent by which to reflect the time integral SDAF in the main learning value mfbg, that is, the extent by which to reflect it in the amount of feed of fuel ($0 < ka \leq 1$). The larger the value of the gain ka, the larger the correction amount of the amount of feed of fuel.

In addition, in main learning control of the present embodiment, as explained above, the calculated main learning value mfbg is used as the basis to control the amount of feed of fuel from the fuel injector 11 so that the difference between the output air-fuel ratio of the upstream side air-fuel ratio sensor 40 and the target air-fuel ratio becomes smaller. Specifically, in calculating the amount of feed of fuel Qi fed from the fuel injector 11 to the combustion chamber 5, the above-mentioned basic amount of feed of fuel Qbase, F/B correction amount DFi, and main learning value mfbg are added (Qi=Qbase+DFi+mfbg(n)).

Figure 5:
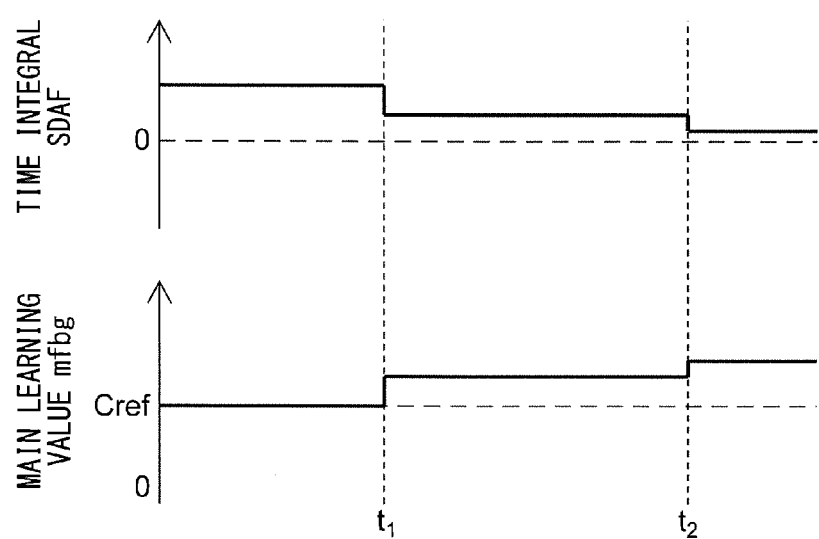
FIG. 5 is a time chart of a cumulative value of time of an air-fuel ratio deviation in main feedback control and a main learning value.

FIG. 5 is a time chart of the time integral SDAF of the air-fuel ratio deviation DAF and the main learning value mfbg in main feedback control. In the example shown in FIG. 5, before the time $t_1$, the main learning value mfbg is zero. On the other hand, there is a steady deviation between the output air-fuel ratio AFup of the upstream side air-fuel ratio sensor 40 and the target air-fuel ratio, so the time integral SDAF becomes a value away from zero.

After this, at the time $t_1$, the time integral SDAF is introduced to the main learning value mfbg. As a result, the main learning value mfbg is made to increase by exactly the time integral SDAF multiplied with the gain ka (ka·SDAF) at the time $t_1$ by the above formula (2). On the other hand, the time integral SDAF is decreased by the time integral SDAF multiplied with the gain ka (ka·SDAF) at the time $t_1$ by the above formula (3).

In the present embodiment, such an operation is performed at constant time intervals. Therefore, similar control is repeated even at the time $t_2$ after the elapse of a constant time from the time $t_1$. For this reason, a part of the time integral SDAF is introduced into the main learning value mfbg. As a result, the main learning value mfbg becomes a value showing the steady deviation between the output air-fuel ratio AFup of the upstream side air-fuel ratio sensor 40 and the target air-fuel ratio.

Here, the values of the parameters in the main feedback control (including time integral SDAF) are stored in a memory in the RAM 33 of the ECU 31 which is reset to zero when the ignition key of the internal combustion engine is turned off. On the other hand, the main learning value mfbg is stored in a memory in the RAM 33 of the ECU 31 which is not erased even if the ignition key of the internal combustion engine is turned off. Therefore, as explained above, it is possible to successively introduce a part of the time integral SDAF into the main learning value mfbg to compensate for the difference between the output air-fuel ratio of the upstream side air-fuel ratio sensor 40 and the target air-fuel ratio when starting up the internal combustion engine.

<Sub Feedback Control>

Next, sub feedback control will be explained. In sub feedback control, the output air-fuel ratio of the downstream side air-fuel ratio sensor 41 etc. are used as the basis to alternately set the target air-fuel ratio to a rich air-fuel ratio and a lean air-fuel ratio.

Specifically, when the output air-fuel ratio of the downstream side air-fuel ratio sensor 41 becomes a rich air-fuel ratio, the target air-fuel ratio is set to a lean set air-fuel ratio. As a result, the air-fuel ratio of the exhaust gas flowing into the upstream side exhaust purification catalyst 20 also becomes a lean set air-fuel ratio. Here, a lean set air-fuel ratio is a predetermined constant air-fuel ratio leaner by a certain extent than the stoichiometric air-fuel ratio (air-fuel ratio becoming control center), for example, is made 14.75 or so. Further, the lean set air-fuel ratio can be expressed as the air-fuel ratio forming the control center (in the present embodiment, stoichiometric air-fuel ratio) plus a positive air-fuel ratio correction amount. In addition, in the present embodiment, when the output air-fuel ratio of the downstream side air-fuel ratio sensor 41 becomes a rich judged air-fuel ratio (for example, 14.55) slightly richer than the stoichiometric air-fuel ratio or becomes less, it is judged that the output air-fuel ratio of the downstream side air-fuel ratio sensor 41 has become a rich air-fuel ratio.

In addition, in sub feedback control of the present embodiment, if the oxygen storage amount OSA of the upstream side exhaust purification catalyst 20 becomes a predetermined switching reference storage amount Cref smaller than the maximum storage amount of oxygen Cmax or becomes more, the target air-fuel ratio which had been a lean set air-fuel ratio up to then is set to a rich set air-fuel ratio. As a result, the air-fuel ratio of the exhaust gas flowing into the upstream side exhaust purification catalyst 20 also becomes a rich set air-fuel ratio. Here, a rich set air-fuel ratio is a predetermined air-fuel ratio a certain extent richer than the stoichiometric air-fuel ratio (air-fuel ratio becoming control center), for example, is made 14.50. Note that, in the present embodiment, the difference of the rich set air-fuel ratio from the stoichiometric air-fuel ratio (rich degree) is made a difference of the lean set air-fuel ratio from the stoichiometric air-fuel ratio (lean degree) or is made less.

Note that, the oxygen storage amount OSA of the upstream side exhaust purification catalyst 20 is estimated based on the cumulative value of the oxygen excess/deficiency of the exhaust gas flowing into the upstream side exhaust purification catalyst 20. Here, the "oxygen excess/deficiency" means the amount of oxygen becoming in excess or the amount of oxygen becoming deficient (amount of excess unburned gas) when trying to make the air-fuel ratio of the exhaust gas flowing into the upstream side exhaust purification catalyst 20 the stoichiometric air-fuel ratio. In particular, in the time period that the target air-fuel ratio is set to a lean set air-fuel ratio, the oxygen in the exhaust gas flowing into the upstream side exhaust purification catalyst 20 becomes excessive. This excess oxygen is stored in the upstream side exhaust purification catalyst 20. Therefore, the cumulative value of the oxygen excess/deficiency (below, referred to as the "cumulative oxygen excess/deficiency") during this time can be said to be the estimated value of the oxygen storage amount OSA of the upstream side exhaust purification catalyst 20.

The oxygen excess/deficiency is calculated based on the output air-fuel ratio of the upstream side air-fuel ratio sensor 40, the estimated value of the amount of air taken into the combustion chamber 5 calculated based on the output of the air flow rate detection device 39 etc., or the amount of feed of fuel from the fuel injector 11 etc. Specifically, the oxygen excess/deficiency OED is, for example, calculated by the following formula (4).

$$OED = 0.23 \times Qi \times (AFup - AFR) \qquad (4)$$

Here, 0.23 is the concentration of oxygen in air, Qi is the amount of feed of fuel, AFup is the output air-fuel ratio of the upstream side air-fuel ratio sensor 40, and AFR is the air-fuel ratio becoming the control center (in the present embodiment, basically the stoichiometric air-fuel ratio).

After this, if the output air-fuel ratio of the downstream side air-fuel ratio sensor 41 again becomes a rich judged air-fuel ratio or less, the target air-fuel ratio is again made a lean set air-fuel ratio. After this, a similar operation is repeated. In this way, in the sub feedback control of the present embodiment, the target air-fuel ratio of the exhaust gas flowing into the upstream side exhaust purification catalyst 20 is repeatedly alternately set between the lean set air-fuel ratio and rich set air-fuel ratio. In other words, in sub feedback control of the present embodiment, the output air-fuel ratio of the upstream side air-fuel ratio sensor 40 (that is, the air-fuel ratio of the exhaust gas flowing into the upstream side exhaust purification catalyst 20) is alternately switched between the rich air-fuel ratio and the lean air-fuel ratio.

<Explanation of Sub Feedback Control Using Time Chart>

Figure 6:
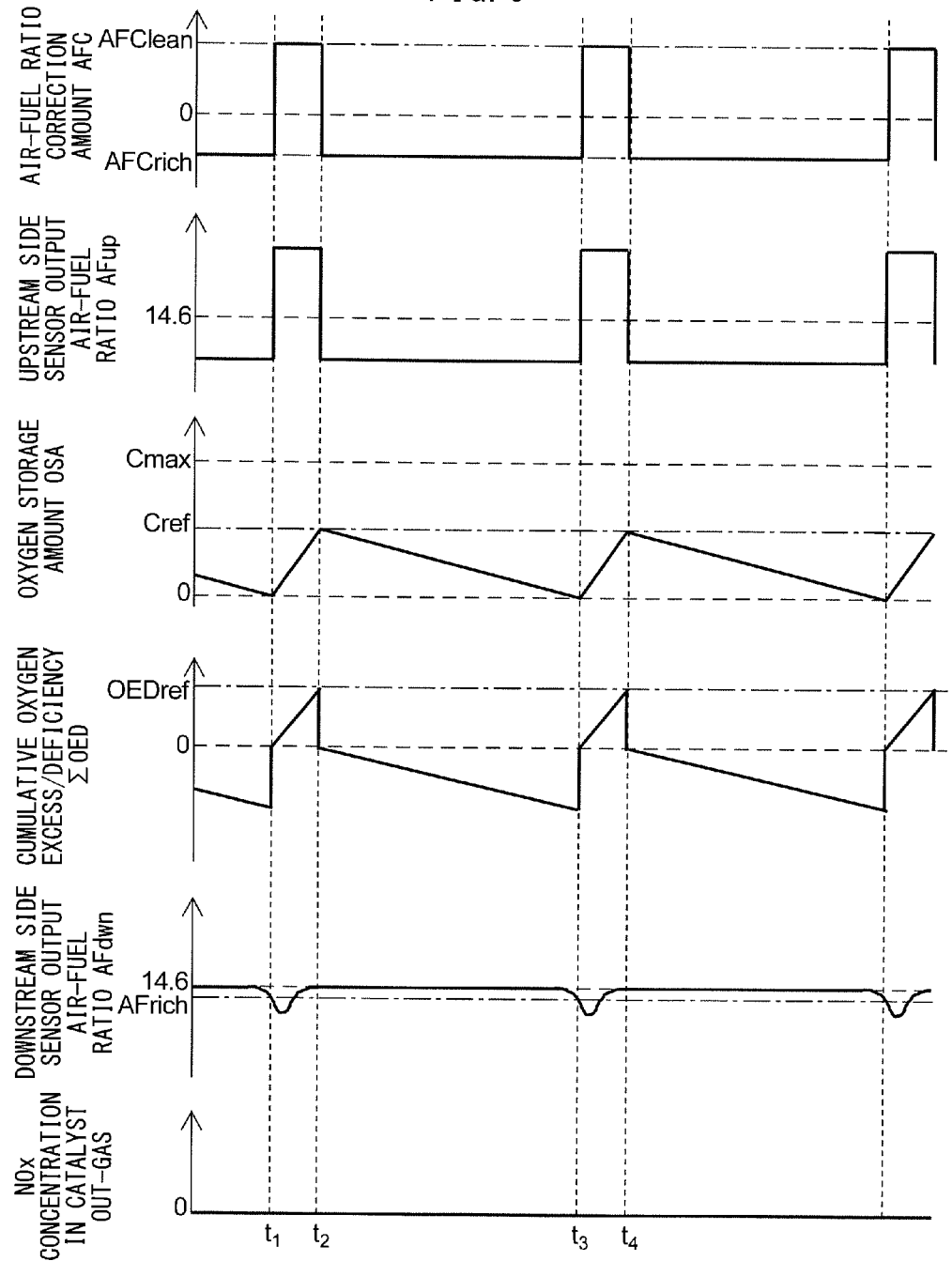
FIG. 6 is a time chart of an air-fuel ratio correction amount etc. in the case of performing sub feedback control of the present embodiment.

Referring to FIG. 6, the above-mentioned operation will be specifically explained. FIG. 6 is a time chart of the air-fuel ratio correction amount AFC, output air-fuel ratio AFup of the upstream side air-fuel ratio sensor 40, oxygen storage amount OSA of the upstream side exhaust purification catalyst 20, cumulative oxygen excess/deficiency ΣOED, output air-fuel ratio AFdwn of the downstream side air-fuel ratio sensor 41, and concentration of $NO_X$ in the exhaust gas flowing out from the upstream side exhaust purification catalyst 20 in the case of performing the sub feedback control of the present embodiment.

Note that, the air-fuel ratio correction amount AFC is the correction amount relating to the target air-fuel ratio of the exhaust gas flowing into the upstream side exhaust purification catalyst 20. When the air-fuel ratio correction amount AFC is 0, the target air-fuel ratio is made an air-fuel ratio equal to the air-fuel ratio becoming the center of control (below, referred to as a "control center air-fuel ratio") (in the present embodiment, basically the stoichiometric air-fuel ratio. On the other hand, when the air-fuel ratio correction amount AFC is a positive value, the target air-fuel ratio becomes an air-fuel ratio leaner than the control center air-fuel ratio (in the present embodiment, lean air-fuel ratio) while when the air-fuel ratio correction amount AFC is a negative value, the target air-fuel ratio becomes an air-fuel ratio richer than the control center air-fuel ratio (in the present embodiment, rich air-fuel ratio). Further, the "control center air-fuel ratio" means the air-fuel ratio to which the air-fuel ratio correction amount AFC is added according to the engine operating state, that is, the air-fuel ratio becoming a reference when changing the target air-fuel ratio in accordance with the air-fuel ratio correction amount AFC.

In the illustrated example, in the state before the time $t_1$, the air-fuel ratio correction amount AFC is made a rich set correction amount AFCrich (corresponding to the rich set air-fuel ratio). That is, the target air-fuel ratio is made a rich air-fuel ratio. Along with this, the output air-fuel ratio AFup of the upstream side air-fuel ratio sensor 40 becomes a rich air-fuel ratio. The unburned gas contained in the exhaust gas flowing into the upstream side exhaust purification catalyst 20 is removed by the upstream side exhaust purification catalyst 20. Along with this, the oxygen storage amount OSA of the upstream side exhaust purification catalyst 20 gradually decreases. Due to the purification action at the upstream side exhaust purification catalyst 20, the exhaust gas flowing out from the upstream side exhaust purification catalyst 20 does not contain unburned gas etc., so the output air-fuel ratio AFdwn of the downstream side air-fuel ratio sensor 41 becomes substantially the stoichiometric air-fuel ratio. At this time, the amount of $NO_X$ discharged from the upstream side exhaust purification catalyst 20 becomes substantially zero.

If the oxygen storage amount OSA of the upstream side exhaust purification catalyst 20 gradually decreases, the oxygen storage amount OSA approaches zero. Along with this, part of the unburned gas etc. flowing into the upstream side exhaust purification catalyst 20 starts to flow out without being removed by the upstream side exhaust purification catalyst 20. Due to this, the output air-fuel ratio AFdwn of the downstream side air-fuel ratio sensor 41 gradually falls. At the time $t_1$, the output air-fuel ratio AFdwn of the downstream side air-fuel ratio sensor 41 reaches the rich judged air-fuel ratio AFrich.

In the present embodiment, if the output air-fuel ratio AFdwn of the downstream side air-fuel ratio sensor 41 becomes the rich judged air-fuel ratio AFrich or less, the air-fuel ratio correction amount AFC is switched to a lean set correction amount AFClean (corresponding to the lean set air-fuel ratio) to increase the oxygen storage amount OSA. Further, at this time, the cumulative oxygen excess/deficiency ΣOED is reset to "0".

If switching the target air-fuel ratio to a lean air-fuel ratio at the time $t_1$, the air-fuel ratio of the exhaust gas flowing into the upstream side exhaust purification catalyst 20 changes from a rich air-fuel ratio to a lean air-fuel ratio. If at the time $t_1$ the air-fuel ratio of the exhaust gas flowing into the upstream side exhaust purification catalyst 20 changes to a lean air-fuel ratio, the oxygen storage amount OSA of the upstream side exhaust purification catalyst 20 increases.

Further, along with this, the cumulative oxygen excess/deficiency ΣOED also gradually increases.

Due to this, the air-fuel ratio of the exhaust gas flowing out from the upstream side exhaust purification catalyst 20 changes to the stoichiometric air-fuel ratio and the output air-fuel ratio AFdwn of the downstream side air-fuel ratio sensor 41 also converges to the stoichiometric air-fuel ratio. At this time, the air-fuel ratio of the exhaust gas flowing into the upstream side exhaust purification catalyst 20 is a lean air-fuel ratio, but there is a sufficient extra margin in the oxygen storage capacity of the upstream side exhaust purification catalyst 20, so the oxygen in the inflowing exhaust gas is stored in the upstream side exhaust purification catalyst 20 and the $NO_X$ is removed by reduction. For this reason, the discharge of $NO_X$ from the upstream side exhaust purification catalyst 20 becomes substantially zero.

After this, if the oxygen storage amount OSA of the upstream side exhaust purification catalyst 20 increases, at the time $t_2$, the oxygen storage amount OSA of the upstream side exhaust purification catalyst 20 reaches the switching reference storage amount Cref. For this reason, the estimated value of the oxygen storage amount OSA, that is, the cumulative oxygen excess/deficiency ΣOED, reaches the switching reference value OEDref corresponding to the switching reference storage amount Cref. In the present embodiment, if the cumulative oxygen excess/deficiency ΣOED becomes the switching reference value OEDref or more, the air-fuel ratio correction amount AFC is switched to the rich set correction amount AFCrich to stop the storage of oxygen in the upstream side exhaust purification catalyst 20. Therefore, the target air-fuel ratio is made a rich air-fuel ratio. Further, at this time, the cumulative oxygen excess/deficiency ΣOED is reset to "0".

Note that, the switching reference storage amount Cref is made ¾ or less of the maximum storage amount of oxygen Cmax when the upstream side exhaust purification catalyst 20 is unused, preferably ½ or less, more preferably ⅕ or less. As a result, the air-fuel ratio correction amount AFC is switched to the rich set correction amount AFCrich before the output air-fuel ratio AFdwn of the downstream side air-fuel ratio sensor 41 reaches a lean judged air-fuel ratio slightly leaner than the stoichiometric air-fuel ratio (for example, 14.65. lean air-fuel ratio with difference from stoichiometric air-fuel ratio of same extent as difference between rich judged air-fuel ratio and stoichiometric air-fuel ratio).

If at the time $t_2$ the target air-fuel ratio is switched to the rich air-fuel ratio, the air-fuel ratio of the exhaust gas flowing into the upstream side exhaust purification catalyst 20 changes from the lean air-fuel ratio to the rich air-fuel ratio. The exhaust gas flowing into the upstream side exhaust purification catalyst 20 contains unburned gas etc., so the oxygen storage amount OSA of the upstream side exhaust purification catalyst 20 gradually decreases. The discharge of $NO_X$ from the upstream side exhaust purification catalyst 20 at this time becomes substantially zero.

If the oxygen storage amount OSA of the upstream side exhaust purification catalyst 20 gradually decreases, at the time $t_3$, in the same way as at the time $t_1$, the output air-fuel ratio AFdwn of the downstream side air-fuel ratio sensor 41 reaches the rich judged air-fuel ratio AFrich. Due to this, the air-fuel ratio correction amount AFC is switched to the lean set correction amount AFClean. After this, the above-mentioned cycle of the times $t_1$ to $t_3$ is repeated.

As will be understood from the above explanation, according to the sub feedback control of the present embodiment, it is possible to constantly suppress the amount of discharge of $NO_X$ from the upstream side exhaust purification catalyst 20. That is, so long as performing the above-mentioned control, basically, the amount of discharge of $NO_X$ from the upstream side exhaust purification catalyst 20 can be made substantially zero. Further, the cumulative addition time when calculating the cumulative oxygen excess/deficiency is short, so compared with when cumulatively adding the values over a long time, there is less likelihood of calculation error. For this reason, $NO_X$ is kept from ending up being discharged due to calculation error of the cumulative oxygen excess/deficiency.

Note that, in the above embodiment, at the times $t_1$ to $t_2$, the air-fuel ratio correction amount AFC is maintained at the lean set correction amount AFClean. However, in such a time, the air-fuel ratio correction amount AFC does not necessarily have to be maintained constant. It may be set to fluctuate such as being made to gradually decrease. Alternatively, in the time of the times $t_1$ to $t_2$, the air-fuel ratio correction amount AFC may be temporarily made a value smaller than 0 (for example, rich set correction amount etc.)

Similarly, in the above embodiment, at the times $t_2$ to $t_3$, the air-fuel ratio correction amount AFC is maintained at the rich set correction amount AFCrich. However, in this time, the air-fuel ratio correction amount AFC does not necessarily have to be maintained constant. It may be set to fluctuate such as being made to gradually increase. Alternatively, in the time of the times $t_2$ to $t_3$, the air-fuel ratio correction amount AFC may be temporarily made a value larger than 0 (for example, lean set correction amount etc.)

Note that, the control of the air-fuel ratio correction amount AFC in such an embodiment, that is, the control of the target air-fuel ratio, is performed by the ECU 31 functioning as a control apparatus. Therefore, the ECU 31 can be said to perform sub feedback control where when the air-fuel ratio of the exhaust gas detected by the downstream side air-fuel ratio sensor 41 becomes a rich judged air-fuel ratio or less, it continuously or intermittently sets the target air-fuel ratio of the exhaust gas flowing into the upstream side exhaust purification catalyst 20 to a lean air-fuel ratio until the oxygen storage amount OSA of the upstream side exhaust purification catalyst 20 becomes the switching reference storage amount Cref or more and where when it is estimated that the oxygen storage amount OSA of the upstream side exhaust purification catalyst 20 has become the switching reference storage amount Cref or more, it continuously or intermittently sets the target air-fuel ratio to a rich air-fuel ratio until the air-fuel ratio of the exhaust gas detected by the downstream side air-fuel ratio sensor 41 becomes a rich judged air-fuel ratio or less without the oxygen storage amount OSA reaching the maximum storage amount of oxygen Cmax.

More simply speaking, in sub feedback control of the present embodiment, when the air-fuel ratio detected by the downstream side air-fuel ratio sensor 41 becomes a rich judged air-fuel ratio or less, the target air-fuel ratio is switched to the lean air-fuel ratio, while when the oxygen storage amount OSA of the upstream side exhaust purification catalyst 20 becomes a switching reference storage amount Cref or more, the target air-fuel ratio is switched to the rich air-fuel ratio.

Note that, in the above embodiment, at sub feedback control, when the output air-fuel ratio AFdwn of the downstream side air-fuel ratio sensor 41 becomes the rich judged air-fuel ratio AFrich or less, the target air-fuel ratio is switched to a lean air-fuel ratio. Further, when the cumulative oxygen excess/deficiency ΣOED becomes a predetermined switching reference value OEDref or more, the target air-fuel ratio is switched to a rich air-fuel ratio. However, other control may also be performed as sub feedback control. As such other control, for example, control for switching the target air-fuel ratio to a rich air-fuel ratio when the output air-fuel ratio AFdwn of the downstream side air-fuel ratio sensor 41 becomes the lean judged air-fuel ratio or more and switching the target air-fuel ratio to a lean air-fuel ratio when the output air-fuel ratio AFdwn of the downstream side air-fuel ratio sensor 41 becomes a rich judged air-fuel ratio or less may be considered.

<Deviation at Upstream Side Air Fuel Ratio Sensor>

When the engine body 1 has a plurality of cylinders, due to a shape error of each fuel injector 11, etc., sometimes a slight deviation occurs between the cylinders in the air-fuel ratio of the exhaust gas which is exhausted from the cylinders. On the other hand, the upstream side air-fuel ratio sensor 40 is arranged at the header of the exhaust manifold 19, but depending on the position of arrangement, the extent by which the exhaust gas exhausted from each cylinder is exposed to the upstream side air-fuel ratio sensor 40 differs between cylinders. As a result, the output air-fuel ratio of the upstream side air-fuel ratio sensor 40 is strongly affected by the air-fuel ratio of the exhaust gas exhausted from a certain specific cylinder. Therefore, when the air-fuel ratio of the exhaust gas exhausted from a certain specific cylinder becomes an air-fuel ratio which differs from the average air-fuel ratio of the exhaust gas exhausted from all cylinders, deviation occurs between the average air-fuel ratio and the output air-fuel ratio of the upstream side air-fuel ratio sensor 40. That is, the output air-fuel ratio of the upstream side air-fuel ratio sensor 40 deviates to the rich side or lean side from the average air-fuel ratio of the actual exhaust gas.

Further, hydrogen of the unburned gas, etc., passes through the diffusion regulation layers 54 of the air-fuel ratio sensors 40 and 41 in fast speed. Therefore, if the concentration of hydrogen in the exhaust gas is high, the output air-fuel ratio of the upstream side air-fuel ratio sensor 40 deviates to the lower side (i.e., the richer side) than the actual air-fuel ratio of the exhaust gas.

If deviation occurs in the output air-fuel ratio of the upstream side air-fuel ratio sensor 40 in this way, even if the above mentioned sub feedback control is performed, sometimes $NO_X$ and oxygen flow out from the upstream side exhaust purification catalyst 20 or a frequency of the unburned gas, etc., flowing out therefrom becomes higher. This phenomenon will be explained with reference to FIG. 7 below.

Figure 7:
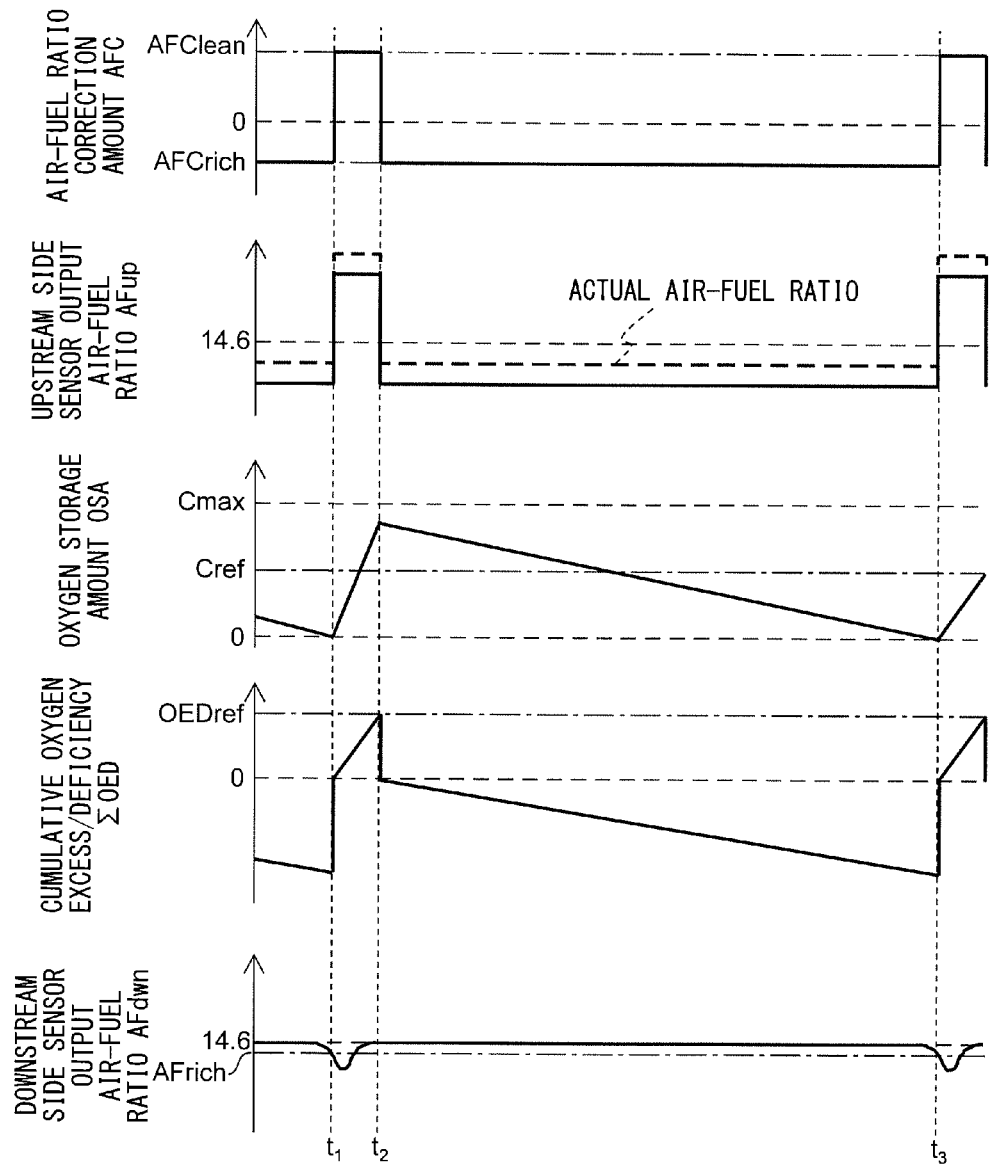
FIG. 7 is a time chart of an air-fuel ratio correction amount etc. similar to FIG. 6 in the case where deviation occurs in the output air-fuel ratio of the upstream side air-fuel ratio sensor.

FIG. 7 is a time chart of the oxygen storage amount OSA of the upstream side exhaust purification catalyst 20, etc., similar to FIG. 6. FIG. 7 shows the case where the output air-fuel ratio of the upstream side air-fuel ratio sensor 40 deviates to the rich side. In the figure, the solid line in the output air-fuel ratio AFup of the upstream side air-fuel ratio sensor 40 shows the output air-fuel ratio of the upstream side air-fuel ratio sensor 40. On the other hand, the broken line shows the actual air-fuel ratio of the exhaust gas flowing around the upstream side air-fuel ratio sensor 40.

In the example shown in FIG. 7 as well, in the state before the time $t_1$, the air-fuel ratio correction amount AFC is set to the rich set correction amount AFCrich, and therefore the target air-fuel ratio is set to the rich set air-fuel ratio. In this time, an amount of fuel supplied from the fuel injector 11 is controlled so that the output air-fuel ratio AFup of the upstream side air-fuel ratio sensor 40 becomes the rich set air-fuel ratio by the above mentioned main feedback control and main learning control. Therefore, the output air-fuel ratio AFup of the upstream side air-fuel ratio sensor 40 becomes an air-fuel ratio equal to the rich set air-fuel ratio. However, since, as explained above, the output air-fuel ratio AFup of the upstream side air-fuel ratio sensor 40 deviates to the rich side, the actual air-fuel ratio of the exhaust gas becomes an air-fuel ratio leaner than the rich set air-fuel ratio. That is, the output air-fuel ratio AFup of the upstream side air-fuel ratio sensor 40 becomes lower (richer) than the actual air-fuel ratio (broken line in the figure). For this reason, the decreasing speed of the oxygen storage amount OSA of the upstream side exhaust purification catalyst 20 becomes slower.

Further, in the example shown in FIG. 7, at the time $t_1$, the output air-fuel ratio AFdown of the downstream side air-fuel ratio sensor 41 reaches the rich judged air-fuel ratio AFrich. Therefore, as explained above, at the time $t_1$, the air-fuel ratio correction amount AFC is switched to the lean set correction amount AFClean. Accordingly, the target air-fuel ratio is switched to the lean set air-fuel ratio.

Along with this, the output air-fuel ratio AFup of the upstream side air-fuel ratio sensor 40 becomes an air-fuel ratio equal to the lean set air-fuel ratio by the above mentioned main feedback control and main learning control. However, as explained above, the output air-fuel ratio AFup of the upstream side air-fuel ratio sensor 40 deviates to the rich side, and therefore the actual air-fuel ratio of the exhaust gas becomes an air-fuel ratio leaner than the lean set air-fuel ratio. That is, the output air-fuel ratio AFup of the upstream side air-fuel ratio sensor 40 becomes lower (richer) than the actual air-fuel ratio (broken line in the drawing) Therefore, the increasing speed of the oxygen storage amount OSA of the upstream side exhaust purification catalyst 20 becomes faster, and the actual oxygen amount supplied to the upstream side exhaust purification catalyst 20 while the target air-fuel ratio is set to the lean set air-fuel ratio becomes larger than the switching reference storage amount Cref.

In this way, if deviation occurs in the output air-fuel ratio AFup of the upstream side air-fuel ratio sensor 40, when the air-fuel ratio correction amount AFC is set to the lean set correction amount AFClean, the lean degree of the air-fuel ratio of the exhaust gas flowing into the upstream side exhaust purification catalyst 20 is made larger. For this reason, even if the oxygen storage amount OSA of the upstream side exhaust purification catalyst 20 does not reach the maximum storage amount of oxygen Cmax, sometimes it is not possible to store all of the oxygen flowing into the upstream side exhaust purification catalyst 20 and $NO_X$ and oxygen ends up flowing out from the upstream side exhaust purification catalyst 20. Further, at the time $t_2$, the oxygen storage amount OSA of the upstream side exhaust purification catalyst 20 becomes the switching reference storage amount Cref or more. Near the time $t_2$, if any unintended deviation of the air-fuel ratio occurs, there is a possibility of $NO_X$ and oxygen flowing out from the upstream side exhaust purification catalyst 20.

From the above, it becomes necessary to detect deviation in the output air-fuel ratio AFup of the upstream side air-fuel ratio sensor 40 and is necessary to correct the output air-fuel ratio etc. based on the detected deviation.

<Sub Learning Control>

Therefore, in the present embodiment, sub feedback learning control (sub learning control) is performed to compensate for deviation in the output air-fuel ratio AFup of the upstream side air-fuel ratio sensor 40. Sub learning control includes sub learning basic control and stuck learning control. Below, first, sub learning basic control will be explained. In sub learning basic control, as explained above, the output air-fuel ratio AFup of the upstream side air-fuel ratio sensor 40 and the output air-fuel ratio AFdwn of the downstream side air-fuel ratio sensor 41 are used as the basis to calculate the sub learning value changing in accordance with the difference between the output air-fuel ratio AFup of the upstream side air-fuel ratio sensor 40 and the air-fuel ratio of the exhaust gas flowing into the upstream side exhaust purification catalyst 20. In addition, the calculated sub learning value is used as the basis to control the amount of feed of fuel from the fuel injector 11 so that the difference between the output air-fuel ratio AFup of the upstream side air-fuel ratio sensor 40 and the air-fuel ratio of the exhaust gas flowing into the upstream side exhaust purification catalyst 20 becomes smaller. Below, this sub feedback learning control will be explained.

Figure 8:
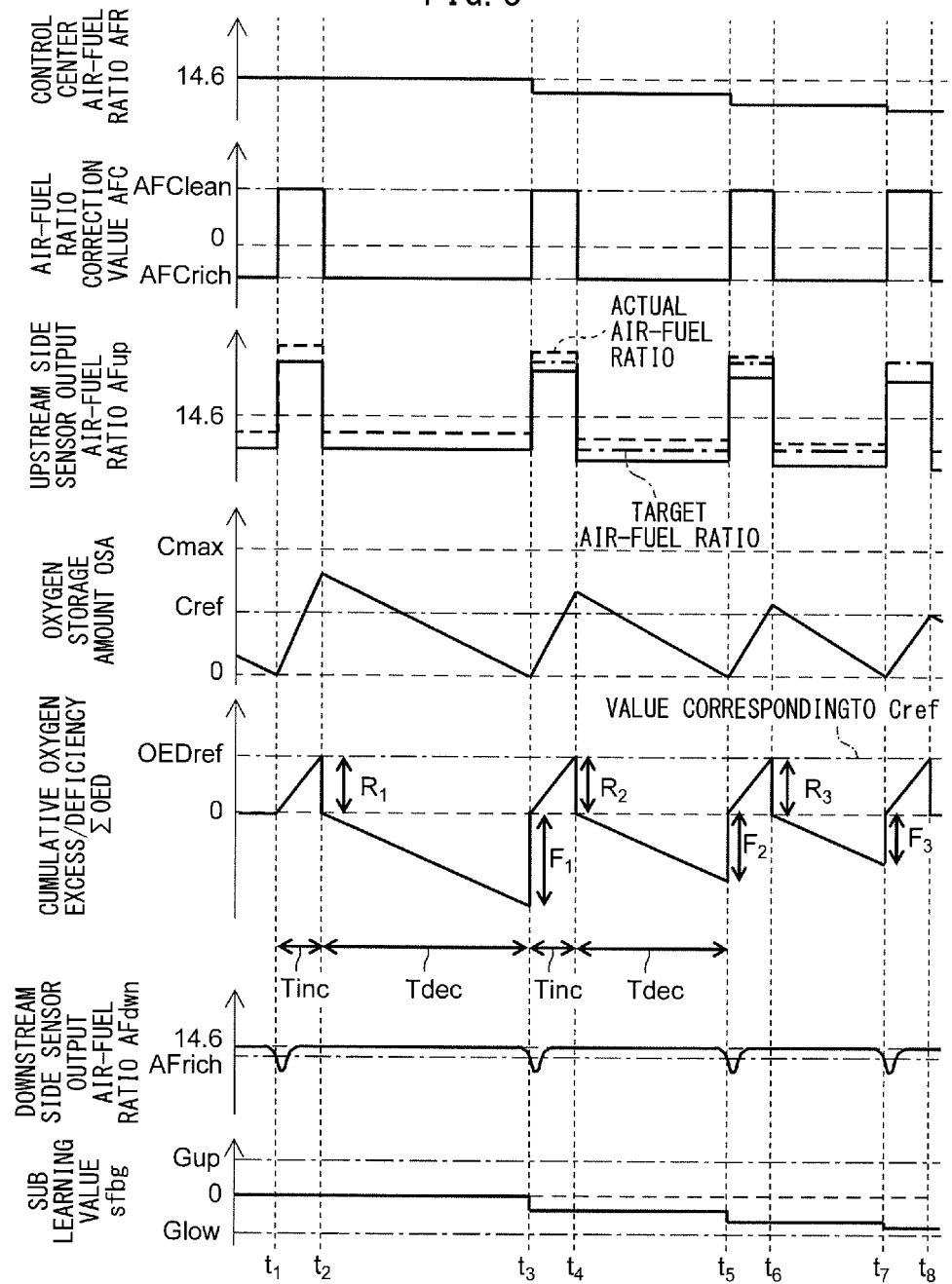
FIG. 8 is a time chart of a control center air-fuel ratio etc. in the case where deviation occurs in the output air-fuel ratio of the upstream side air-fuel ratio sensor.

Here, the time from when switching the target air-fuel ratio to the lean air-fuel ratio to when the cumulative oxygen excess/deficiency ΣOED becomes the switching reference value OEDref or more, that is, the time until again switching the target air-fuel ratio to a rich air-fuel ratio, is made the "oxygen increase time". Similarly, the time from when switching the target air-fuel ratio to a rich air-fuel ratio to when the output air-fuel ratio AFup of the downstream side air-fuel ratio sensor 41 becomes the rich judged air-fuel ratio or less, that is, the time until again switching the target air-fuel ratio to a lean air-fuel ratio, is made the "oxygen decrease time". In the sub learning basic control of the present embodiment, the cumulative oxygen excess amount is calculated as the absolute value of the cumulative oxygen excess/deficiency ΣOED in the oxygen increase time. Note that, the cumulative oxygen excess amount expresses the cumulative value of the amount of oxygen becoming in excess if trying to make the air-fuel ratio of the exhaust gas flowing into the upstream side exhaust purification catalyst 20 the stoichiometric air-fuel ratio in the oxygen increase time. In addition, in the sub learning basic control of the present embodiment, the cumulative oxygen deficiency amount is calculated as the absolute value of the cumulative oxygen excess/deficiency ΣOED in the oxygen decrease time. Note that, the cumulative oxygen deficiency amount expresses the cumulative value of the amount of oxygen becoming deficient if trying to make the air-fuel ratio of the exhaust gas flowing into the upstream side exhaust purification catalyst 20 the stoichiometric air-fuel ratio in the oxygen decrease time. Further, the control center air-fuel ratio AFR is corrected so that the difference between these cumulative oxygen excess amount and cumulative oxygen deficiency amount becomes smaller. FIG. 8 shows this state.

FIG. 8 is a time chart of the control center air-fuel ratio AFR, the air-fuel ratio correction amount AFC, the output air-fuel ratio AFup of the upstream side air-fuel ratio sensor 40, the oxygen storage amount OSA of the upstream side exhaust purification catalyst 20, the cumulative oxygen excess/deficiency ΣOED, the output air-fuel ratio AFdwn of the downstream side air-fuel ratio sensor 41, and the sub learning value sfbg. FIG. 8 shows the case, like FIG. 7, where the output air-fuel ratio AFup of the upstream side air-fuel ratio sensor 40 deviates to the low side (rich side). Note that, the sub learning value sfbg is a value which changes in accordance with the deviation of the output air-fuel ratio AFup of the upstream side air-fuel ratio sensor 40 and is used for correction of the control center air-fuel ratio AFR in the present embodiment. Further, in the figure, the solid line in the output air-fuel ratio AFup of the upstream side air-fuel ratio sensor 40 indicates the output air-fuel ratio of the upstream side air-fuel ratio sensor 40, and the broken line indicates the actual air-fuel ratio of the exhaust gas flowing around the upstream side air-fuel ratio sensor 40. Further, the one-dot chain line indicates the target air-fuel ratio, i.e., an air-fuel ratio wherein the air-fuel ratio correction amount AFC is added to the stoichiometric air-fuel ratio (a basic control center air-fuel ratio stated below).

In the example shown in FIG. 8, similarly to FIGS. 6 and 7, in the state before the time $t_1$, the control center air-fuel ratio is set to the stoichiometric air-fuel ratio, and the air-fuel ratio correction amount AFC is set to the rich set correction amount AFCrich. At this time, the output air-fuel ratio AFup of the upstream side air-fuel ratio sensor 40, as shown by the solid line, becomes an air-fuel ratio corresponding to the rich set air-fuel ratio. However, since the output air-fuel ratio AFup of the upstream side air-fuel ratio sensor 40 deviates, the actual air-fuel ratio of the exhaust gas is an air-fuel ratio leaner than the rich set air-fuel ratio (the broken line in FIG. 8). However, in the example shown in FIG. 8, as will be understood from the broken line of FIG. 8, the actual air-fuel ratio of the exhaust gas before the time $t_1$ becomes a rich air-fuel ratio leaner than the rich set air-fuel ratio. Therefore, the oxygen storage amount of the upstream side exhaust purification catalyst 20 is gradually decreased.

At the time $t_1$, the output air-fuel ratio AFdwn of the downstream side air-fuel ratio sensor 41 reaches the rich judged air-fuel ratio AFrich. Due to this, as explained above, the air-fuel ratio correction amount AFC is switched to the lean set correction amount AFClean. After the time $t_1$, the output air-fuel ratio AFup of the upstream side air-fuel ratio sensor 40 becomes an air-fuel ratio corresponding to the lean set air-fuel ratio. However, due to deviation of the output air-fuel ratio AFup of the upstream side air-fuel ratio sensor 40, the actual air-fuel ratio of the exhaust gas becomes an air-fuel ratio leaner than the lean set air-fuel ratio, that is, an air-fuel ratio with a great lean degree (see broken line of FIG. 8). Therefore, the oxygen storage amount OSA of the upstream side exhaust purification catalyst 20 rapidly increases.

On the other hand, the oxygen excess/deficiency OED is calculated based on the output air-fuel ratio AFup of the upstream side air-fuel ratio sensor 40. However, as explained above, deviation occurs in the output air-fuel ratio AFup of the upstream side air-fuel ratio sensor 40. Therefore, the calculated oxygen excess/deficiency OED becomes a value smaller than the actual oxygen excess/deficiency OED (i.e., a smaller amount of oxygen). As a result, the cumulative oxygen excess/deficiency ΣOED becomes smaller than the actual oxygen storage amount OSA.

At the time $t_2$, the cumulative oxygen excess/deficiency ΣOED reaches the switching reference value OEDref. Therefore, the air-fuel ratio correction amount AFC is switched to the rich set correction amount AFCrich. Therefore, the target air-fuel ratio is set to the rich air-fuel ratio. At this time, the actual oxygen storage amount OSA, as shown in FIG. 8, becomes greater than the switching reference storage amount Cref.

After the time $t_2$, similarly to the state before the time $t_1$, the air-fuel ratio correction amount AFC is set to the rich set correction amount AFCrich and accordingly the target air-fuel ratio is set to the rich air-fuel ratio. At this time as well, the actual air-fuel ratio of the exhaust gas is an air-fuel ratio leaner than the rich set air-fuel ratio. As a result, the upstream side exhaust purification catalyst 20 becomes slower in speed of decrease of the oxygen storage amount OSA. In addition, as explained above, at the time $t_2$, the actual oxygen storage amount OSA of the upstream side exhaust purification catalyst 20 becomes greater than the switching reference storage amount Cref. Therefore, time is taken until the actual oxygen storage amount OSA of the upstream side exhaust purification catalyst 20 reaches zero.

At the time $t_3$, the output air-fuel ratio AFdwn of the downstream side air-fuel ratio sensor 41 reaches the rich judged air-fuel ratio AFrich. Due to this, as explained above, the air-fuel ratio correction amount AFC is switched to the lean set correction amount AFClean. Therefore, the target air-fuel ratio is switched from the rich set air-fuel ratio to the lean set air-fuel ratio.

In this regard, in the present embodiment, as explained above, the cumulative oxygen excess/deficiency ΣOED is calculated from the time $t_1$ to the time $t_2$. In this regard, if referring to the time period from when the target air-fuel ratio is switched to the lean air-fuel ratio (time $t_1$) to when the estimated value of the oxygen storage amount OSA of the upstream side exhaust purification catalyst 20 becomes the switching reference storage amount Cref or more (time $t_2$), as the "oxygen increase time period Tinc", in the present embodiment, the cumulative oxygen excess/deficiency ΣOED is calculated in the oxygen increase time period Tinc. In FIG. 8, the absolute value (a cumulative oxygen excess amount) of the cumulative oxygen excess/deficiency ΣOED in the oxygen increase time period Tinc from the time $t_1$ to time $t_2$ is shown as $R_1$.

This cumulative oxygen excess amount $R_1$ corresponds to the oxygen storage amount OSA at the time $t_2$. However, as explained above, estimation of the oxygen excess/deficiency OED uses the output air-fuel ratio AFup of the upstream side air-fuel ratio sensor 40, and deviation occurs in this output air-fuel ratio AFup. Therefore, in the example shown in FIG. 8, the cumulative oxygen excess amount $R_1$ from the time $t_1$ to time $t_2$ becomes smaller than the value which corresponds to the actual oxygen storage amount OSA at the time $t_2$.

Further, in the present embodiment, the cumulative oxygen excess/deficiency ΣOED is also calculated from the time $t_2$ to time $t_3$. In this regard, if referring to the time period from when the target air-fuel ratio is switched to the rich air-fuel ratio (time $t_2$) to when the output air-fuel ratio AFdwn of the downstream side air-fuel ratio sensor 41 reaches the rich judged air-fuel ratio AFrich (time $t_3$), as the "oxygen decrease time period Tdec", in the present embodiment, the cumulative oxygen excess/deficiency ΣOED is calculated in the oxygen decrease time period Tdec. In FIG. 8, the absolute value (a cumulative oxygen deficiency amount) of the cumulative oxygen excess/deficiency ΣOED in the oxygen decrease time period Tdec from the time $t_2$ to time $t_3$ is shown as $F_1$.

This cumulative oxygen deficiency amount $F_1$ corresponds to the total oxygen amount released from the upstream side exhaust purification catalyst 20 from the time $t_2$ to the time $t_3$. However, as explained above, deviation occurs in the output air-fuel ratio AFup of the upstream side air-fuel ratio sensor 40. Therefore, in the example shown in FIG. 8, the cumulative oxygen deficiency amount $F_1$ from the time $t_2$ to time $t_3$ is larger than the value which corresponds to the total amount of oxygen actually released from the upstream side exhaust purification catalyst 20 from the time $t_2$ to the time $t_3$.

Here, in the oxygen increase time Tinc, the upstream side exhaust purification catalyst 20 stores oxygen, while in the oxygen decrease time Tdec, the stored oxygen is completely released. Therefore, ideally the cumulative oxygen excess amount $R_1$ and the cumulative oxygen deficiency amount $F_1$ basically become the same values. In this regard, as explained above, if deviation occurs in the output air-fuel ratio AFup of the upstream side air-fuel ratio sensor 40, the values of these cumulative values also correspondingly change. As explained above, if the output air-fuel ratio AFup of the upstream side air-fuel ratio sensor 40 deviates to the low side (rich side) from the actual air-fuel ratio, the cumulative oxygen deficiency amount $F_1$ becomes greater than the cumulative oxygen excess amount $R_1$. Conversely, if the output air-fuel ratio AFup of the upstream side air-fuel ratio sensor 40 deviates to the high side (lean side) from the actual air-fuel ratio, the cumulative oxygen deficiency amount $F_1$ becomes smaller than the cumulative oxygen excess amount $R_1$. In addition, the difference ΔΣOED(=$R_1$−$F_1$, below, referred to as an "excess/deficiency error") between the cumulative oxygen excess amount $R_1$ and the cumulative oxygen deficiency amount $F_1$ expresses the extent of deviation at the output air-fuel ratio AFup of the upstream side air-fuel ratio sensor 40. It can be said that the larger this excess/deficiency error ΔΣOED, the greater the deviation at the output air-fuel ratio AFup of the upstream side air-fuel ratio sensor 40. In other words, it can be said that the excess/deficiency error ΔΣOED expresses the difference between the output air-fuel ratio AFup of the upstream side air-fuel ratio sensor 40 and the actual air-fuel ratio of the exhaust gas flowing into the upstream side exhaust purification catalyst 20.

Therefore, in the present embodiment, based on the excess/deficiency error ΔΣOED, the control center air-fuel ratio AFR is corrected. In particular, in the present embodiment, the control center air-fuel ratio AFR is corrected so that the difference ΔΣOED between the cumulative oxygen excess amount $R_1$ and the cumulative oxygen deficiency amount $F_1$ becomes smaller.

Specifically, in the present embodiment, the sub learning value sfbg is calculated by the following formula (5), and the control center air-fuel ratio AFR is corrected by the following formula (6).

$$sfbg(n)=sfbg(n-1)+kb\cdot\Delta\Sigma OED \qquad (5)$$

$$AFR=AFRbase+sfbg(n) \qquad (6)$$

Note that, in the above formula (5), "n" expresses the number of calculations or time. Therefore, sfbg(n) is the current calculated value or current sub learning value. In addition, "kb" in the above formula (5) is the gain which shows the extent by which the excess/deficiency error ΔΣOED is reflected in the control center air-fuel ratio AFR (0<kb≤1). The larger the value of the gain "kb", the larger the correction amount of the control center air-fuel ratio AFR. In addition, in the above formula (6), the base control center air-fuel ratio AFRbase is a control center air-fuel ratio which is used as base, and is the stoichiometric air-fuel ratio in the present embodiment.

As will be understood from formula (6), when the sub learning value sfbg is a negative value, the control center air-fuel ratio AFR is changed to the rich side and accordingly the air-fuel ratio of the exhaust gas flowing into the upstream side exhaust purification catalyst 20 is changed to the rich side. Further, the larger the absolute value, the greater the extent by which the control center air-fuel ratio AFR is changed to the rich side. Therefore, the greater the absolute value (rich side absolute value) when the sub learning value sfbg is a negative value with respect to the air-fuel ratio of the exhaust gas flowing into the upstream side exhaust purification catalyst 20 when the sub learning value sfbg is zero, the greater the air-fuel ratio of the exhaust gas flowing into the upstream side exhaust purification catalyst 20 changes to the rich side.

Similarly, when the sub learning value sfbg is a positive value, the control center air-fuel ratio AFR is changed to the lean side and accordingly the air-fuel ratio of the exhaust gas flowing into the upstream side exhaust purification catalyst 20 is changed to the lean side. Further, the larger the absolute value, the greater the extent by which the control center air-fuel ratio AFR is changed to the lean side. Therefore, the greater the absolute value (lean side absolute value) when the sub learning value sfbg is a positive value with respect to the air-fuel ratio of the exhaust gas flowing into the upstream side exhaust purification catalyst 20 when the sub learning value sfbg is zero, the greater the air-fuel ratio of the exhaust gas flowing into the upstream side exhaust purification catalyst 20 changes to the lean side.

As explained above, the excess/deficiency error $\Delta\Sigma OED$ expresses the difference of the output air-fuel ratio AFup of the upstream side air-fuel ratio sensor 40 and the actual air-fuel ratio of the exhaust gas flowing into the upstream side exhaust purification catalyst 20. In addition, as explained above, the main feedback control performs control so that the output air-fuel ratio AFup of the upstream side air-fuel ratio sensor 40 becomes basically equal to the target air-fuel ratio. Therefore, it can be said that the excess/deficiency error $\Delta\Sigma OED$ changes in accordance with the difference between the target air-fuel ratio and the air-fuel ratio of the exhaust gas flowing into the upstream side exhaust purification catalyst 20 and therefore the sub learning value sfbg also changes in accordance with the difference with the air-fuel ratio of the exhaust gas flowing into the upstream side exhaust purification catalyst 20. In particular, it can be said that the sub learning basic control multiplies the difference between the target air-fuel ratio and the actual air-fuel ratio of the exhaust gas flowing into the upstream side exhaust purification catalyst 20 with a predetermined coefficient (gain kb) and cumulatively adds the values to calculate the sub learning value.

Further, by correcting the control center air-fuel ratio AFR based on the sub learning value sfbg as explained above, the amount of feed of fuel from the fuel injector 11 is controlled so that the difference between the target air-fuel ratio and the actual air-fuel ratio of the exhaust gas flowing into the upstream side exhaust purification catalyst 20 becomes smaller. Therefore, in sub learning basic control, based on the sub learning value sfbg, the amount of feed of fuel from the fuel injector 11 is controlled so that the difference between the target air-fuel ratio and the actual air-fuel ratio becomes smaller.

At the time $t_3$ of FIG. 8, as explained above, the sub learning value sfbg is calculated based on the cumulative oxygen excess amount $R_1$ and the cumulative oxygen deficiency amount $F_1$. In particular, in the example shown in FIG. 8, since the cumulative oxygen deficiency amount $F_1$ is larger than the cumulative oxygen excess amount $R_1$, at the time $t_3$, the sub learning value sfbg is decreased.

At this time, the control center air-fuel ratio AFR is corrected based on the sub learning value sfbg by using the above formula (6). In the example shown in FIG. 8, the sub learning value sfbg is a negative value, and therefore the control center air-fuel ratio AFR becomes a value smaller than the basic control center air-fuel ratio AFRbase, that is, the rich side value. Accordingly, the air-fuel ratio of the exhaust gas flowing into the upstream side exhaust purification catalyst 20 is corrected to the rich side.

As a result, the deviation of the actual air-fuel ratio of the exhaust gas flowing into the upstream side exhaust purification catalyst 20 with respect to the target air-fuel ratio after the time $t_3$ becomes smaller than before the time $t_3$. Therefore, the difference between the broken line indicating the actual air-fuel ratio and the one-dot chain line indicating the target air-fuel ratio after the time $t_3$ becomes smaller than the difference before the time $t_3$.

Further, after the time $t_3$ as well, an operation similar to the operation during the time $t_1$ to time $t_2$ is performed. Therefore, at the time $t_4$, if the cumulative oxygen excess/deficiency $\Sigma OED$ reaches the switching reference value OEDref, the target air-fuel ratio is switched from the lean set air-fuel ratio to the rich set air-fuel ratio. Then, at the time $t_5$, when the output air-fuel ratio AFdwn of the downstream side air-fuel ratio sensor 41 reaches the rich judged air-fuel ratio AFrich, the target air-fuel ratio is again switched to the lean set air-fuel ratio.

The period from the time $t_3$ to time $t_4$, as explained above, corresponds to the oxygen increase time period Tinc. Therefore, the absolute value of the cumulative oxygen excess/deficiency $\Sigma OED$ during this period is expressed by the cumulative oxygen excess amount $R_2$ of FIG. 8. Further, the period from the time $t_4$ to time $t_5$, as explained above, corresponds to the oxygen decrease time period Tdec, and therefore the absolute value of the cumulative oxygen excess/deficiency $\Sigma OED$ during this period is expressed by the cumulative oxygen deficiency amount $F_2$ of FIG. 8. Further, the sub learning value sfbg is updated based on the difference $\Delta\Sigma OED(=R_2-F_2)$ between these cumulative oxygen excess amount $R_2$ and cumulative oxygen deficiency amount $F_2$ by using the above formula (5). In the present embodiment, similar control is repeated after the time $t_5$ and, due to this, the sub learning value sfbg is repeatedly updated.

By updating the sub learning value sfbg by the sub learning basic control as stated above, the output air-fuel ratio AFup of the upstream side air-fuel ratio sensor 40 is gradually separated away from the target air-fuel ratio, but the actual air-fuel ratio of the exhaust gas flowing into the upstream side exhaust purification catalyst 20 gradually approaches the target air-fuel ratio. Due to this, it is possible to compensate the deviation in the output air-fuel ratio AFup of the upstream side air-fuel ratio sensor 40.

Note that, as shown in FIG. 8, the sub learning value sfbg is set with an upper limit guard value Gup and lower limit guard value Glow. For this reason, the sub learning value sfbg is set to the upper limit guard value Gup to lower limit guard value Glow in range. Therefore, if the sub learning value calculated by the above-mentioned formula (5) becomes larger than the upper limit guard value Gup, the sub learning value sfbg is set to the upper limit guard value Gup. Similarly, if the sub learning value calculated by the above-mentioned formula (5) becomes smaller than the lower limit guard value Glow, the sub learning value sfbg is set to the lower limit guard value Glow. By setting the upper limit guard value Gup and lower limit guard value Glow in this way, the sub learning value sfbg is prevented from ending up become extremely large or extremely small due to some sort of malfunction etc.

Further, as explained above, the sub learning value sfbg is updated based on the cumulative oxygen excess/deficiency $\Sigma OED$ in the oxygen increasing time period Tinc and the cumulative oxygen excess/deficiency $\Sigma OED$ in the oxygen decreasing time period Tdec directly following this oxygen increasing time period Tinc. This is because, as explained above, the total amount of oxygen stored at the upstream side exhaust purification catalyst 20 in the oxygen increasing time period Tinc and the total amount of oxygen released from the upstream side exhaust purification catalyst 20 in the directly following oxygen decreasing time period Tdec become equal.

In addition, in the above embodiment, based on the cumulative oxygen excess/deficiency ΣOED in one oxygen increasing time period Tinc and the cumulative oxygen excess/deficiency ΣOED in one oxygen decreasing time period Tdec, the sub learning value sfbg is updated. However, the sub learning value sfbg may be updated based on the total value or average value of the cumulative oxygen excess/deficiency ΣOED in a plurality of oxygen increasing time periods Tinc and the total value or average value of the cumulative oxygen excess/deficiency ΣOED in a plurality of oxygen decreasing time periods Tdec.

Further, in the above embodiment, the sub learning value sfbg is used as the basis to correct the control center air-fuel ratio. However, what is corrected based on the sub learning value sfbg may be any parameter so long as enabling control of the amount of feed of fuel from the fuel injector 11 based on the sub learning value so that the difference between the air-fuel ratio of the exhaust gas flowing into the upstream side exhaust purification catalyst 20 and the target air-fuel ratio becomes smaller. As the other parameter, for example, the amount of feed of fuel to the combustion chamber 5, the output air-fuel ratio of the upstream side air-fuel ratio sensor 40, air-fuel ratio correction amount, etc. may be mentioned.

Note that, the above other control can be performed as sub feedback control. Specifically, as other control, for example, as explained above, control switching the target air-fuel ratio to the rich air-fuel ratio when the output air-fuel ratio of the downstream side air-fuel ratio sensor 41 becomes the lean judged air-fuel ratio or more and switching the target air-fuel ratio to the lean air-fuel ratio when the output air-fuel ratio of the downstream side air-fuel ratio sensor 41 becomes the rich judged air-fuel ratio or less may be considered.

In this case, the cumulative oxygen deficiency amount is calculated as the absolute value of the cumulative oxygen excess/deficiency in the oxygen decrease time from when switching the target air-fuel ratio to a rich air-fuel ratio to when the output air-fuel ratio AFup of the downstream side air-fuel ratio sensor 41 becomes the rich judged air-fuel ratio or less. In addition, the cumulative oxygen excess amount is calculated as the absolute value of the cumulative oxygen excess/deficiency in the oxygen increase time from when switching the target air-fuel ratio to a lean air-fuel ratio to when the output air-fuel ratio of the downstream side air-fuel ratio sensor 41 becomes the lean judged air-fuel ratio or more. Further, the control center air-fuel ratio etc. are corrected so that the difference of these cumulative oxygen excess amount and cumulative oxygen deficiency amount becomes smaller.

Therefore, if summarizing the above, in the present embodiment, it can be said that, in sub learning basic control, the cumulative oxygen excess amount in the oxygen increase time from when switching the target air-fuel ratio to a lean air-fuel ratio to when again switching it to a rich air-fuel ratio and the cumulative oxygen deficiency amount in the oxygen decrease time from when switching the target air-fuel ratio to a rich air-fuel ratio to when again switching it to a lean air-fuel ratio are used as the basis to correct a parameter relating to the air-fuel ratio so that the difference between these cumulative oxygen excess amount and cumulative oxygen deficiency amount becomes smaller. The difference between the cumulative oxygen excess amount and the cumulative oxygen deficiency amount changes according to the difference between the target air-fuel ratio and the actual air-fuel ratio of the exhaust gas flowing into the upstream side exhaust purification catalyst 20, so, in the present embodiment, it can be said that, in sub learning basic control, the amount of feed of fuel to the combustion chamber of the internal combustion engine is controlled so that the difference of the air-fuel ratio of the exhaust gas flowing into the upstream side exhaust purification catalyst 20 and target air-fuel ratio becomes smaller.

<Large Deviation in Upstream Side Air-Fuel Ratio Sensor>

In the example shown in FIG. 7, deviation occurs in the output air-fuel ratio of the upstream side air-fuel ratio sensor 40, but the extent thereof is not that large. Therefore, as will be understood from the broken line of FIG. 7, when the target air-fuel ratio is set to the rich set air-fuel ratio, the actual air-fuel ratio of the exhaust gas becomes a rich air-fuel ratio while leaner than the rich set air-fuel ratio.

As opposed to this, if the deviation which occurs at the upstream side air-fuel ratio sensor 40 becomes larger, even if the target air-fuel ratio is set to the rich set air-fuel ratio, sometimes the actual air-fuel ratio of the exhaust gas becomes the stoichiometric air-fuel ratio. This state is shown in FIG. 9.

Figure 9:
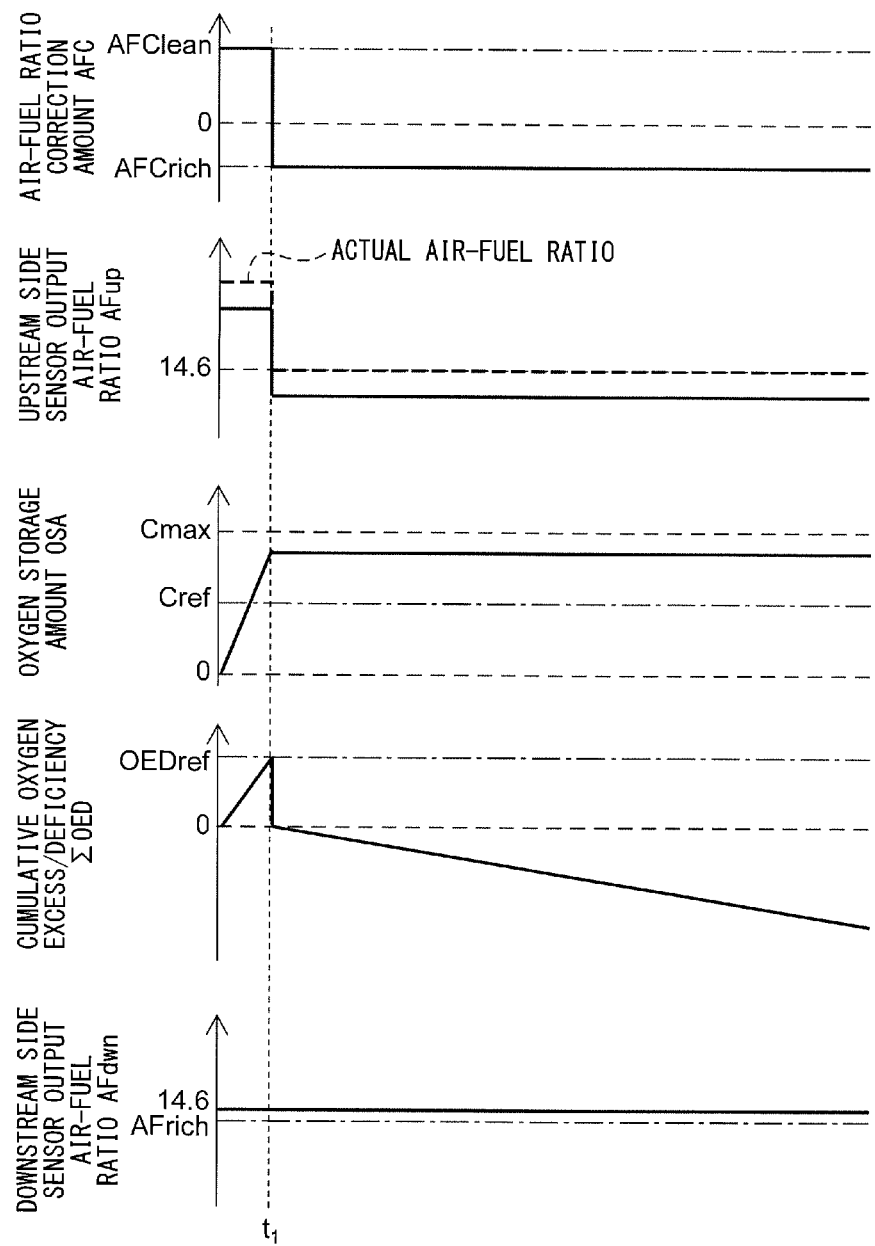
FIG. 9 is a time chart of an air-fuel ratio correction amount etc. when large deviation occurs in the output value of the upstream side air-fuel ratio sensor.

In FIG. 9, before the time $t_1$, the air-fuel ratio correction amount AFC is set to the lean set correction amount AFClean. Along with this, the output air-fuel ratio AFup of the upstream side air-fuel ratio sensor 40 becomes the lean set air-fuel ratio. However, since the output air-fuel ratio of the upstream side air-fuel ratio sensor 40 greatly deviates to the rich side, the actual air-fuel ratio of the exhaust gas becomes an air-fuel ratio leaner than the lean set air-fuel ratio (broken line in figure).

Then, if, at the time $t_1$, the cumulative oxygen excess/deficiency ΣOED calculated based on the output air-fuel ratio AFup of the upstream side air-fuel ratio sensor 40 reaches the switching reference value OEDref, the air-fuel ratio correction amount AFC is switched to the rich set correction amount AFCrich. Along with this, the output air-fuel ratio AFup of the upstream side air-fuel ratio sensor 40 becomes an air-fuel ratio which corresponds to the rich set air-fuel ratio. However, since the output air-fuel ratio of the upstream side air-fuel ratio sensor 40 greatly deviates to the rich side, the actual air-fuel ratio of the exhaust gas becomes the stoichiometric air-fuel ratio (broken line in figure).

As a result, the oxygen storage amount OSA of the upstream side exhaust purification catalyst 20 does not change, but is maintained at a constant value. Therefore, even if a long time elapses after the air-fuel ratio correction amount AFC is switched to the rich set correction amount AFCrich, since unburned gas is not discharged from the upstream side exhaust purification catalyst 20, the output air-fuel ratio AFdwn of the downstream side air-fuel ratio sensor 41 is maintained at substantially the stoichiometric air-fuel ratio. As explained above, the air-fuel ratio correction amount AFC is switched from the rich set correction amount AFCrich to the lean set correction amount AFClean, when the output air-fuel ratio AFdwn of the downstream side air-fuel ratio sensor 41 reaches the rich judged air-fuel ratio AFrich. However, in the example shown in FIG. 9, since the output air-fuel ratio AFdwn of the downstream side air-fuel ratio sensor 41 is maintained at the stoichiometric air-fuel ratio, the air-fuel ratio correction amount AFC is maintained at the rich set correction amount AFCrich for a long time. In this regard, the above-mentioned sub learning basic control is predicated on the air-fuel ratio correction amount being alternately switched between the rich set correction amount AFCrich and the lean set correction amount AFClean. Therefore, when the output air-fuel ratio of the upstream side air-fuel ratio sensor 40 greatly deviates, the air-fuel ratio correction amount is not switched, and therefore the above-mentioned sub learning basic control cannot be performed.

Figure 10:
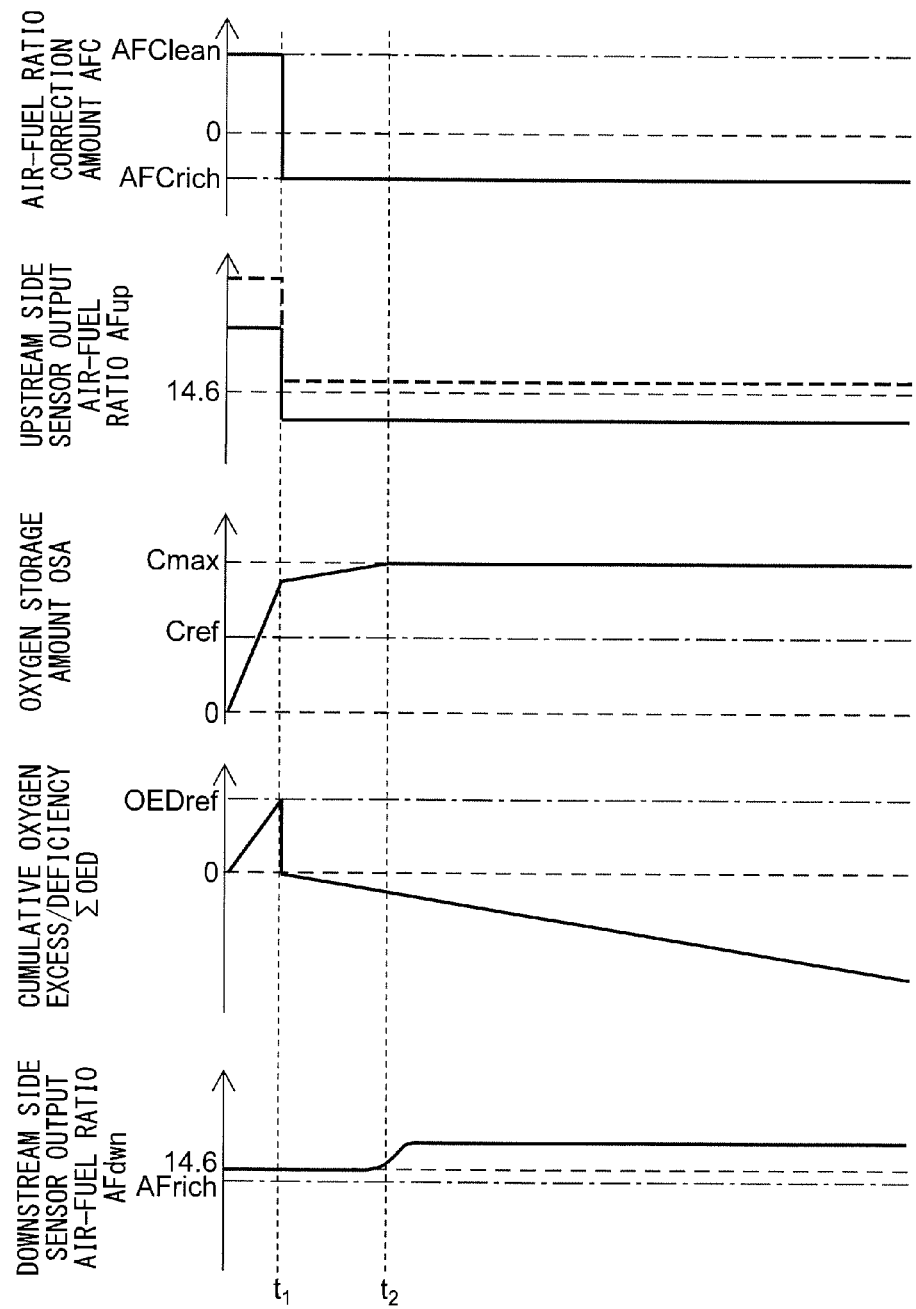
FIG. 10 is a time chart of an air-fuel ratio correction amount etc. when large deviation occurs in the output value of the upstream side air-fuel ratio sensor.

FIG. 10 is a view similar to FIG. 9, which shows the case where the output air-fuel ratio of the upstream side air-fuel ratio sensor 40 extremely greatly deviates to the rich side. In the example shown in FIG. 10, similarly to the example shown in FIG. 9, at the time $t_1$, the air-fuel ratio correction amount AFC is switched to the rich set correction amount AFCrich. That is, at the time $t_1$, the target air-fuel ratio is set to the rich set air-fuel ratio. However, due to deviation of the output air-fuel ratio of the upstream side air-fuel ratio sensor 40, the actual air-fuel ratio of the exhaust gas becomes a lean air-fuel ratio (broken line in the figure).

As a result, nevertheless the air-fuel ratio correction amount AFC is set to the rich set correction amount AFCrich, exhaust gas of a lean air-fuel ratio flows into the upstream side exhaust purification catalyst 20. Therefore, the oxygen storage amount OSA of the upstream side exhaust purification catalyst 20 gradually increases, and finally reaches the maximum storable oxygen amount Cmax at the time $t_2$. If, in this way, the oxygen storage amount OSA reaches the maximum storable oxygen amount Cmax, the upstream side exhaust purification catalyst 20 cannot store oxygen in the exhaust gas any more. Therefore, oxygen and NOx contained in the inflowing exhaust gas flow out from the upstream side exhaust purification catalyst 20 as it is, and thus the output air-fuel ratio AFdwn of the downstream side air-fuel ratio sensor 41 raises. However, the air-fuel ratio correction amount AFC is switched from the rich set correction amount AFCrich to the lean set correction amount AFClean, when the output air-fuel ratio AFdwn of the downstream side air-fuel ratio sensor 41 reaches the rich judged air-fuel ratio AFrich. Therefore, when the output air-fuel ratio of the upstream side air-fuel ratio sensor 40 deviates extremely greatly, the air-fuel ratio correction amount AFC is not switched, and therefore the above-mentioned sub learning basic control cannot be performed.

<Stuck Learning Control>

Therefore, in the sub learning control of the present embodiment, even if the deviation of the output air-fuel ratio of the upstream side air-fuel ratio sensor 40 is large, to compensate that deviation, in addition to the above-mentioned sub learning basic control, stoichiometric air-fuel ratio stuck learning control, lean stuck learning control, and rich stuck learning control are performed.

<Stoichiometric Air-Fuel Ratio Stuck Learning>

First, the stoichiometric air-fuel ratio stuck learning control will be explained. The stoichiometric air-fuel ratio stuck learning control is learning control which is performed when the output air-fuel ratio of the downstream side air-fuel ratio sensor 41 is stuck at the stoichiometric air-fuel ratio as shown in the example shown in FIG. 9.

Figure 11:
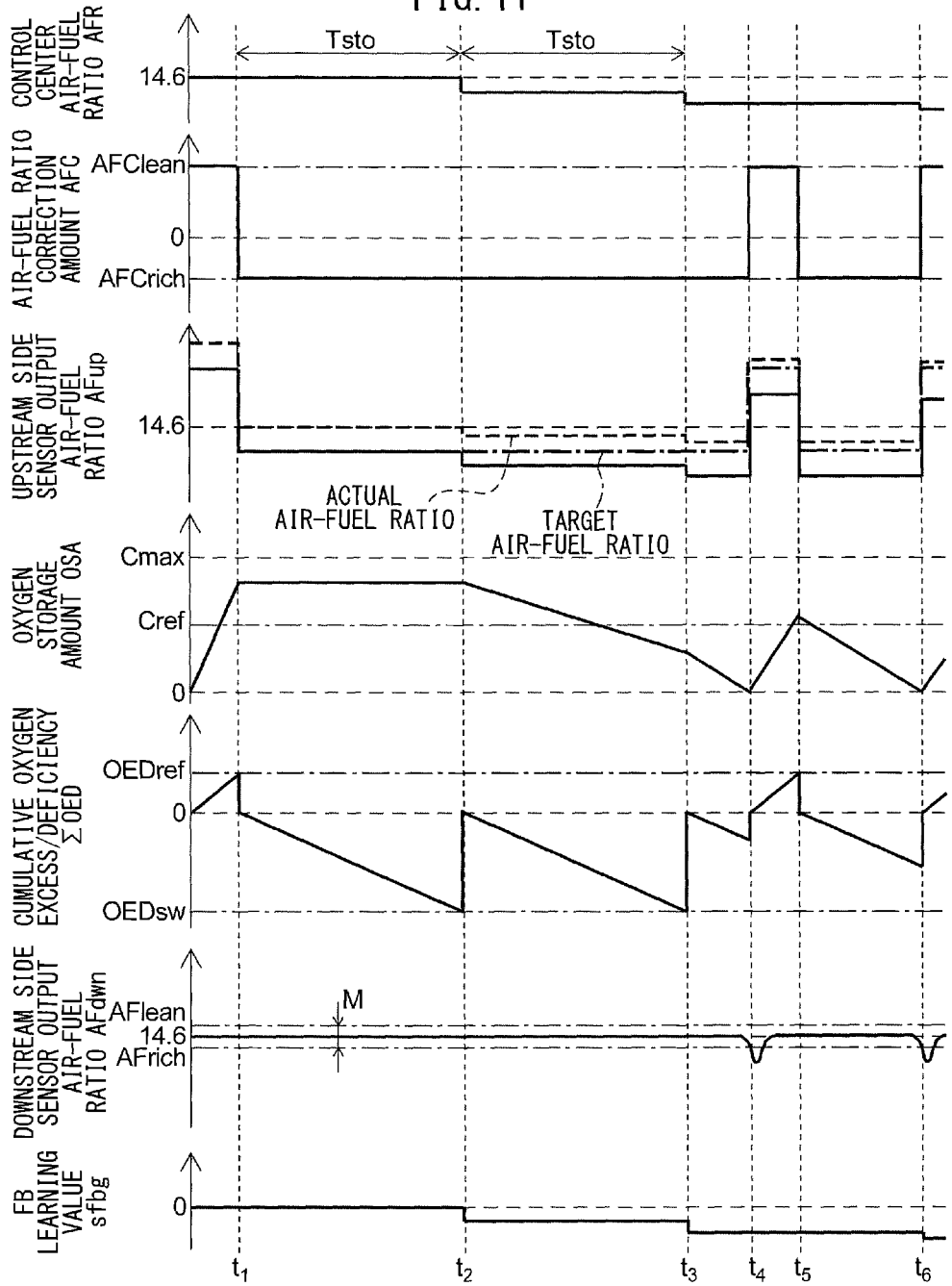
FIG. 11 is a time chart of an air-fuel ratio correction amount etc. when performing stoichiometric air-fuel ratio stuck learning.

In this regard, the region between the rich judged air-fuel ratio AFrich and the lean judged air-fuel ratio AFlean will be referred to as the "the intermediate region M". This intermediate region M corresponds to the stoichiometric air-fuel ratio proximity region which is an air-fuel ratio region between the rich judged air-fuel ratio and the lean judged air-fuel ratio. In stoichiometric air-fuel ratio-stuck learning control, after the air-fuel ratio correction amount AFC is switched to the rich set correction amount AFCrich, that is, after the target air-fuel ratio is switched to the rich set air-fuel ratio, it is judged if the output air-fuel ratio AFdwn of the downstream side air-fuel ratio sensor 41 has been maintained in the intermediate region M for a predetermined stoichiometric air-fuel ratio maintenance judgement time or more. Further, if the output air-fuel ratio AFdwn of the downstream side air-fuel ratio sensor 41 has been maintained in the intermediate region M for the stoichiometric air-fuel ratio maintenance judgement time or more, the sub learning value sfbg is reduced so that the air-fuel ratio of the exhaust gas flowing into the upstream side exhaust purification catalyst 20 changes to the rich side. FIG. 11 shows this state.

FIG. 11 is a view similar to FIG. 10 which shows a time chart of the air-fuel ratio correction amount AFC, etc. FIG. 11, similarly to FIG. 9, shows the case where the output air-fuel ratio AFup of the upstream side air-fuel ratio sensor 40 greatly deviates to the low side (rich side).

In the example shown in the figure, similarly to FIG. 9, before the time $t_1$, the air-fuel ratio correction amount AFC is set to the lean set correction amount AFClean. Then, at the time $t_1$, the cumulative oxygen excess/deficiency ΣOED reaches the switching reference value OEDref, and the air-fuel ratio correction amount AFC is switched to the rich set correction amount AFCrich. However, since the output air-fuel ratio of the upstream side air-fuel ratio sensor 40 greatly deviates to the rich side, similarly to the example shown in FIG. 9, the actual air-fuel ratio of the exhaust gas is substantially the stoichiometric air-fuel ratio. Therefore, after the time $t_1$, the oxygen storage amount OSA of the upstream side exhaust purification catalyst 20 is maintained at a constant value. As a result, the output air-fuel ratio AFdwn of the downstream side air-fuel ratio sensor 41 is maintained in the stoichiometric air-fuel ratio proximity, that is, intermediate region M, for a long time period.

Therefore, in the present embodiment, if the output air-fuel ratio AFdwn of the downstream side air-fuel ratio sensor 41 is maintained in the intermediate region M for the predetermined stoichiometric air-fuel ratio maintenance judgement time Tsto or more after the air-fuel ratio correction amount AFC is switched to the rich set correction amount AFCrich, the control center air-fuel ratio AFR is corrected. In particular, in the present embodiment, the sub learning value sfbg is updated so that the air-fuel ratio of the exhaust gas flowing into the upstream side exhaust purification catalyst 20 changes to the rich side.

Specifically, in the present embodiment, the sub learning value sfbg is calculated by the following formula (7), and the control center air-fuel ratio AFR is corrected by the above formula (6).

$$sfbg(n)=sfbg(n-1)+kc \cdot AFCrich \tag{7}$$

Note that in the above formula (7), kc is the gain which shows the extent of correction of the control center air-fuel ratio AFR (0<kc≤1). The larger the value of the gain kc, the larger the correction amount of the control center air-fuel ratio AFR becomes.

In this regard, as explained above, if the output air-fuel ratio AFdwn of the downstream side air-fuel ratio sensor 41 is maintained in the intermediate region M for a long period of time after the air-fuel ratio correction amount AFC is switched, the actual air-fuel ratio of the exhaust gas is a value close to substantially the stoichiometric air-fuel ratio. Therefore, the deviation at the upstream side air-fuel ratio sensor 40 is the same extent as the difference between the control center air-fuel ratio (stoichiometric air-fuel ratio) and the target air-fuel ratio (in this case, the rich set air-fuel ratio). In the present embodiment, as shown in the above formula (7), the sub learning value sfbg is updated based on the air-fuel ratio correction amount AFC corresponding to the difference between the control center air-fuel ratio and the target air-fuel ratio. Due to this, it is possible to more suitably compensate for deviation in the output air-fuel ratio of the upstream side air-fuel ratio sensor 40.

In the example shown in FIG. 11, until the time $t_2$ at which the stoichiometric air-fuel ratio maintenance judgement time Tsto elapses from the time $t_1$, the air-fuel ratio correction amount AFC is set to the rich set correction amount AFCrich. Therefore, if formula (7) is used, at the time $t_2$, the sub learning value sfbg is decreased. As a result, the actual air-fuel ratio of the exhaust gas flowing into the upstream side exhaust purification catalyst 20 changes to the rich side. Due to this, after the time $t_2$, the deviation of the actual air-fuel ratio of the exhaust gas flowing into the upstream side exhaust purification catalyst 20 from the target air-fuel ratio becomes smaller compared with before the time $t_2$. Therefore, after the time $t_2$, the difference between the broken line which shows the actual air-fuel ratio and the one-dot chain line which shows the target air-fuel ratio becomes smaller than the difference before the time $t_2$.

In the example shown in FIG. 11, the gain kc is set to a relatively small value. Therefore, even if the sub learning value sfbg is updated at the time $t_2$, deviation of the actual air-fuel ratio of the exhaust gas flowing into the upstream side exhaust purification catalyst 20, from the target air-fuel ratio, remains. Therefore, the actual air-fuel ratio of the exhaust gas becomes an air-fuel ratio leaner than the rich set air-fuel ratio, that is, an air-fuel ratio with a small rich degree (see broken line of FIG. 11). For this reason, the decreasing speed of the oxygen storage amount OSA of the upstream side exhaust purification catalyst 20 is slow.

As a result, from the time $t_2$ to the time $t_3$ when the stoichiometric air-fuel ratio maintenance judgement time Tsto elapses, the output air-fuel ratio AFdwn of the downstream side air-fuel ratio sensor 41 is maintained in the stoichiometric air-fuel ratio proximity, i.e., intermediate region M. Therefore, in the example shown in FIG. 11, at the time $t_3$ as well, the sub learning value sfbg is updated by using formula (7).

Then, in the example shown in FIG. 11, at the time $t_4$, the output air-fuel ratio AFdwn of the downstream side air-fuel ratio sensor 41 becomes the rich judged air-fuel ratio AFrich or less. After the output air-fuel ratio AFdwn becomes the rich judged air-fuel ratio AFrich or less in this way, as explained above, the air-fuel ratio correction amount AFC is alternately set to the lean set correction amount AFClean and the rich set correction amount AFCrich. Along with this, the above-mentioned sub learning basic control is performed.

By updating the sub learning value sfbg by the stoichiometric air-fuel ratio stuck learning control in this way, the sub learning value can be updated even if the deviation of the output air-fuel ratio AFup of the upstream side air-fuel ratio sensor 40 is large. Due to this, it is possible to compensate deviation at the output air-fuel ratio of the upstream side air-fuel ratio sensor 40.

Note that in the above embodiment, the stoichiometric air-fuel ratio maintenance judgement time Tsto is a predetermined time. In this case, the stoichiometric air-fuel ratio maintenance judgement time is set to equal to or greater than the time usually taken from when switching the target air-fuel ratio to the rich air-fuel ratio to when the absolute value of the cumulative oxygen excess/deficiency ΣOED reaches the maximum storable oxygen amount of the upstream side exhaust purification catalyst 20 at the time when it is unused. Specifically, it is preferably set to two to four times of that time.

Note that, the stoichiometric air-fuel ratio stuck learning control, in the same way as the case of the above-mentioned sub learning basic control, can be also applied to the case of using the above-mentioned other control as sub feedback control. In this case, in the stoichiometric air-fuel ratio stuck learning control, when the output air-fuel ratio of the downstream side air-fuel ratio sensor 41 is maintained in a region of air-fuel ratio near the stoichiometric air-fuel ratio over a stoichiometric air-fuel ratio maintenance judgment time Tsto or more from when switching the target air-fuel ratio to a lean air-fuel ratio, the sub learning value sfbg is made to increase or decrease so that the air-fuel ratio of the exhaust gas flowing into the upstream side exhaust purification catalyst 20 changes to the rich side or the lean side in accordance with the target air-fuel ratio at that time.

Therefore, expressing these all together, in the present embodiment, it can be said that, in stoichiometric air-fuel ratio stuck learning, when the output air-fuel ratio of the downstream side air-fuel ratio sensor 41 is maintained within a region of air-fuel ratio near the stoichiometric air-fuel ratio over a stoichiometric air-fuel ratio maintenance judgment time Tsto or more from when switching the target air-fuel ratio to an air-fuel ratio deviated to one side of the stoichiometric air-fuel ratio (corresponding to rich side in example shown in FIG. 10), in feedback control, a parameter relating to the air-fuel ratio is corrected so that the air-fuel ratio of the exhaust gas flowing into the upstream side exhaust purification catalyst 20 changes to that one side.

<Rich/Lean Stuck Learning>

Figure 12:
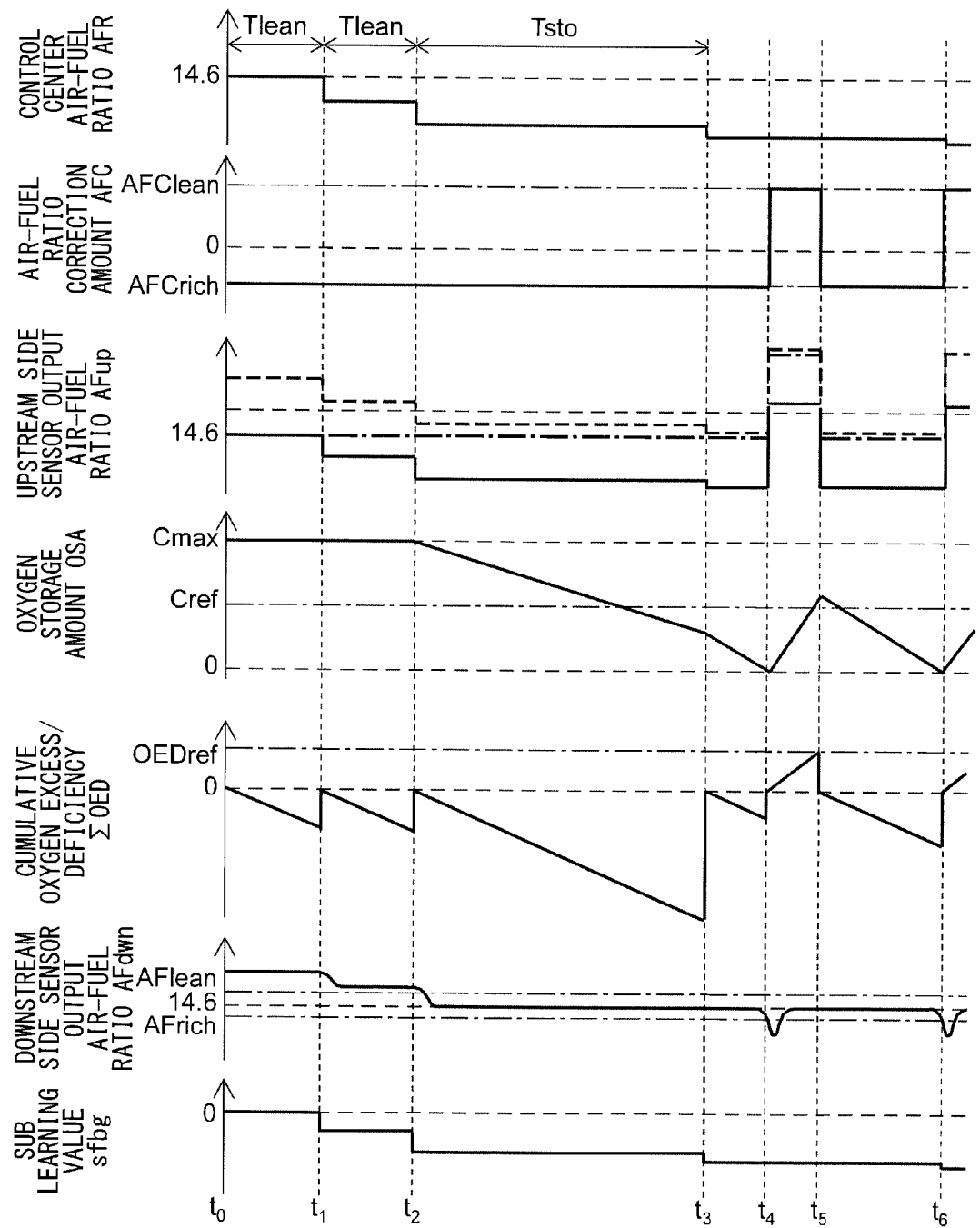
FIG. 12 is a time chart of an air-fuel ratio correction amount etc. when performing lean stuck learning etc.

Next, lean stuck learning control will be explained. Lean stuck learning control is learning control performed when, like in the example shown in FIG. 10, despite the target air-fuel ratio being made a rich air-fuel ratio, the output air-fuel ratio of the downstream side air-fuel ratio sensor 41 ends up stuck at a lean air-fuel ratio. In lean stuck learning control, it is judged if the output air-fuel ratio AFdwn of the downstream side air-fuel ratio sensor 41 is maintained at a lean air-fuel ratio over a predetermined lean air-fuel ratio maintenance judgment time or more from when switching the air-fuel ratio correction amount AFC to the rich set correction amount AFCrich, that is, switching the target air-fuel ratio to a rich set air-fuel ratio. Further, when maintained at a lean air-fuel ratio over the lean air-fuel ratio maintenance judgment time or more, the sub learning value sfbg is decreased so that the air-fuel ratio of the exhaust gas flowing into the upstream side exhaust purification catalyst 20 changes to the rich side. FIG. 12 shows this state.

FIG. 12 is a view similar to FIG. 10 showing a time chart of the air-fuel ratio correction amount AFC etc. FIG. 12, in the same way as FIG. 10, shows the case where the output air-fuel ratio AFup of the upstream side air-fuel ratio sensor 40 deviates to the low side (rich side) by an extremely great amount.

In the illustrated example, at the time $t_0$, the air-fuel ratio correction amount AFC is switched from the lean set correction amount AFClean to the rich set correction amount AFCrich. However, the output air-fuel ratio of the upstream side air-fuel ratio sensor 40 deviates to the rich side by an extremely great amount, so in the same way as the example shown in FIG. 10, the actual air-fuel ratio of the exhaust gas becomes a lean air-fuel ratio. For this reason, at the time $t_0$ and on, the output air-fuel ratio AFdwn of the downstream side air-fuel ratio sensor 41 is maintained at a lean air-fuel ratio.

Therefore, in the present embodiment, the control center air-fuel ratio AFR is corrected when the output air-fuel ratio AFdwn of the downstream side air-fuel ratio sensor 41 is maintained at a lean air-fuel ratio over a predetermined lean air-fuel ratio maintenance judgment time Tlean or more from when the air-fuel ratio correction amount AFC is set to the rich set correction amount AFCrich. In particular, in the present embodiment, the sub learning value sfbg is corrected so that the air-fuel ratio of the exhaust gas flowing into the upstream side exhaust purification catalyst 20 changes to the rich side.

Specifically, in the present embodiment, the following formula (8) is used to calculate the sub learning value sfbg and the above formula (6) is used to correct the control center air-fuel ratio AFR based on the sub learning value sfbg.

$$sfbg(n)=sfbg(n-1)+kd\cdot(AFCrich-(AFdwn-14.6)) \qquad (8)$$

Note that, in the above formula (8), kd is a gain showing the extent of correction of the control center air-fuel ratio AFR ($0<kd\leq1$). The larger the value of the gain kd, the larger the correction amount of the control center air-fuel ratio AFR.

Here, in the example shown in FIG. 12, when the air-fuel ratio correction amount AFC is set to the rich set correction amount AFCrich, the output air-fuel ratio AFdwn of the downstream side air-fuel ratio sensor 41 is maintained at a lean air-fuel ratio. In this case, the deviation at the upstream side air-fuel ratio sensor 40 corresponds to the difference between the target air-fuel ratio and the output air-fuel ratio of the downstream side air-fuel ratio sensor 41. If breaking this down, the deviation at the upstream side air-fuel ratio sensor 40 can be said to become the same extent as the total of the difference between the target air-fuel ratio and stoichiometric air-fuel ratio (corresponding to rich set correction amount AFCrich) and the difference between the stoichiometric air-fuel ratio and the output air-fuel ratio of the downstream side air-fuel ratio sensor 41. Therefore, in the present embodiment, as shown in the above formula (8), the rich set correction amount AFCrich plus the difference between the output air-fuel ratio of the downstream side air-fuel ratio sensor 41 and the stoichiometric air-fuel ratio is used as the basis to update the sub learning value sfbg. In particular, in the above-mentioned stoichiometric air-fuel ratio stuck learning, the sub learning value is corrected by exactly an amount corresponding to the rich set correction amount AFCrich, while in lean stuck learning, the sub learning value is corrected by exactly the output air-fuel ratio AFdwn of the downstream side air-fuel ratio sensor 41 in addition to this. Further, the gain kd is made the same extent as the gain kc. For this reason, the correction amount in lean stuck learning is larger than the correction amount in stoichiometric air-fuel ratio stuck learning.

In the example shown in FIG. 12, if using formula (8), at the time $t_1$, the sub learning value sfbg is decreased. As a result, the actual air-fuel ratio of the exhaust gas flowing into the upstream side exhaust purification catalyst 20 changes to the rich side. Due to this, at the time $t_1$ and on, the deviation of the actual air-fuel ratio of the exhaust gas flowing into the upstream side exhaust purification catalyst 20 from the target air-fuel ratio becomes smaller than before the time $t_1$. Therefore, at the time $t_1$ and on, the difference between the broken line showing the actual air-fuel ratio and the one-dot chain line showing the target air-fuel ratio becomes smaller than the difference before the time $t_1$.

FIG. 12 shows an example where the gain kd is made a relatively small value. For this reason, at the time $t_1$, even if the sub learning value sfbg is updated, the deviation at the output air-fuel ratio of the upstream side air-fuel ratio sensor 40 remains. In particular, in the illustrated example, at the time $t_1$ and on, the actual air-fuel ratio of the exhaust gas remains as the lean air-fuel ratio. As a result, the output air-fuel ratio AFdwn of the downstream side air-fuel ratio sensor 41 is maintained at the lean air-fuel ratio over the lean air-fuel ratio maintenance judgment time Tlean from the time $t_1$. For this reason, in the illustrated example, at the time $t_2$ as well, lean stuck learning is used to correct the sub learning value sfbg using the above formula (8).

If at the time $t_2$ the sub learning value sfbg is corrected, the deviation of the actual air-fuel ratio of the exhaust gas flowing into the upstream side exhaust purification catalyst 20 from the target air-fuel ratio becomes smaller. Due to this, in the illustrated example, at the time $t_2$ and on, the actual air-fuel ratio of the exhaust gas becomes slightly richer than the stoichiometric air-fuel ratio. Along with this, the output air-fuel ratio AFdwn of the downstream side air-fuel ratio sensor 41 changes from a lean air-fuel ratio to substantially the stoichiometric air-fuel ratio. In particular, in the example shown in FIG. 12, from the time $t_2$ to the time $t_3$, the output air-fuel ratio AFdwn of the downstream side air-fuel ratio sensor 41 is maintained at substantially the stoichiometric air-fuel ratio, that is, inside the middle region M, over the stoichiometric air-fuel ratio maintenance judgment time Tsto. For this reason, at the time $t_3$, stoichiometric air-fuel ratio stuck learning is used to correct the sub learning value sfbg using the above formula (7).

By using lean stuck learning control to update the sub learning value sfbg in this way, even if the deviation of the output air-fuel ratio AFup of the upstream side air-fuel ratio sensor 40 becomes extremely great, it is possible to update the sub learning value. Due to this, the deviation at the output air-fuel ratio of the upstream side air-fuel ratio sensor 40 can be reduced.

Note that, in the above embodiment, the lean air-fuel ratio maintenance judgment time Tlean is made a predetermined time. In this case, the lean air-fuel ratio maintenance judgment time Tlean is made the response delay time of the downstream side air-fuel ratio sensor usually taken from when switching the target air-fuel ratio to a rich air-fuel ratio to when the output air-fuel ratio of the downstream side air-fuel ratio sensor 41 changes corresponding to that or is made more. Specifically, it is preferably made two to four times of that time. Further, the lean air-fuel ratio maintenance judgment time Tlean is shorter than the time usually taken from when switching the target air-fuel ratio to the rich air-fuel ratio to when the absolute value of the cumulative oxygen excess/deficiency ΣOED reaches the maximum storage amount of oxygen of the upstream side exhaust purification catalyst 20 at the time when it is unused. Therefore, the lean air-fuel ratio maintenance judgment time Tlean is made shorter than the above-mentioned stoichiometric air-fuel ratio maintenance judgment time Tsto.

Next, rich stuck learning control will be explained. Rich stuck learning control is control similar to lean stuck learning control. It is learning control performed when, regardless of the target air-fuel ratio being made a lean air-fuel ratio, the output air-fuel ratio of the downstream side air-fuel ratio sensor 41 ends up being stuck at a rich air-fuel ratio. In rich stuck learning control, it is judged if the output air-fuel ratio AFdwn of the downstream side air-fuel ratio sensor 41 has been maintained at a rich air-fuel ratio over a predetermined rich air-fuel ratio maintenance judgment time (similar to lean air-fuel ratio maintenance judgment time) or more from when switching the air-fuel ratio correction amount AFC to the lean set correction amount AFClean, that is, when switching the target air-fuel ratio to the lean set air-fuel ratio. Further, if maintained at a rich air-fuel ratio over the rich air-fuel ratio maintenance judgment time or more, the sub learning value sfbg is made to increase so that the air-fuel ratio of the exhaust gas flowing into the upstream side exhaust purification catalyst 20 changes to the lean side.

That is, in rich stuck learning control, control is performed with rich and lean reversed from the above-mentioned lean stuck learning control.

Note that, in the present embodiment, in addition to sub learning basic control, stoichiometric air-fuel ratio stuck learning control, lean stuck learning control, and rich stuck learning control are performed. Summarizing these, they can be called "sub learning control" updating the sub learning value based on the output of the downstream side air-fuel ratio sensor 41 and controlling the parameters relating to the air-fuel ratio so as to change the air-fuel ratio of the exhaust gas flowing into the upstream side exhaust purification catalyst 20 according to the sub learning value.

<Explanation of Imbalance>
In this regard, in an internal combustion engine having a plurality of cylinders, sometimes, at only a part of the cylinders, malfunction etc. of the fuel injector 11 causes the actual amount of feed of fuel from the fuel injector 11 to become greater than the target value. This happens when, for example, foreign matter deposits between the needle valve and valve seat of the fuel injector 11 and the needle valve can no longer be completely closed. If, in this way, the amount of feed of fuel from a part of the fuel injectors 11 becomes greater, the combustion air-fuel ratio at a cylinder corresponding to this part of the fuel injectors 11 becomes richer than the combustion air-fuel ratio at the other cylinders. Below, the deviation occurring in the combustion air-fuel ratio between cylinders due to the combustion air-fuel ratio at a part of the cylinders in this way becoming richer than the combustion air-fuel ratio at the other cylinders will be called the "rich imbalance".

If rich imbalance occurs in this way, a large amount of unburned gas containing a large amount of hydrogen flows out from a cylinder where the combustion air-fuel ratio becomes rich. As explained above, among the unburned gas and oxygen, hydrogen is fast in speed of passage through the diffusion regulating layers 54 of the air-fuel ratio sensors 40, 41. For this reason, if rich imbalance occurs, the output air-fuel ratio of the upstream side air-fuel ratio sensor 40 greatly deviates to the rich side from the actual air-fuel ratio of the exhaust gas flowing around the upstream side air-fuel ratio sensor 40.

Here, as explained above, in the present embodiment, due to main feedback control, control is performed so that the output air-fuel ratio of the upstream side air-fuel ratio sensor 40 becomes the target air-fuel ratio. For this reason, the amount of feed of fuel is controlled so that the output air-fuel ratio of the upstream side air-fuel ratio sensor 40 substantially matches with the target air-fuel ratio. As a result, the actual air-fuel ratio of the exhaust gas flowing into the upstream side exhaust purification catalyst 20 becomes an air-fuel ratio deviated to the lean side from the target air-fuel ratio.

If in this way deviation occurs in the output air-fuel ratio of the upstream side air-fuel ratio sensor 40, as explained above, the above-mentioned sub learning control is used to correct the control center air-fuel ratio. As a result, the deviation in the output air-fuel ratio is gradually compensated for. However, for compensation of deviation by sub feedback learning control, the cycle at the times $t_1$ to $t_3$ of FIG. 8 has to be repeated a considerable number of times, so time is required. On the other hand, while the deviation in the output air-fuel ratio of the upstream side air-fuel ratio sensor 40 is not being sufficiently compensated for by sub feedback learning control, the actual air-fuel ratio of the exhaust gas flowing into the upstream side exhaust purification catalyst 20 deviates to the lean side from the target air-fuel ratio. Therefore, if a rich imbalance occurs, the actual air-fuel ratio continues in a state deviating to the lean side from the target air-fuel ratio over a certain degree of time.

As explained above, if the actual air-fuel ratio deviates to the lean side from the target air-fuel ratio, when the target air-fuel ratio is set at the lean set air-fuel ratio, the actual air-fuel ratio becomes an air-fuel ratio leaner than the lean set air-fuel ratio. If exhaust gas of a lean air-fuel ratio of such a large lean degree flows into the upstream side exhaust purification catalyst 20, sometimes even if the upstream side exhaust purification catalyst 20 has an oxygen storage ability, the upstream side exhaust purification catalyst 20 will no longer be able to store all of the oxygen flowing in. In this case, $NO_X$ and oxygen ends up flowing out from the upstream side exhaust purification catalyst 20 and as a result deterioration of the exhaust emission is invited.

<Sub Learning Promotion Control>
Therefore, in the control apparatus of the present embodiment, if rich imbalance occurs, sub learning promotion control is performed controlling a parameter relating to change of the sub learning value sfbg so that the sub learning value sfbg easily changes to a suitable value depending on the difference between the air-fuel ratio of the exhaust gas flowing into the upstream side exhaust purification catalyst 20 and the target air-fuel ratio. As the sub learning promotion control facilitating the change of the sub learning value sfbg to the above suitable value, the following may be mentioned.

As a first specific example of sub learning promotion control, in sub learning basic control, increasing the gains kb, kc, and kd showing the extent of reflecting the excess/deficiency error $\Delta \Sigma OED$ etc. in the control center air-fuel ratio AFR may be mentioned. By increasing these gains kb, kc, and kd, the amount of change of the sub learning value sfbg with respect to the same excess/deficiency error $\Delta \Sigma OED$ or the amount of change of the sub learning value sfbg in stuck learning control becomes larger. As a result, the sub learning value sfbg greatly changes and due to this can easily change to the suitable value. That is, change of the sub learning value sfbg toward a suitable value is promoted. Note that, these gains kb, kc, and kd do not necessarily all have to be increased. It is also possible to increase only a part of these. Below, the case of increasing only the gain kb will be used as an example for the explanation.

As a second specific example of sub learning promotion control, increasing the rich degree of the rich set air-fuel ratio set at the sub feedback control, that is, decreasing the rich set correction amount AFCrich, may be mentioned. If increasing the rich degree of the rich set air-fuel ratio in this way, the time from when switching the air-fuel ratio correction amount AFC to the rich set correction amount AFCrich to when the output air-fuel ratio AFdwn of the downstream side air-fuel ratio sensor 41 becomes the rich judged air-fuel ratio AFrich or less, that is, the oxygen decrease time Tdec, becomes shorter. As a result, the updating cycle of the sub learning value sfbg becomes shorter and therefore change of the sub learning value sfbg toward a suitable value is promoted.

As a third specific example of sub learning promotion control, decreasing the switching reference storage amount set at the sub feedback control, that is, decreasing the switching reference value OEDref, may be mentioned. If the switching reference value OEDref becomes smaller, the air-fuel ratio correction amount AFC is switched from the lean set correction amount AFClean to the rich set correction amount AFCrich in the state with a small oxygen storage amount OSA. As a result, the time from when switching the air-fuel ratio correction amount AFC to the lean set correction amount AFClean to when again being switched to the rich set correction amount AFCrich, that is, the oxygen increase time Tinc, becomes shorter. In addition, the time from switching the air-fuel ratio correction amount AFC to the rich set correction amount AFCrich to when again being switched to the lean set correction amount AFClean, that is, the oxygen decrease time Tdec, also becomes shorter. As a result, the updating cycle of the sub learning value sfbg becomes shorter and therefore change of the sub learning value sfbg toward a suitable value is promoted.

Further, as explained above, if imbalance occurs, the actual air-fuel ratio of the exhaust gas flowing into the upstream side exhaust purification catalyst 20 becomes leaner than the output air-fuel ratio AFup of the upstream side air-fuel ratio sensor 40. As a result, the oxygen storage amount OSA becomes greater than a value corresponding to the cumulative oxygen excess/deficiency ΣOED. For this reason, when the cumulative oxygen excess/deficiency ΣOED is the switching reference storage amount OEDref, the actual oxygen storage amount OSA becomes greater than the switching reference storage amount Cref. Further, at this time, if the actual oxygen storage amount OSA becomes greater and approaches the maximum storage amount of oxygen Cmax, $NO_X$ easily flows out from the upstream side exhaust purification catalyst 20. As opposed to this, by making the switching reference value OEDref smaller, the actual oxygen storage amount OSA is kept from exceeding the switching reference storage amount Cref and becoming extremely great and, as a result, $NO_X$ is kept from flowing out from the upstream side exhaust purification catalyst 20.

As a fourth specific example of sub learning promotion control, decreasing the lean degree of the lean set air-fuel ratio set in the sub feedback control, that is, decreasing the lean set correction amount AFClean, may be mentioned. If in this way decreasing the lean degree of the lean set air-fuel ratio, the oxygen storage amount OSA at the upstream side exhaust purification catalyst 20 while the target air-fuel ratio is set to the lean set air-fuel ratio is decreased. As a result, the time from when switching the air-fuel ratio correction amount AFC to the rich set correction amount AFCrich to when the output air-fuel ratio AFdwn of the downstream side air-fuel ratio sensor 41 becomes the rich judged air-fuel ratio AFrich or less, that is, the oxygen decrease time Tdec, becomes shorter. As a result, the updating cycle of the sub learning value sfbg becomes shorter and therefore change of the sub learning value sfbg toward a suitable value is promoted.

Further, as explained above, if imbalance occurs, the actual air-fuel ratio of the exhaust gas flowing into the upstream side exhaust purification catalyst 20 becomes leaner than the output air-fuel ratio AFup of the upstream side air-fuel ratio sensor 40. For this reason, when the target air-fuel ratio is set to the lean set air-fuel ratio, the actual air-fuel ratio of the exhaust gas becomes leaner than the lean set air-fuel ratio. Therefore, when the target air-fuel ratio is set to the lean set air-fuel ratio, the lean degree at the actual air-fuel ratio of the exhaust gas becomes greater and as a result there is a possibility that the upstream side exhaust purification catalyst 20 will not be able to sufficiently store $NO_X$. As opposed to this, when imbalance occurs, by decreasing the lean degree of the lean set correction amount AFClean, it is possible to prevent the lean degree at the actual air-fuel ratio of the exhaust gas from becoming excessively large any longer and possible to keep the removal ability of $NO_X$ by the upstream side exhaust purification catalyst 20 from decreasing.

As a fifth specific example of sub learning promotion control, it is considered to increase the upper limit guard value Gup of the sub learning value sfbg and decrease the lower limit guard value Glow. In other words, in sub learning promotion control, the absolute values of the guard values Gup and Glow are made to increase.

Here, as explained above, if imbalance occurs, to suitably compensate for the deviation in the output air-fuel ratio AFup of the upstream side air-fuel ratio sensor 40, the absolute value of the sub learning value sfbg has to be made larger. In this regard, as explained above, the sub learning value sfbg is set with an upper limit guard value Gup and lower limit guard value Glow. The sub learning value sfbg cannot take a value outside the range of these guard values. As a result, the sub learning value sfbg sometimes can no longer become a suitable value.

As opposed to this, by increasing the absolute value of a guard value, the value of the sub learning value sfbg can be set to a value with a large absolute value. Due to this, change of the sub learning value sfbg toward a suitable value is promoted.

<Estimation of Occurrence of Imbalance>

Further, in the present embodiment, when rich imbalance occurs, sub learning promotion control is performed. Specifically, in the present embodiment, when the difference between the main learning value mfbg in main learning and the sub learning value sfbg in sub learning becomes a certain degree or more, it is estimated that rich imbalance has occurred. Below, this will be explained.

As explained above, when rich imbalance occurs, the output air-fuel ratio AFup of the upstream side air-fuel ratio sensor 40 deviates to the rich side. Therefore, in this case, the output air-fuel ratio AFup of the upstream side air-fuel ratio sensor 40 has a steady deviation from the target air-fuel ratio. As explained above, the main learning value mfbg is calculated to become larger if the output air-fuel ratio AFup of the upstream side air-fuel ratio sensor 40 constantly becomes richer than the target air-fuel ratio. Therefore, the main learning value mfbg becomes a positive value proportional to the amount of deviation in the output air-fuel ratio AFup.

On the other hand, as explained above, when rich imbalance occurs and the output air-fuel ratio AFup of the upstream side air-fuel ratio sensor 40 deviates to the rich side, as shown in FIG. 8, the sub learning value sfbg becomes a negative value. Further, the absolute value of the sub learning value sfbg at this time becomes proportional to the amount of deviation in the output air-fuel ratio AFup of the upstream side air-fuel ratio sensor 40 accompanying the occurrence of imbalance.

Therefore, as explained above, when rich imbalance occurs, the main learning value mfbg becomes a positive value, while the sub learning value sfbg becomes a negative value. In addition, when rich imbalance occurs, both the main learning value mfbg and sub learning value sfbg become relatively large values. Therefore, the absolute values of the main learning value mfbg and the sub learning value sfbg become respective predetermined reference absolute values or more. Therefore, in the present embodiment, when the main learning value mfbg and the sub learning value sfbg become opposite in signs and the absolute values of the main learning value mfbg and sub learning value sfbg respectively become the reference absolute values or more, it is estimated that rich imbalance occurs. Here, the reference absolute values, for example, are made values whereby the absolute values of the two learning values mfbg and sfbg will almost never be reached when the rich imbalance is not occurring and whereby the absolute values of the two learning values mfbg and sfbg are reached when a certain degree of magnitude of rich imbalance occurs.

Here, for example, consider the case where the exhaust pipe 22 between the upstream side exhaust purification catalyst 20 and the downstream side air-fuel ratio sensor 41 cracks etc. and a small amount of air flows in from the crack or the case where the downstream side air-fuel ratio sensor 41 suffers from a cracked element. In such a case, even if the air-fuel ratio of the exhaust gas flowing into the upstream side exhaust purification catalyst 20 is the stoichiometric air-fuel ratio, the output air-fuel ratio of the downstream side air-fuel ratio sensor 41 becomes an air-fuel ratio leaner than the stoichiometric air-fuel ratio, for example, an air-fuel ratio of the lean judged air-fuel ratio or more. As a result, the output air-fuel ratio of the downstream side air-fuel ratio sensor 41 is maintained at an air-fuel ratio of a lean air-fuel ratio or more. For this reason, the above-mentioned lean stuck learning control is used to update the sub learning value sfbg and, as a result, the control center air-fuel ratio AFR is corrected.

However, in such a case, no deviation occurs between the output air-fuel ratio AFup of the upstream side air-fuel ratio sensor 40 and the actual air-fuel ratio of the exhaust gas. Therefore, no deviation occurs between the air-fuel ratio of the exhaust gas flowing into the upstream side exhaust purification catalyst 20 and the target air-fuel ratio. Therefore, if using lean stuck learning control to update the sub learning value sfbg in such a way, the control center air-fuel ratio AFR ends up deviating from the suitable value. For this reason, in such a case, updating of the sub learning value sfbg should not be aggressively promoted.

Here, as explained above, when rich imbalance occurs, the main learning value mfbg becomes a positive value with certain degree of large absolute value. As opposed to this, as explained above, when the exhaust pipe 22 cracks etc or the downstream side air-fuel ratio sensor 41 suffers from a cracked element, the main learning value mfbg basically does not become a value with that large an absolute value but becomes a value near zero. Therefore, as explained above, by judgment based on the signs and absolute values of the main learning value mfbg and sub learning value sfbg, it becomes possible to differentiate between the case where a rich imbalance has occurred and the case where the exhaust pipe 22 has cracked.

Note that, if rich imbalance occurs, the learning value difference Δfbg (=mfbg−sfbg) of the value of the main learning value minus the sub learning value becomes extremely large. Further, it is learned that the larger the degree of imbalance in rich imbalance, that is, the larger the amount of deviation at the output air-fuel ratio AFup of the upstream side air-fuel ratio sensor 40, the larger the learning value difference Δfbg. Therefore, it may be estimated that rich imbalance occurs when the main learning value mfbg and the sub learning value sfbg become opposite in sign and the absolute values of the main learning value mfbg and the sub learning value sfbg become the respective reference absolute values or more and, in addition, the learning value difference Δfbg becomes a predetermined reference difference or more. In this case, the reference difference is, for example, made a value whereby the learning value difference Δfbg will almost never be reached when the rich imbalance is not occurring and whereby the learning value difference Δfbg is reached when a certain degree of magnitude of rich imbalance occurs.

<Sub Learning Promotion Control Using Time Chart>

Figure 13:
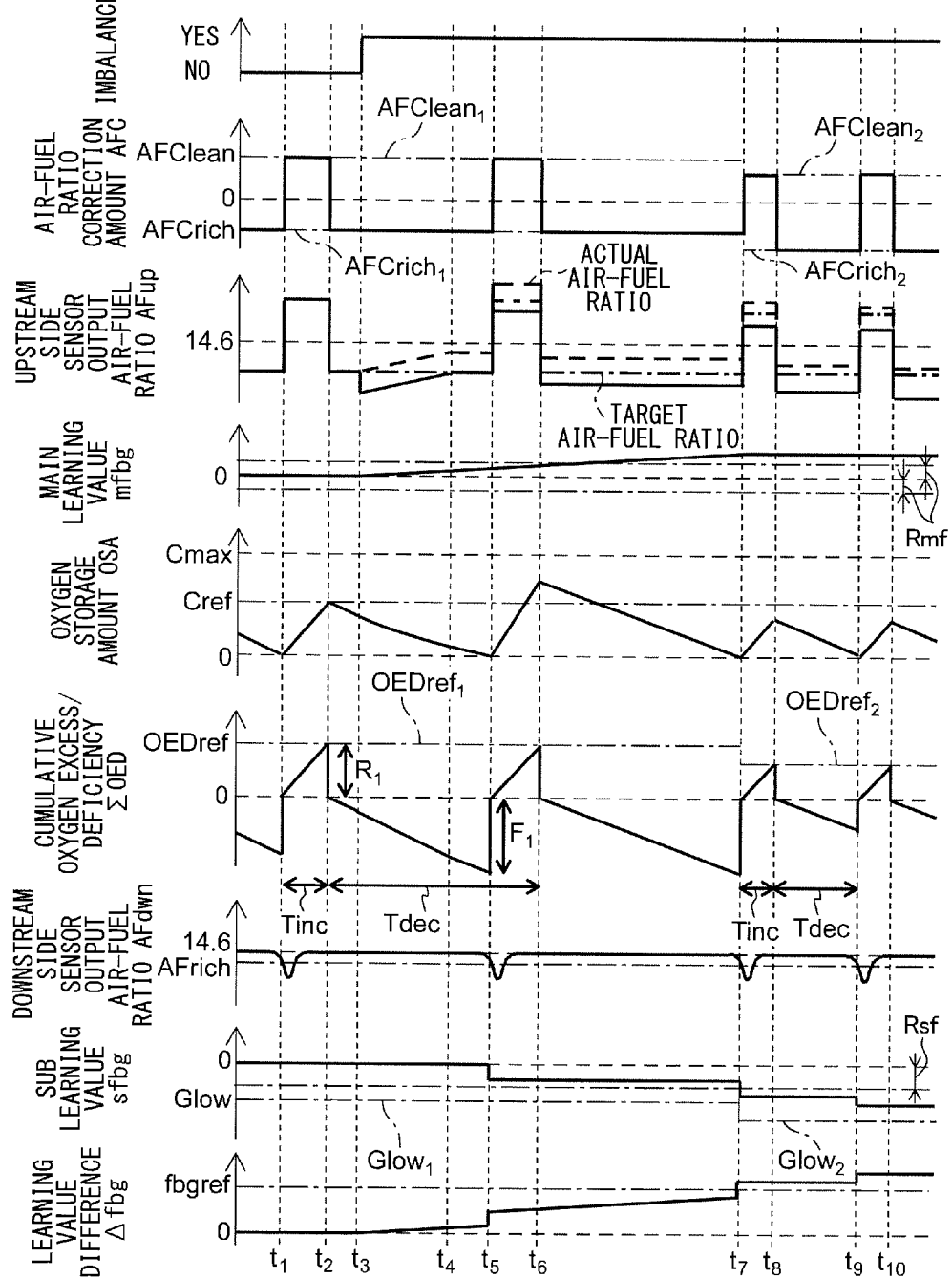
FIG. 13 is a time chart of the occurrence of imbalance etc. when performing sub learning promotion control.

FIG. 13 is a time chart of the presence of occurrence of imbalance, the air-fuel ratio correction amount AFC, output air-fuel ratio AFup of the upstream side air-fuel ratio sensor 40, main learning value mfbg, oxygen storage amount OSA, cumulative oxygen excess/deficiency ΣOED, output air-fuel ratio AFdwn of the downstream side air-fuel ratio sensor, sub learning value sfbg, and learning value difference Δfbg. In particular, FIG. 13 shows the case of performing the above-mentioned sub learning promotion control. Note that, in FIG. 13 as well, the solid line in the output air-fuel ratio AFup shows the output air-fuel ratio of the upstream side air-fuel ratio sensor 40, while the broken line shows the actual air-fuel ratio of the exhaust gas flowing around the upstream side air-fuel ratio sensor 40. In addition, the one-dot chain line shows the target air-fuel ratio, that is, the stoichiometric air-fuel ratio (basic control center air-fuel ratio) plus the air-fuel ratio correction amount AFC.

FIG. 13 shows the case which a rich imbalance rapidly occurs at the time $t_3$ so as to facilitate understanding of the explanation. Up to the time $t_3$, the control explained using FIG. 6 is performed. Therefore, if, at the time $t_1$, the output air-fuel ratio AFdwn of the downstream side air-fuel ratio sensor 41 becomes the rich judged air-fuel ratio AFrich or less, the air-fuel ratio correction amount AFC is switched to the lean set correction amount AFClean. In addition, if, at the time $t_2$, the cumulative oxygen excess/deficiency ΣOED reaches the switching reference value OEDref, the air-fuel ratio correction amount AFC is switched to the rich set correction amount AFCrich.

If, at the time $t_3$, a rich imbalance occurs, the output air-fuel ratio AFup of the upstream side air-fuel ratio sensor 40 deviates to the rich side. However, at this time, the actual air-fuel ratio of the exhaust gas (broken line in the figure) does not change even if a rich imbalance occurs at the time $t_3$. In this way, if the output air-fuel ratio AFup of the upstream side air-fuel ratio sensor 40 deviates to the rich side from the target air-fuel ratio, due to the main feedback control, the actual air-fuel ratio of the exhaust gas is made to change to the lean side. Along with this, at the time $t_4$, the output air-fuel ratio AFup of the upstream side air-fuel ratio sensor 40 matches the target air-fuel ratio. However, at this time, the actual air-fuel ratio of the exhaust gas becomes an air-fuel ratio leaner than the target air-fuel ratio.

Further, if making the actual air-fuel ratio of the exhaust gas change to the lean side by main feedback control, at this time, the value of the integration term in the main feedback control is made to increase. The thus increased value of the integration term is periodically introduced in the main learning value mfbg. For this reason, as shown in FIG. 13, the value of the main learning value mfbg gradually rises. Note that, in the example shown in FIG. 13, to facilitate understanding of the explanation, the case is shown where the integration term is introduced in the main learning value mfbg at short time intervals. For this reason, the main learning value mfbg is not changed in steps but is gradually increased. Further, along with this, the learning value difference Δfbg gradually increases.

After this, in the example shown in FIG. 13, at the time $t_5$, the output air-fuel ratio AFdwn of the downstream side air-fuel ratio sensor 41 falls to the rich judged air-fuel ratio AFrich or less. At this time, as will be understood from FIG. 13, the cumulative oxygen deficiency amount $F_1$ at the time $t_2$ to the time $t_5$ becomes greater than the cumulative oxygen excess amount $R_1$ at the time $t_1$ to the time $t_2$. For this reason, at the time $t_5$, using the above formula (5), the sub learning value sfbg is decreased and therefore the control center air-fuel ratio AFR is corrected to the rich side. Therefore, as will be understood from FIG. 13, at the time $t_5$, the main learning value mfbg becomes a positive value and the sub learning value sfbg becomes a negative value. However, at the time $t_5$, the absolute value of the main learning value mfbg is smaller than the reference absolute value Rmf. Similarly, at the time $t_5$, the absolute value of the sub learning value sfbg is smaller than the reference absolute value Rsf. Therefore, at the time $t_5$, sub learning promotion control is not started. Further, along with this, the learning value difference Δfbg is made to increase.

At the time $t_5$ and on as well, similar control is repeated. In the example shown in FIG. 13, finally, at the time $t_7$, the absolute value of the main learning value mfbg becomes the reference absolute value Rmf or more and the absolute value of the sub learning value sfbg becomes the reference absolute value Rs or more. For this reason, at the time $t_7$, it is judged that a rich imbalance has occurred and sub learning promotion control is started. In addition, in the example shown in FIG. 13, the learning value difference Δfbg also becomes a predetermined reference difference fbgref or more. For this reason, even if judging the occurrence of a rich imbalance based on the learning value difference Δfbg, at the time $t_7$, it is judged that a rich imbalance has occurred and sub learning promotion control is started. Specifically, at the time $t_7$, the lean set correction amount AFClean is made to decrease from the first lean set correction amount $AFClean_1$ to the second lean set correction amount $AFClean_2$. Due to this, the lean set air-fuel ratio is made to change to the rich side. Further, at the time $t_7$, the rich set correction amount AFCrich is made to decrease from the first rich set correction amount $AFCrich_1$ to the second rich set correction amount $AFCrich_2$. Due to this, the rich set air-fuel ratio is also made to change to the rich side.

In addition, at the time $t_7$, the switching reference value OEDref is switched from the first switching reference value $OEDref_1$ to the second switching reference value $OEDref_2$. Furthermore, at the time $t_7$, the upper limit guard value Gup of the sub learning value sfbg is made to increase and the lower limit guard value Glow is made to fall (in FIG. 13, only the lower limit guard value Glow is shown). Specifically, in the example shown in FIG. 13, the lower limit guard value Glow is lowered from the first lower limit guard value $Glow_1$ to the second guard value $Glow_2$. The lower limit guard value Glow is a negative value, so the absolute value of the second guard value $Glow_2$ is larger than the absolute value of the first lower limit guard value $Glow_1$. In addition, at the time $t_7$ and on, the gain kb showing the extent of reflecting the excess/deficiency error ΔΣOED in the control center air-fuel ratio AFR is made to increase from $kb_1$ to $kb_2$.

By the switching reference value OEDref being reduced at the time $t_7$ in this way, the time Tinc from when the air-fuel ratio correction amount AFC is switched to the lean set correction amount AFClean at the time $t_7$ to when the cumulative oxygen excess/deficiency ΣOED reaches the switching reference value OEDref at the time $t_8$ (oxygen increase time) becomes shorter. In addition, at the time $t_7$, the rich set correction amount AFCrich is decreased and the lean set correction amount AFClean is decreased, so the time Tdec from when the air-fuel ratio correction amount AFC is switched to the rich set correction amount AFCrich at the time $t_8$ to when the output air-fuel ratio AFdwn of the downstream side air-fuel ratio sensor 41 becomes the rich judged air-fuel ratio AFrich or less at the time $t_9$ (oxygen decrease time) becomes shorter. As a result, the updating cycle of the sub learning value sfbg becomes shorter and therefore the sub learning is promoted.

Further, the gain kb can be made to increase, so at the time $t_9$ when updating the sub learning value sfbg, the amount of update of the sub learning value sfbg with respect to the excess/deficiency error ΔΣOED becomes larger. Due to this as well, sub learning can be promoted.

In addition, at the time $t_7$ and on, the absolute value of the lower limit guard value Glow is made larger. Here, in the example shown in FIG. 13, at the time $t_9$, the sub learning value sfbg becomes a value with a larger absolute value than the first lower limit guard value $Glow_1$. For this reason, at the time $t_7$, if the lower limit guard value Glow was not changed from the first lower limit guard value $Glow_1$ to the second lower limit guard value $Glow_2$, the sub learning value sfbg would be set to a first lower limit guard value $Glow_1$. As opposed to this, in the present embodiment, at the time $t_7$, the absolute value of the lower limit guard value Glow is made larger, so at the time $t_9$, the sub learning value sfbg can be set to a value with a larger absolute value than the first lower limit guard value $Glow_1$. Therefore, in the present embodiment, sub learning is promoted by this as well.

Note that, due to the above-mentioned such sub learning promotion control, the sub learning value sfbg quickly converges to a certain value. If the sub learning value sfbg converges in this way, after this, there is no need to shorten the updating cycle of the sub learning value. For this reason, if the sub learning value sfbg converges, the rich set correction amount AFCrich is returned to the first rich set correction amount $AFCrich_1$, while the lean set correction amount AFClean is returned to the first lean set correction amount $AFClean_1$. In addition, the switching reference value OEDref is also returned to the first switching reference value $OEDref_1$. In addition, the gain kb is also lowered from $kb_2$ to the value $kb_1$ before the time $t_7$. On the other hand, the upper limit guard value Gup and the lower limit guard value Glow are maintained at large absolute values even if the sub learning value sfbg converges.

<Explanation of Specific Control>

Figure 14:
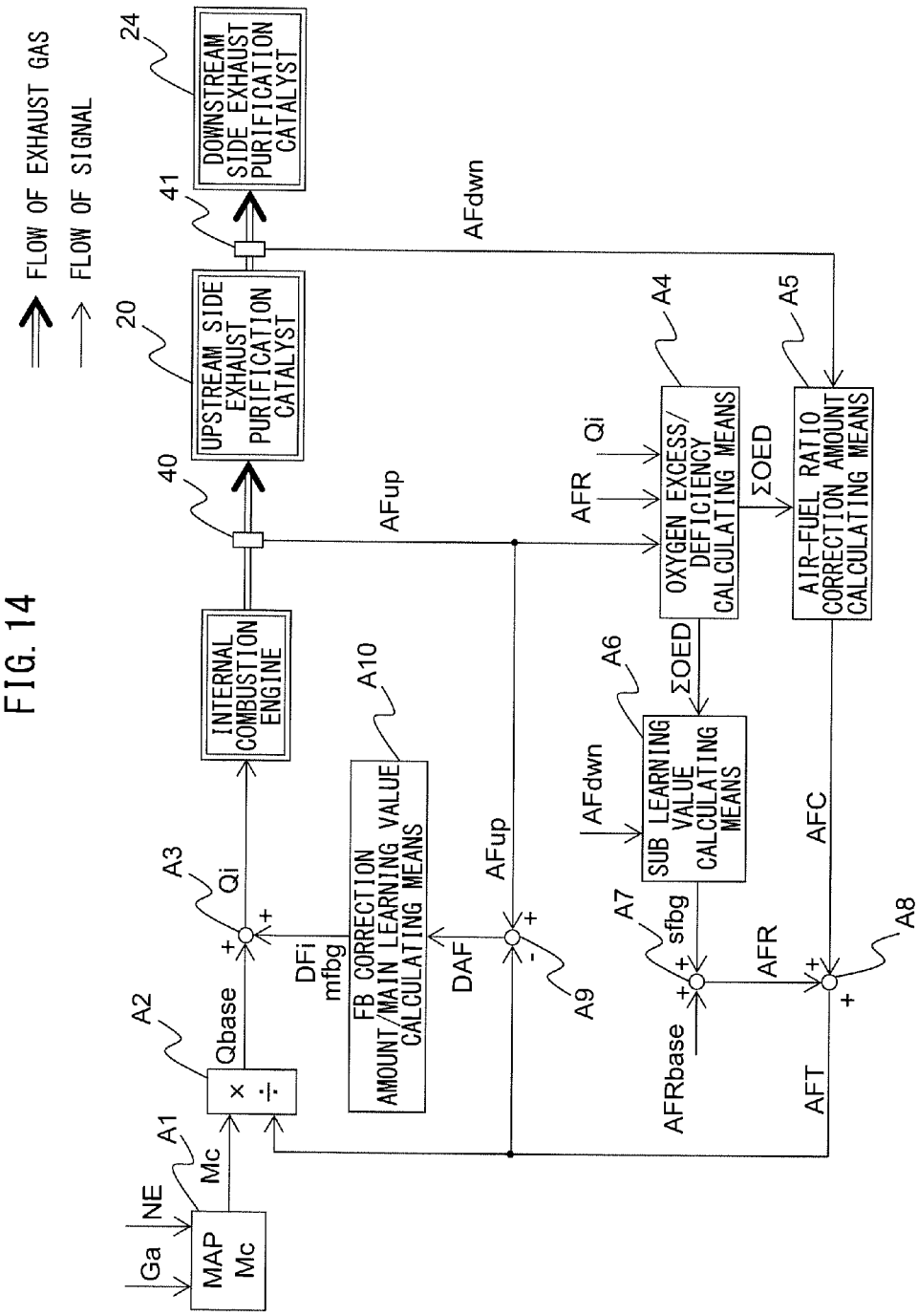
FIG. 14 is a functional block diagram of a control apparatus.

Next, referring to FIG. 14 to FIG. 17, the control apparatus in the above embodiment will be specifically explained. The control apparatus in the present embodiment, as shown in the functional block diagram of FIG. 14, is comprised of the functional blocks A1 to A10. Below, referring to FIG. 14, the functional blocks will be explained. The operations at these functional blocks A1 to A10 are basically performed at the ECU 31.

<Calculation of Amount of Feed of Fuel>

First, the calculation of the amount of feed of fuel will be explained. In calculating the amount of feed of fuel, a cylinder intake air calculating means A1, basic fuel feed calculating means A2, and fuel feed calculating means A3 are used.

The cylinder intake air amount calculating means A1 uses the intake air flow rate Ga, engine speed NE, and map or calculation formula stored in the ROM 34 of the ECU 31 as the basis to calculate the cylinder intake air amount Mc to each cylinder. The intake air flow rate Ga is measured by the air flow rate detection device 39, while the engine speed NE is calculated based on the output of the crank angle sensor 44.

The basic fuel feed calculating means A2 divides the cylinder intake air amount Mc calculated by the cylinder intake air calculating means A1 by the corrected target air-fuel ratio AFT to thereby calculate the basic amount of feed of fuel Qbase (Qbase=Mc/AFT). The corrected target air-fuel ratio AFT is calculated by the later explained target air-fuel ratio setting means A8.

The fuel feed calculating means A3 adds to the basic amount of feed of fuel Qbase calculated by the basic fuel feed calculating means A2 the F/B correction amount DFi and main learning value mfbg calculated by the later explained F/B correction/main learning value calculating means to calculate the amount of feed of fuel Qi (Qi=Qbase+DFi+mfbg). An injection command is given to the fuel injector 11 so that the fuel of the thus calculated amount of feed of fuel Qi is injected from the fuel injector 11.

<Calculation of Target Air-Fuel Ratio>

Next, calculation of the corrected target air-fuel ratio will be explained. The corrected target air-fuel ratio is the target air-fuel ratio corrected by the sub learning value sfbg. In calculating the corrected target air-fuel ratio, the oxygen excess/deficiency calculating means A4, air-fuel ratio correction calculating means A5, sub learning value calculating means A6, control center air-fuel ratio calculating means A7, and target air-fuel ratio setting means A8 are used.

The oxygen excess/deficiency calculating means A4 uses the amount of feed of fuel Qi calculated by the fuel feed calculating means A3, the output air-fuel ratio AFup of the upstream side air-fuel ratio sensor 40, and the control center air-fuel ratio AFR calculated by the later explained control center air-fuel ratio calculating means A7 as the basis to calculate the cumulative oxygen excess/deficiency ΣOED. The oxygen excess/deficiency calculating means A4, for example, multiplies the difference between the output air-fuel ratio AFup of the upstream side air-fuel ratio sensor 40 and the control center air-fuel ratio AFR with the amount of feed of fuel Qi and cumulatively adds the found values to calculate the cumulative oxygen excess/deficiency ΣOED.

The air-fuel ratio correction calculating means A5 uses the cumulative oxygen excess/deficiency ΣOED calculated by the oxygen excess/deficiency calculating means A4 and the output air-fuel ratio AFdwn of the downstream side air-fuel ratio sensor 41 as the basis to calculate the air-fuel ratio correction amount AFC. Specifically, the air-fuel ratio correction amount AFC is calculated based on the flow chart shown in FIG. 15.

The sub learning value calculating means A6 uses the output air-fuel ratio AFdwn of the downstream side air-fuel ratio sensor 41 and the cumulative oxygen excess/deficiency ΣOED calculated by the oxygen excess/deficiency calculating means A4 etc. as the basis to calculate the sub learning value sfbg. Specifically, the sub learning value sfbg is calculated based on the flow chart of sub learning control shown in FIG. 16. The thus calculated sub learning value sfbg is stored in the RAM 33 of the ECU 31 as a storage medium which will not be erased even if the ignition switch of the vehicle mounting the internal combustion engine is turned off.

The control center air-fuel ratio calculating means A7 uses the basic control center air-fuel ratio AFRbase (for example, stoichiometric air-fuel ratio) and the sub learning value sfbg calculated by the sub learning value calculating means A6 as the basis to calculate the control center air-fuel ratio AFR. Specifically, as shown in the above-mentioned formula (6), the sub learning value sfbg is added to the basic control center air-fuel ratio AFRbase to calculate the control center air-fuel ratio AFR.

The target air-fuel ratio setting means A8 adds to the control center air-fuel ratio AFR calculated by the control center air-fuel ratio calculating means A7 the air-fuel ratio correction amount AFC calculated by the air-fuel ratio correction calculating means A5 to thereby calculate the corrected target air-fuel ratio AFT. The thus calculated corrected target air-fuel ratio AFT is input to the basic fuel feed calculating means A2 and the later explained air-fuel ratio deviation calculating means A9.

<Calculation of F/B Correction Amount and Main Learning Value>

Next, calculation of the F/B correction amount and main learning value based on the output air-fuel ratio AFup of the upstream side air-fuel ratio sensor 40 will be explained. In calculating the F/B correction amount DFi and main learning value mfbg, the air-fuel ratio deviation calculating means A9 and the F/B correction/main learning value calculating means A10 are used.

The air-fuel ratio deviation calculating means A9 subtracts from the output air-fuel ratio AFup of the upstream side air-fuel ratio sensor 40 the corrected target air-fuel ratio AFT calculated by the target air-fuel ratio setting means A8 to thereby calculate the air-fuel ratio deviation DAF (DAF=AFup−AFT). This air-fuel ratio deviation DAF is a value showing the excess/deficiency of the amount of feed of fuel for the corrected target air-fuel ratio AFT.

The F/B correction/main learning value calculating means A10 processes the air-fuel ratio deviation DAF calculated by the air-fuel ratio deviation calculating means A9 by proportional-integral-derivative processing (PID processing) to calculate the F/B correction amount DFi for compensating for the excess/deficiency of the amount of feed of fuel based on the above equation (1). In addition, part of the time integral SDAF calculated in the integration process is used in the above-mentioned formula (2) whereby the main learning value mfbg is updated. Further, the time integral SDAF is corrected by the above formula (3) along with updating of the main learning value mfbg. Accordingly, the F/B correction amount DFi is corrected. The thus calculated F/B correction amount DFi and main learning value mfbg are input to the fuel feed calculating means A3.

<Flow Chart of Control for Setting Air-Fuel Ratio Correction Amount>

Figure 15:
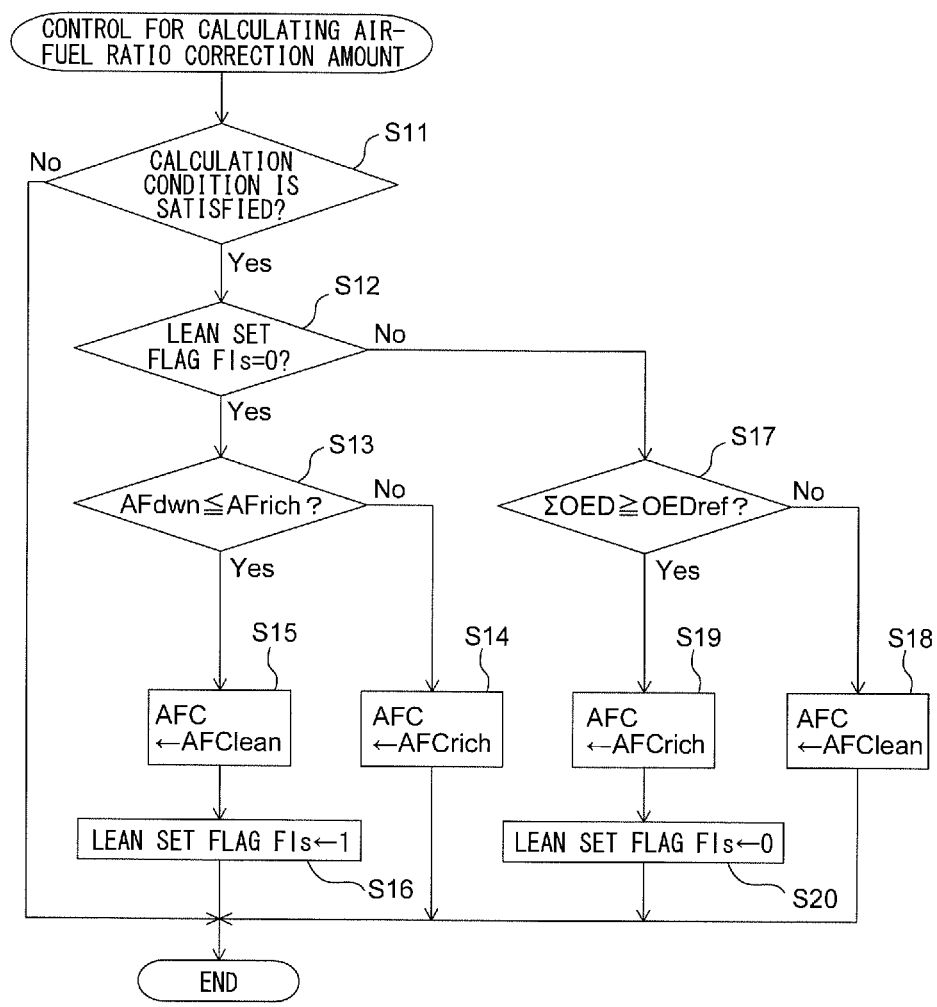
FIG. 15 is a flow chart showing a control routine of control for calculating an air-fuel ratio correction amount.

FIG. 15 is a flow chart showing a control routine of control for calculating the air-fuel ratio correction amount AFC. The illustrated control routine is performed at constant time intervals.

As shown in FIG. 15, first, at step S11, it is judged if a condition for calculation of the air-fuel ratio correction amount AFC is satisfied. As cases where a condition for calculation of the air-fuel ratio correction amount AFC is satisfied, being in the middle of normal control where feedback control is performed, for example, not being in the middle of special control such as fuel cut control etc. may be mentioned. If it is judged at step S11 that a condition for calculation of the target air-fuel ratio is satisfied, the routine proceeds to step S12.

At step S12, it is judged if a lean set flag Fls has been set to "0". The lean set flag Fls is set to "1" if the air-fuel ratio correction amount AFC is set to the lean set correction amount AFClean while is set to "0" in other cases. If at step S12 the lean set flag Fls is set to "0", the routine proceeds to step S13. At step S13, it is judged if the output air-fuel ratio AFdwn of the downstream side air-fuel ratio sensor 41 is the rich judged air-fuel ratio AFrich or less. If it is judged that the output air-fuel ratio AFdwn of the downstream side air-fuel ratio sensor 41 is larger than the rich judged air-fuel ratio AFrich, the routine proceeds to step S14. At step S14, the air-fuel ratio correction amount AFC is maintained as set to the rich set correction amount AFCrich, then the control routine is made to end.

On the other hand, if the oxygen storage amount OSA of the upstream side exhaust purification catalyst 20 decreases and the air-fuel ratio of the exhaust gas flowing out from the upstream side exhaust purification catalyst 20 falls, at step S13, it is judged that the output air-fuel ratio AFdwn of the downstream side air-fuel ratio sensor 41 is the rich judged air-fuel ratio AFrich or less. In this case, the routine proceeds to step S15 where the air-fuel ratio correction amount AFC is switched to the lean set correction amount AFClean. Next, at step S16, the lean set flag Fls is set to "1", then the control routine is made to end.

If the lean set flag Fls is set to "1", at the next control routine, at step S12, it is judged that the lean set flag Fls is not set to "0", then the routine proceeds to step S17. At step S17, it is judged if the cumulative oxygen excess/deficiency ΣOED from when the air-fuel ratio correction amount AFC is switched to the lean set correction amount AFClean is the switching reference value OEDref or more. If it is judged that the cumulative oxygen excess/deficiency ΣOED is smaller than the switching reference value OEDref, the routine proceeds to step S18 where the air-fuel ratio correction amount AFC continues to be maintained as set to the lean set correction amount AFClean, then the control routine is made to end. On the other hand, if the oxygen storage amount of the upstream side exhaust purification catalyst 20 increases, finally, at step S17, it is judged that the cumulative oxygen excess/deficiency ΣOED is the switching reference value OEDref or more, then the routine proceeds to step S19. At step S19, the air-fuel ratio correction amount AFC is switched to the rich set correction amount AFCrich. Next, at step S20, the lean set flag Fls is reset to "0", then the control routine is made to end.

<Flow Chart of Sub Learning Control>

Figure 16:
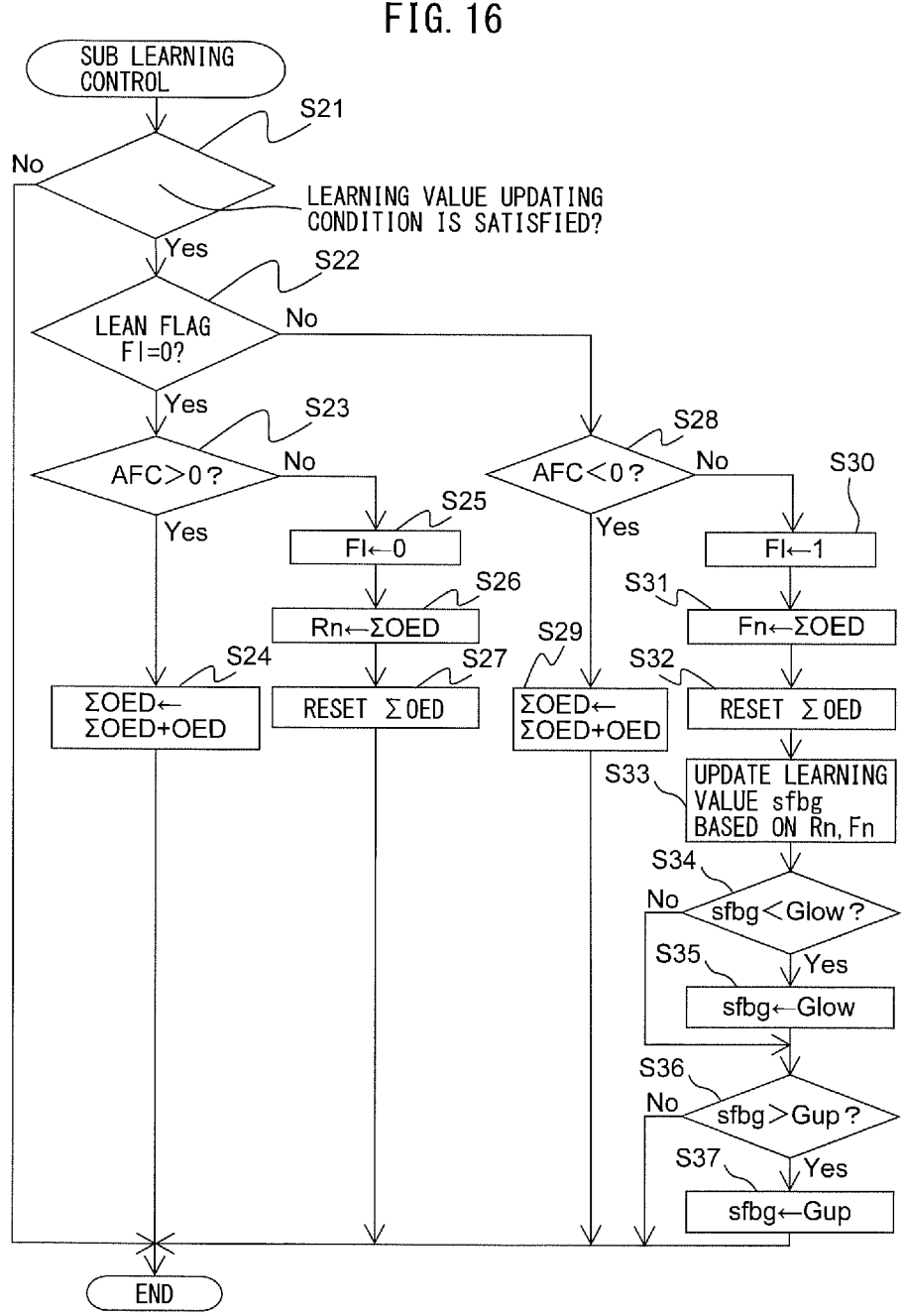
FIG. 16 is a flow chart showing a control routine of sub learning control.

FIG. 16 is a flow chart showing a control routine of sub learning basic control. The illustrated control routine is performed at constant time intervals.

As shown in FIG. 16, first, at step S21, it is judged if a condition for updating the sub learning value sfbg is satisfied. As the case where an updating condition is satisfied, for example, normal control being underway etc. may be mentioned. If at step S21 it is judged that a condition for updating the sub learning value sfbg is satisfied, the routine proceeds to step S22. At step S22, it is judged if the lean flag Fl has been set to "0". The lean flag Fl also, in the same way as the lean set flag Fls, is made "1" when the air-fuel ratio correction amount AFC is set to the lean set correction amount AFClean and is made "0" in other cases. If at step S22 it is judged that the lean flag Fl is set to "0", the routine proceeds to step S23.

At step S23, it is judged if air-fuel ratio correction amount AFC is larger than 0, that is, if target air-fuel ratio is a lean air-fuel ratio. If at step S23 it is judged that the air-fuel ratio correction amount AFC is larger than 0, the routine proceeds to step S24. At step S24, the cumulative oxygen excess/deficiency ΣOED plus the current oxygen excess/deficiency OED is made the new cumulative oxygen excess/deficiency ΣOED, then the control routine is made to end.

After this, if the target air-fuel ratio is switched to the rich air-fuel ratio, at the next control routine, it is judged at step S23 that the air-fuel ratio correction amount AFC is 0 or less, then the routine proceeds to step S25. At step S25, the lean flag Fl is reset to 0, next, at step S26, Rn is made the absolute value of the current cumulative oxygen excess/deficiency ΣOED. Next, at step S27, the cumulative oxygen excess/deficiency ΣOED is reset to 0, then the control routine is made to end.

On the other hand, if the lean flag Fl is reset to "0", at the next control routine, the routine proceeds from step S22 to step S28. At step S28, it is judged if the air-fuel ratio correction amount AFC is smaller than 0, that is, it is judged if the target air-fuel ratio is the rich air-fuel ratio. If at step S28 it is judged that the air-fuel ratio correction amount AFC is smaller than 0, the routine proceeds to step S29. At step S29, the cumulative oxygen excess/deficiency ΣOED plus the current oxygen excess/deficiency OED is made the new cumulative oxygen excess/deficiency ΣOED.

After this, if the target air-fuel ratio is switched to the lean air-fuel ratio, at the next control routine, at step S28, it is judged that the air-fuel ratio correction amount AFC is 0 or more, and the routine proceeds to step S30. At step S30, the lean flag Fl is set to "1", next, at step S31, Fn is made the absolute value of the current cumulative oxygen excess/deficiency ΣOED. Next, at step S32, the cumulative oxygen excess/deficiency ΣOED is reset to "0". Next, at step S33, the Rn calculated at step S26 and the Fn calculated at step S31 are used as the basis to update the sub learning value sfbg using the above-mentioned formula (5).

Next, at step S34, it is judged if the sub learning value sfbg calculated at step S33 is smaller than the lower limit guard value Glow. If at step S34 it is judged that the sub learning value sfbg is smaller than the lower limit guard value Glow, the routine proceeds to step S35. At step S35, the sub learning value sfbg is set to the lower limit guard value Glow. On the other hand, if at step S34 it is judged that the sub learning value sfbg is the lower limit guard value Glow or more, step S35 is skipped.

Next, at step S36, it is judged if the sub learning value sfbg calculated at step S33 is larger than the upper limit guard value Gup. If at step S36 it is judged that the sub learning value sfbg is larger than the upper limit guard value Gup, the routine proceeds to step S37. At step S37, the sub learning value sfbg is set to the upper limit guard value Gup. On the other hand, if at step S36 it is judged that the sub learning value sfbg is the upper limit guard value Gup or less, step S37 is skipped. After this, the control routine is made to end.

<Flow Chart of Sub Learning Promotion Control>

Figure 17:
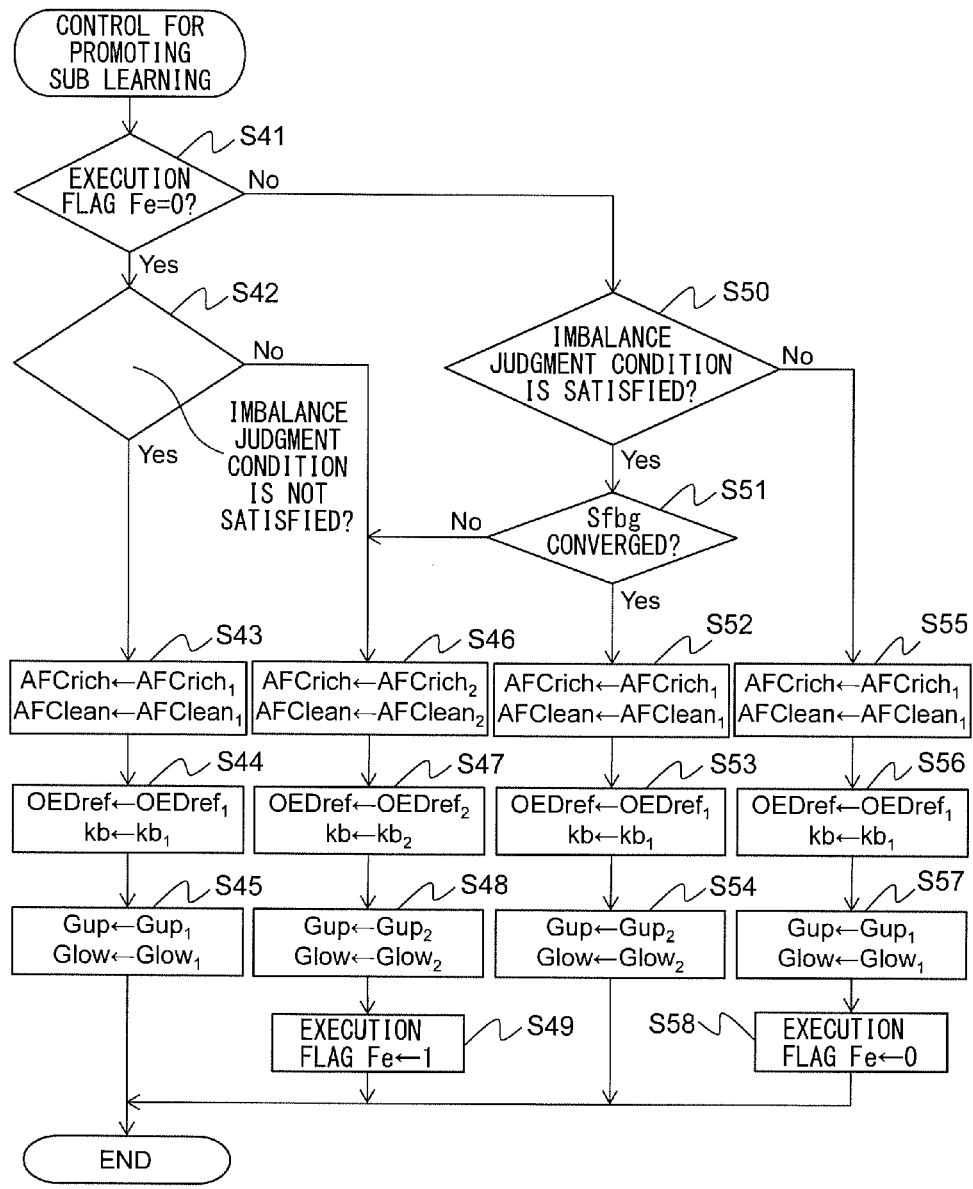
FIG. 17 is a flow chart showing a control routine of sub learning promotion control.

FIG. 17 is a flow chart showing a control routine of sub learning promotion control. The illustrated control routine is performed at constant time intervals.

First, at step S41, it is judged if the execution flag Fe of the sub learning promotion control is "0". The execution flag Fe of the sub learning promotion control is a flag set to "1" when learning is being promoted and set to "0" when it is not being performed. When at step S41 it is judged that the execution flag Fe of the sub learning promotion control is "0", the routine proceeds to step S42. At step S42, it is judged if a condition for judgment of rich imbalance is satisfied. A condition for judgment of rich imbalance is satisfied when the main learning value mfbg and the sub learning value sfbg are opposite in sign and the absolute values of the main learning value mfbg and sub learning value sfbg are respectively the reference absolute values or more. Alternatively, it is satisfied when this condition stands and, in addition, the learning value difference Δfbg of the main learning value mfbg minus the sub learning value sfbg is a reference difference or more. When at step S42 it is judged that a condition for judgment of rich imbalance is not satisfied, the routine proceeds to step S43. At step S43, the rich set correction amount AFCrich is set to the first rich set correction amount $AFCrich_1$ and the lean set correction amount AFClean is set to the first lean set correction amount $AFClean_1$. Next, at step S44, the switching reference value OEDref is set to the first switching reference value $OEDref_1$ and the gain kb representing the extent of reflecting the excess/deficiency error ΔΣOED in the control center air-fuel ratio AFR is set to $kb_1$. Next, at step S45, the upper limit guard value $Gup$ is set to the first upper limit guard value $Gup_1$, the lower limit guard value $Glow$ is set to the first lower limit guard value $Glow_1$, and the control routine is made to end.

On the other hand, when at step S42 it is judged that a condition for judgment of rich imbalance is satisfied, the routine proceeds from step S42 to step S46. At step S46, the rich set correction amount $AFCrich$ is set to the second rich set correction amount $AFCrich_2$ and the lean set correction amount $AFClean$ is set to the second lean set correction amount $AFClean_2$. The second rich set correction amount $AFCrich_2$ is a value smaller than the first rich set correction amount $AFCrich_1$ (corresponding to rich side value). Further, the second lean set correction amount $AFClean_2$ is a value smaller than the first lean set correction amount $AFClean_1$ (corresponding to rich side value).

Next, at step S47, the switching reference value $OEDref$ is set to the second switching reference value $OEDref_2$ and the gain $kb$ is set to $kb_2$. The second switching reference value $OEDref_2$ is a value smaller than the first switching reference value $OEDref_1$. Further, $kb_2$ is a value larger than $kb_1$. Next, at step S48, the upper limit guard value $Gup$ is set to the second upper limit guard value $Gup_2$, while the lower limit guard value $Glow$ is set to the second lower limit guard value $Glow_2$. The second upper limit guard value $Gup_2$ is a value with an absolute value larger than the absolute value of the first upper limit guard value $Gup_1$. Further, the second lower limit guard value $Glow_2$ is a value with an absolute value larger than the absolute value of the first lower limit guard value $Glow_1$. Next, at step S49, the execution flag $Fe$ is set to "1", then the control routine is made to end.

If the execution flag $Fe$ is set to "1", in the next control routine, the routine proceeds from step S41 to step S50. At step S50, it is judged if a condition for judgment of rich imbalance is satisfied. If at step S50 it is judged that the condition for judgment of rich imbalance is satisfied, the routine proceeds to step S51. At step S51, it is judged if the sub learning value $sfbg$ has converged to a constant value. The sub learning value $sfbg$ is judged to converge when, for example, the amount of fluctuation of the sub learning value $sfbg$ in a certain time is within a certain value. If, at step S51, it is judged that the sub learning value $sfbg$ has not converged, the routine proceeds to step S46. On the other hand, if at step S51 it is judged that the sub learning value $sfbg$ has converged, the routine proceeds to step S52. At steps S52 and S53, operations similar to steps S43 and S44 are performed. Next, at step S54, an operation similar to step S48 is performed, then the control routine is made to end.

On the other hand, if at step S50 it is judged that the condition for judgment of rich imbalance is not satisfied, the routine proceeds to step S55. At steps S55 to S57, operations similar to steps S43 to S45 are performed. Next, at step S58, the execution flag $Fe$ is reset to 0, then the control routine is made to end.

REFERENCE SIGNS LIST 1. engine body
5. combustion chamber
7. intake port
9. exhaust port
19. exhaust manifold
20. upstream side exhaust purification catalyst
24. downstream side exhaust purification catalyst
31. ECU
40. upstream side air-fuel ratio sensor
41. downstream side air-fuel ratio sensor

The invention claimed is:
1. An exhaust purification system of an internal combustion engine, comprising:
an exhaust purification catalyst arranged in an exhaust passage of an internal combustion engine; an upstream side air-fuel ratio sensor arranged at an upstream side of the exhaust purification catalyst in the direction of exhaust flow and detecting an air-fuel ratio of the exhaust gas flowing into the exhaust purification catalyst; a downstream side air-fuel ratio sensor arranged at a downstream side of the exhaust purification catalyst in the direction of exhaust flow and detecting an air-fuel ratio of the exhaust gas flowing out from the exhaust purification catalyst; and a control apparatus using output air-fuel ratios of the upstream side air-fuel ratio sensor and the downstream side air-fuel ratio sensor as the basis to control the amount of feed of fuel to a combustion chamber of the internal combustion engine, wherein the control apparatus performs
main feedback control controlling the amount of feed of fuel by feedback so that the output air-fuel ratio of the upstream side air-fuel ratio sensor becomes a target air-fuel ratio,
sub feedback control using the output air-fuel ratio of the downstream side air-fuel ratio sensor as the basis to alternately switch the target air-fuel ratio between a rich air-fuel ratio richer than the stoichiometric air-fuel ratio and a lean air-fuel ratio leaner than the stoichiometric air-fuel ratio,
main learning control using a difference between the output air-fuel ratio of the upstream side air-fuel ratio sensor and the target air-fuel ratio as the basis to calculate a main learning value changing in accordance with a steady deviation present between these air-fuel ratios and using the calculated main learning value as the basis to control the amount of feed of fuel to the combustion chamber of the internal combustion engine so that the difference between the output air-fuel ratio of the upstream side air-fuel ratio sensor and the target air-fuel ratio becomes smaller, and
sub learning control using the output air-fuel ratio of the upstream side air-fuel ratio sensor and the output air-fuel ratio of the downstream side air-fuel ratio sensor as the basis to calculate a sub learning value changing in accordance with a difference between an air-fuel ratio of the exhaust gas flowing into the exhaust purification catalyst and the target air-fuel ratio and using the calculated sub learning value as the basis to control the amount of feed of fuel to the combustion chamber of the internal combustion engine so that the difference between the air-fuel ratio of the exhaust gas flowing into the exhaust purification catalyst and the target air-fuel ratio becomes smaller,
the control apparatus performs sub learning promotion control controlling a parameter relating to the sub learning value so that the sub learning value at the sub learning control easily changes to a suitable value depending on the difference between the air-fuel ratio of the exhaust gas flowing into the exhaust purification catalyst and the target air-fuel ratio when a sub learning promotion condition is satisfied compared to when the sub learning promotion condition is not satisfied, and
the sub learning promotion condition is satisfied at least when absolute values of the main learning value and the sub learning value are respectively predetermined reference absolute values or more and the main learning value and the sub learning value are opposite in sign.

2. The exhaust purification system of an internal combustion engine according to claim 1, wherein the sub learning promotion condition is satisfied at least when the absolute values of the main learning value and the sub learning value are respectively predetermined reference absolute values or more and the main learning value and the sub learning value are opposite in sign and, furthermore, a difference of the main learning value and the sub learning value is a predetermined reference difference or more.

3. The exhaust purification system of an internal combustion engine according to claim 1, wherein an absolute value of the sub learning value is maintained at a predetermined guard value or less, and, in the sub learning promotion control, an absolute value of the predetermined guard value is made to increase.

4. The exhaust purification system of an internal combustion engine according to claim 2, wherein an absolute value of the sub learning value is maintained at a predetermined guard value or less, and, in the sub learning promotion control, an absolute value of the predetermined guard value is made to increase.

5. The exhaust purification system of an internal combustion engine according to claim 1, wherein, in the sub learning control, a difference of the target air-fuel ratio and the air-fuel ratio of the exhaust gas flowing into the exhaust purification catalyst is multiplied with a predetermined coefficient and resulting values are cumulatively added to calculate the sub learning value, and in the sub learning promotion control, the predetermined coefficient when calculating the sub learning value is made larger when the sub learning promotion condition is satisfied compared to when the sub learning promotion condition is not satisfied.

6. The exhaust purification system of an internal combustion engine according to claim 2, wherein, in the sub learning control, a difference of the target air-fuel ratio and the air-fuel ratio of the exhaust gas flowing into the exhaust purification catalyst is multiplied with a predetermined coefficient and resulting values are cumulatively added to calculate the sub-learning value, and in the sub learning promotion control, the predetermined coefficient when calculating the sub learning value is made larger when the sub learning promotion condition is satisfied compared to when the sub learning promotion condition is not satisfied.

7. The exhaust purification system of an internal combustion engine according to claim 1, wherein the control apparatus, in the sub feedback control, alternately switches the target air-fuel ratio between a rich set air-fuel ratio richer than the stoichiometric air-fuel ratio and a lean set air-fuel ratio leaner than the stoichiometric air-fuel ratio, and in the sub learning promotion control, a rich degree of the rich set air-fuel ratio is made larger when the sub learning promotion condition is satisfied compared to when the sub learning promotion condition is not satisfied.

8. The exhaust purification system of an internal combustion engine according to claim 2, wherein the control apparatus, in the sub feedback control, alternately switches the target air-fuel ratio between a rich set air-fuel ratio richer than the stoichiometric air-fuel ratio and a lean set air-fuel ratio leaner than the stoichiometric air-fuel ratio, and in the sub learning promotion control, a rich degree of the rich set air-fuel ratio is made larger when the sub learning promotion condition is satisfied compared to when the sub learning promotion condition is not satisfied.

9. The exhaust purification system of an internal combustion engine according to claim 1, wherein the control apparatus uses the output air-fuel ratio of the upstream side air-fuel ratio sensor as the basis to estimate an oxygen storage amount of the exhaust purification catalyst and, in the sub feedback control, switches the target air-fuel ratio from a lean air-fuel ratio to a rich air-fuel ratio when the estimated value of the oxygen storage amount of the exhaust purification catalyst becomes a switching reference storage amount or more, and in the sub learning promotion control, the switching reference storage amount is made smaller when the sub learning promotion condition is satisfied compared to when the sub learning promotion condition is not satisfied.

10. The exhaust purification system of an internal combustion engine according to claim 2, wherein the control apparatus uses the output air-fuel ratio of the upstream side air-fuel ratio sensor as the basis to estimate an oxygen storage amount of the exhaust purification catalyst and, in the sub feedback control, switches the target air-fuel ratio from a lean air-fuel ratio to a rich air-fuel ratio when the estimated value of the oxygen storage amount of the exhaust purification catalyst becomes a switching reference storage amount or more, and in the sub learning promotion control, the switching reference storage amount is made smaller when the sub learning promotion condition is satisfied compared to when the sub learning promotion condition is not satisfied.

11. The exhaust purification system of an internal combustion engine according to claim 1, wherein the control apparatus, in the sub feedback control, alternately switches the target air-fuel ratio between a rich set air-fuel ratio richer than the stoichiometric air-fuel ratio and a lean set air-fuel ratio leaner than the stoichiometric air-fuel ratio, and, in the sub learning promotion control, a lean degree of the lean set air-fuel ratio is made smaller when the sub learning promotion condition is satisfied compared to when the sub learning promotion condition is not satisfied.

12. The exhaust purification system of an internal combustion engine according to claim 2, wherein the control apparatus, in the sub feedback control, alternately switches the target air-fuel ratio between a rich set air-fuel ratio richer than the stoichiometric air-fuel ratio and a lean set air-fuel ratio leaner than the stoichiometric air-fuel ratio, and, in the sub learning promotion control, a lean degree of the lean set air-fuel ratio is made smaller when the sub learning promotion condition is satisfied compared to when the sub learning promotion condition is not satisfied.

* * * * *